(12) United States Patent
Nakai et al.

(10) Patent No.: US 7,660,003 B2
(45) Date of Patent: Feb. 9, 2010

(54) IMAGE PROCESSING METHOD, IMAGE PROCESSING SYSTEM, AND IMAGE FORMING APPARATUS

(75) Inventors: Yasuhiro Nakai, Souraku-gen (JP); Kohji Katamoto, Yamatokoriyama (JP); Tamotsu Fukushima, Nara (JP); Masao Saeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 758 days.

(21) Appl. No.: 10/543,966

(22) PCT Filed: Jan. 27, 2004

(86) PCT No.: PCT/JP2004/000719

§ 371 (c)(1),
(2), (4) Date: Jul. 28, 2005

(87) PCT Pub. No.: WO2004/068246

PCT Pub. Date: Dec. 8, 2004

(65) Prior Publication Data

US 2006/0152753 A1    Jul. 13, 2006

(30) Foreign Application Priority Data

Jan. 28, 2003  (JP) .............................. 2003-019553
Jan. 28, 2003  (JP) .............................. 2003-019554

(51) Int. Cl.
*G06F 3/12*   (2006.01)
(52) U.S. Cl. ..................... 358/1.14; 358/1.16; 382/135; 382/136; 705/17
(58) Field of Classification Search .................. 358/1.1, 358/1.14, 1.15, 1.16, 403; 382/135, 137, 382/138, 139, 140, 181, 190, 136; 705/64, 705/16, 17
See application file for complete search history.

(56) References Cited

U.S. PATENT DOCUMENTS

| | | | | |
|---|---|---|---|---|
| 6,031,976 A | * | 2/2000 | Koakutsu et al. | 358/1.16 |
| 6,185,321 B1 | * | 2/2001 | Fukushima et al. | 382/135 |
| 6,198,541 B1 | * | 3/2001 | Okimoto | 358/1.14 |
| 6,285,459 B1 | * | 9/2001 | Koakutsu et al. | 358/1.15 |

FOREIGN PATENT DOCUMENTS

| | | |
|---|---|---|
| JP | 59-050660 | 3/1984 |
| JP | 63-006575 | 1/1988 |
| JP | 5-232757 | 9/1993 |
| JP | 06-004766 | 1/1994 |
| JP | 9-54897 | 2/1997 |
| JP | 09-223061 | 8/1997 |
| JP | 9-284572 | 10/1997 |

(Continued)

*Primary Examiner*—Kimberly A Williams
(74) *Attorney, Agent, or Firm*—George W. Neuner; David G. Conlin; Edwards Angell Palmer & Dodge LLP

(57) ABSTRACT

An image processing system according to the invention comprises a valuable information processing apparatus which manages valuable information equivalent to money, and an image forming apparatus which is connected to the valuable information processing apparatus and forms an image according to the valuable information. The image forming apparatus stores read or input image data into image data memory means. Then, image data stored in the image data memory means is invalidated when the valuable information to be managed by the valuable information processing apparatus fulfills a predetermined condition.

12 Claims, 43 Drawing Sheets

FOREIGN PATENT DOCUMENTS

| JP | 9-297510 | 11/1997 |
| JP | 11-284820 | 10/1999 |
| JP | 2001-250057 | 9/2001 |
| JP | 2002-92666 | 3/2002 |
| JP | 2002-224361 | 8/2002 |
| JP | 2002-333799 | 11/2002 |
| JP | 2003-92649 | 3/2003 |

* cited by examiner

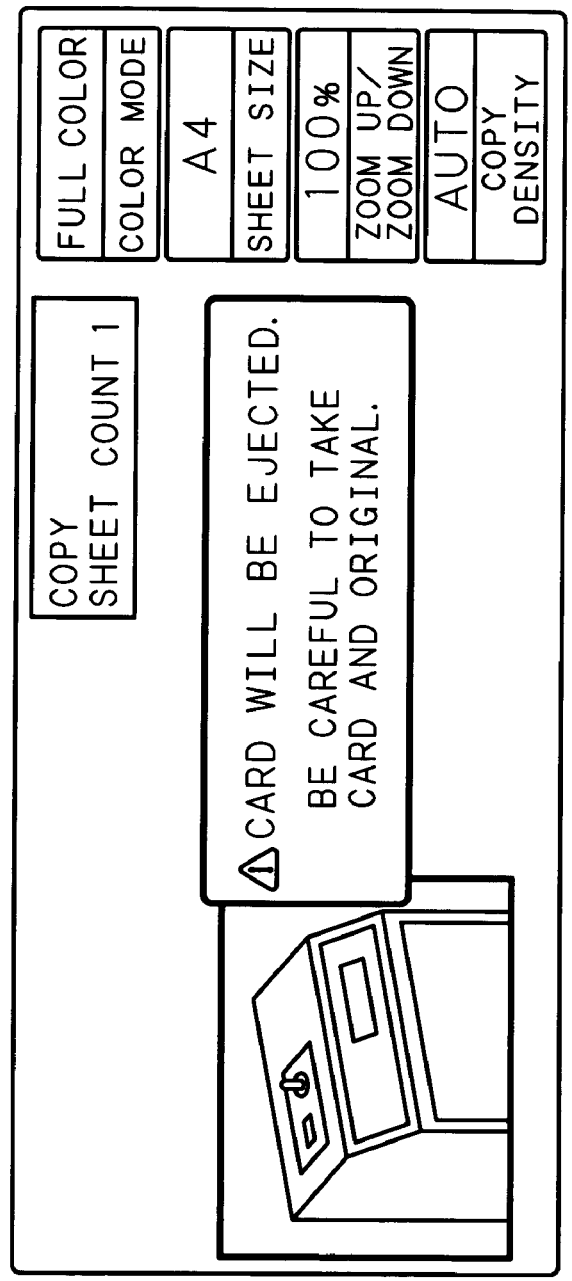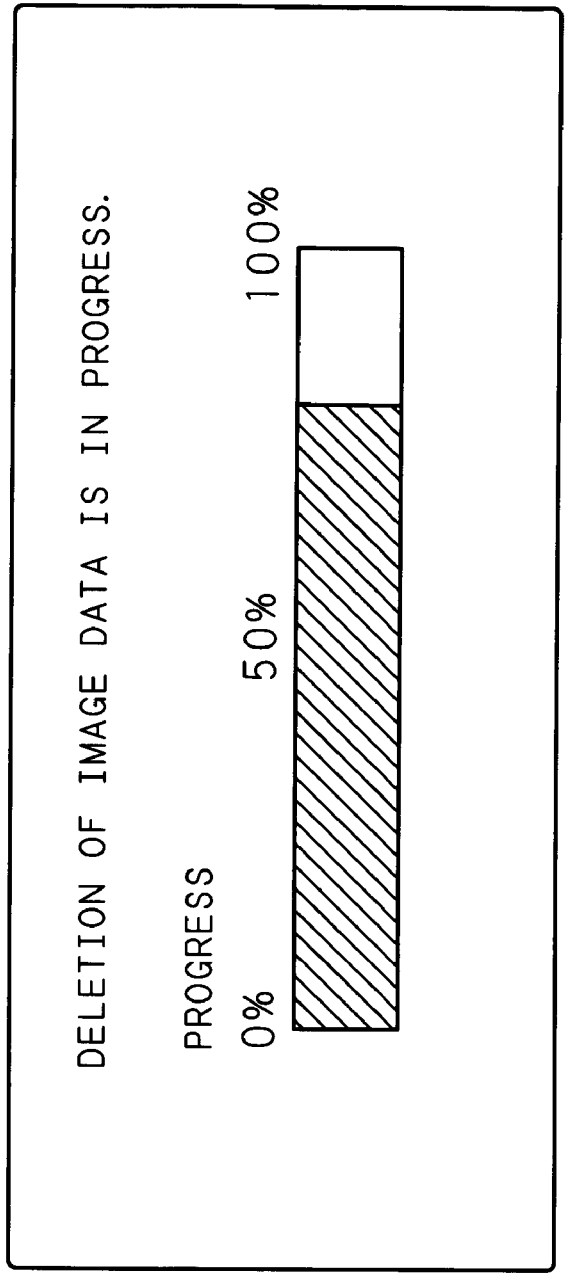
FIG. 13 (a) (b)

FIG. 15

PRINT DATA FILE 551

| RECEPTION DATE | PRINT DATA (FILE NAME) | IDENTIFICATION INFORMATION | HISTORY |
|---|---|---|---|
| 2002/05/20 11:15 | O×O.bmp | 1115 | DONE |
| 2002/05/20 12:10 | O×△.html<br>O××.html | 1210 | NOT DONE |
| 2002/05/20 12:12 | 0001.jpeg<br>0002.jpeg<br>0003.jpeg | 1212 | NOT DONE |
| ... | ... | ... | ... |

1. ENTER IDENTIFICATION INFORMATION.

☐ USER FOR USING PRINT FUNCTION

IDENTIFICATION INFORMATION

[ — — — ]

PRESS [PORT TERMINAL] KEY FOR CANCEL THE OPERATION.

(OK)

(b)

1. ENTER IDENTIFICATION INFORMATION.

☐ USER FOR USING PRINT FUNCTION

IDENTIFICATION INFORMATION

[ 1 — — ]

PRESS [CLEAR] KEY FOR CORRECTING THE INPUT NUMBER.

(OK)

FIG. 18
(a) 2. DEPOSIT AMOUNT OF MONEY AS SHOWN IN DISPLAY, OR INSERT CARD.
CHARGE 150YEN
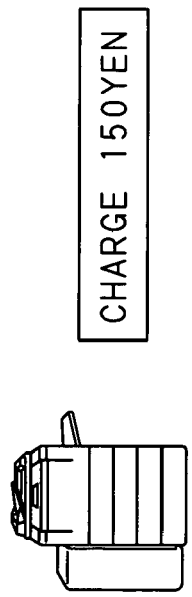
(b) PRINT PROCESS IS IN PROGRESS. WAIT FOR SOME TIME UNTIL THE PRINTING IS FINISHED.
PORT TERMINAL
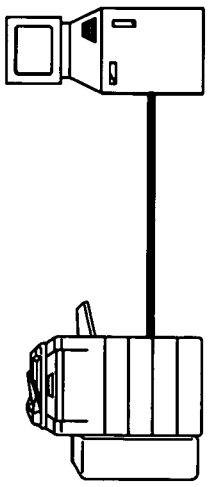
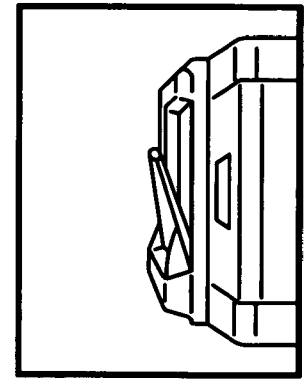

FIG. 19
(a)
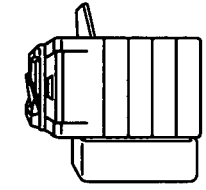
PRINT PROCESS HAS BEEN FINISHED.
IT IS DELIGHTFUL THAT THERE WILL BE OTHER OCCASIONS.
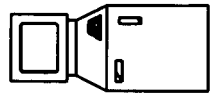
PRINT SERVICE
(b)
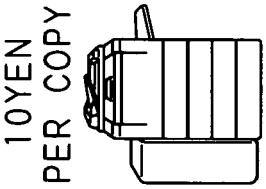
WELCOME
☐ USER FOR MAKING COPY    ☐ USER FOR USING PRINT FUNCTION
1. INSERT PROPER COINS.    PORT TERMINAL PRESS [PORT→TERMINAL] KEY FOR USE.
| MONOCHROME | FULL COLOR/SINGLE COLOR |
|---|---|
| 10YEN PER COPY | 30YEN PER COPY |
| ⑩ | (A3) 50YEN PER COPY |
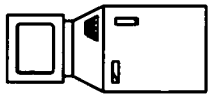
PRINT SERVICE

FIG. 33

COPY DATA FILE 553

| SCAN DATE | IDENTIFICATION INFORMATION | AMOUNT OF MONEY | ADJUSTMENT STATE | COPY DATA |
|---|---|---|---|---|
| 2003/01/02 13:15 | 0213315 | 120 | DONE | INVALIDATION DONE |
| 2003/01/02 13:30 | 0213330 | 330 | DONE | INVALIDATION DONE |
| 2003/01/02 13:33 | 0213333 | 200 | NOT DONE | **** |
| 2003/01/02 13:40 | 0213340 | 60 | IN USE | **** |

FIG. 36

PRINT DATA FILE 551

| RECEPTION DATE | PRINT DATA (FILE NAME) | IDENTIFICATION INFORMATION | HISTORY | AMOUNT OF MONEY | ADJUSTMENT STATE | PRINT DATA |
|---|---|---|---|---|---|---|
| 2002/05/20 11:15 | O×O.bmp | 1115 | DONE | 30 | DONE | INVALIDATION DONE |
| 2002/05/20 12:10 | O×△.html O×x.html | 1210 | NOT DONE | 60 | NOT DONE | **** |
| 2002/05/20 12:12 | 0001.jpeg 0002.jpeg 0003.jpeg | 1212 | NOT DONE | 90 | NOT DONE | **** |
| ... | ... | ... | ... | ... | ... | ... |

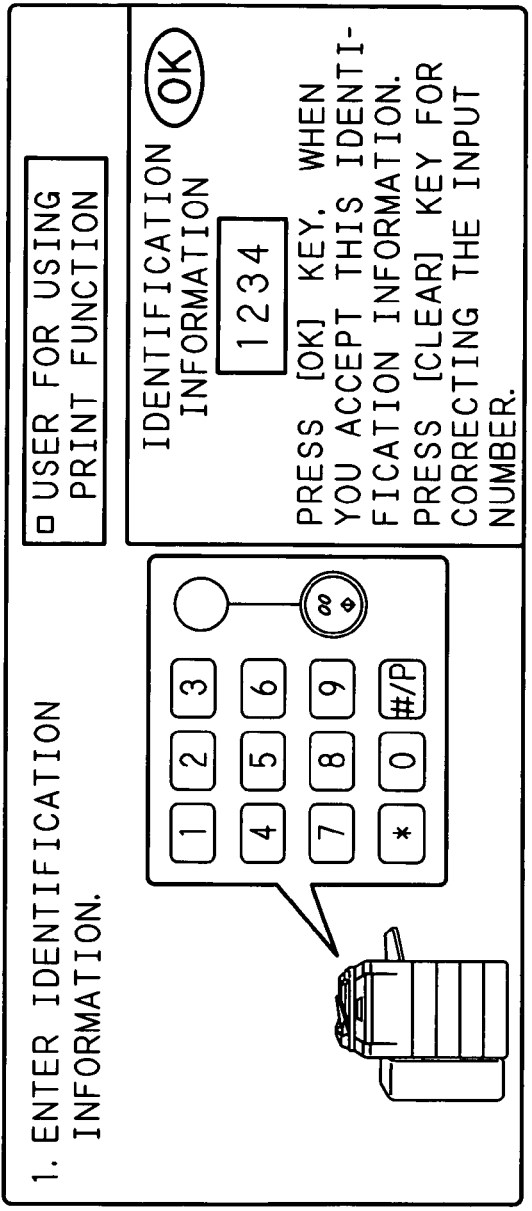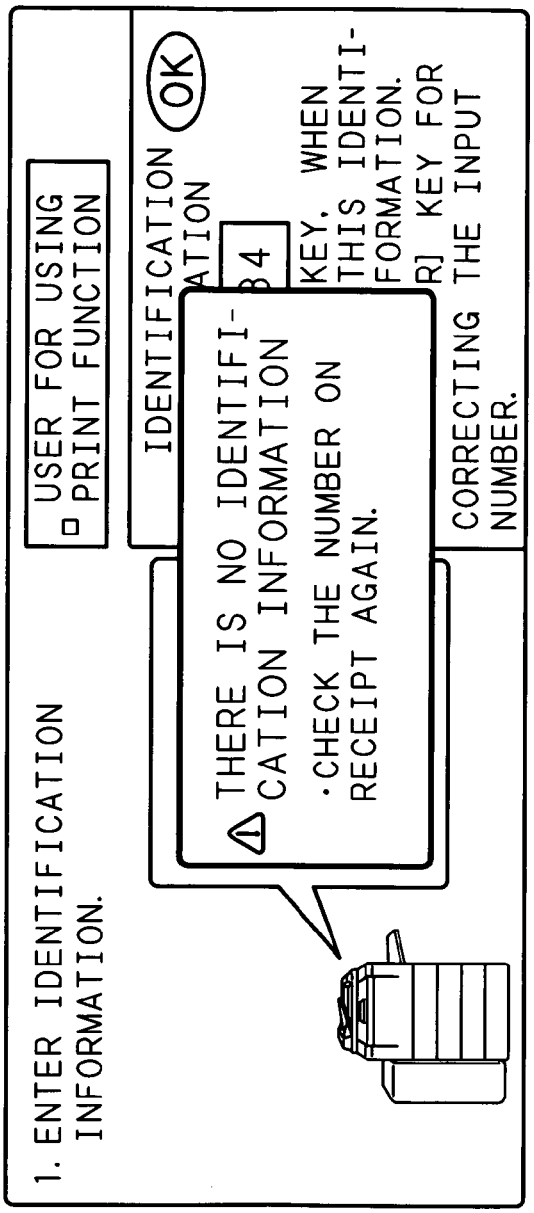
FIG. 38

IMAGE PROCESSING METHOD, IMAGE PROCESSING SYSTEM, AND IMAGE FORMING APPARATUS

This application is the national phase under 35 U.S.C. § 371 of PCT International Application No. PCT/JP2004/000719 which has an International filing date of Jan. 27, 2004 and designated the United States of America.

TECHNICAL FIELD

The present invention relates to an image processing method to be adapted to an image processing system comprising an image forming apparatus and a valuable information processing apparatus or an information processing apparatus connected to the image forming apparatus, an image processing system, and an image forming apparatus, and, more particularly, to an image processing method, etc., which invalidates stored image data at an optimal timing.

BACKGROUND ART

Recently, it is a common scene to place an image forming apparatus, such as a copy machine, in a convenience store or the like at the corner of a street to provide a copy service. A plurality of users bring in book originals, sheet originals or so and use it without constraint. In recent years, digitalization of image forming apparatuses has been advanced and multi-function type image forming apparatuses equipped with a printer function, a copy function and a FAX function which electronically scan an original image with a scanner device and print it out with a laser printer or so, have been commercialized. The merits of the digitalization are high quality outputs, free image processing, 1-scan multicopying, storage of electronic data of originals, and so forth, and are proposed as new document services on the market.

With the advancement of digitalization of image forming apparatuses, the technologies of erasing stored image data are disclosed in, for example, Japanese Patent Application Laid-Open No. S59-50660, Japanese Patent Application Laid-Open No. H9-223061, Japanese Patent Application Laid-Open No. H9-284572, Japanese Patent Application Laid-Open No. S63-6575, and Japanese Patent Application Laid-Open No. H6-4766 in order to prevent data, scanned by a scanner and stored on a hard disk or so, from being used by a third party without permission.

As a plurality of people uses an image forming apparatus in a store, such as a convenience store, it is necessary to surely erase stored image data. However, the image information processing method described in the Japanese Patent Application Laid-Open No. S59-50660 has a problem such that as image data is erased immediately after scanning the image data or after a predetermined time elapses after scanning of the image data, a user cannot use the function of reading scanned image data again and copying it (so-called electronic filing function). In stores, such as convenience stores, therefore, demands for developing image processing systems capable of effectively using the functions of digital image forming apparatuses have increased.

The present invention has been made in view of the above-described situations, and aims at providing an image processing method, an image processing system and an image forming apparatus which can effectively use the functions of a digital image forming apparatus while ensuring the security of image data of a user by invalidating stored image data when valuable information, which is managed by a valuable information processing apparatus, such as a coin vendor, fulfills a predetermined condition.

It is another object of the invention to provide an image processing method, an image processing system and an image forming apparatus which can effectively use the functions of a digital image forming apparatus while ensuring the security of image data of a user by invalidating stored image data in response to an instruction from an information processing apparatus.

It is a further object of the invention to provide an image processing system, etc., which can invalidate image data after image formation by a user is surely finished, by invalidating the image data stored under the condition that an adjustment process on image data to be invalidated is completed by an information processing apparatus.

DISCLOSURE OF INVENTION

An image processing method according to the invention is to be adapted to an image processing system comprising a valuable information processing apparatus, which processes valuable information equivalent to money with control means, and an image forming apparatus, which has arithmetic operation means and forms an image according to the valuable information, and is characterized by comprising a step of causing the arithmetic operation means to store image data into image data memory means of the image forming apparatus, and a step of causing the arithmetic operation means to invalidate image data stored in the image data memory means when the valuable information to be processed by the control means fulfills a predetermined condition.

An image processing method according to the invention is to be adapted to an image processing system comprising an image forming apparatus, which has control means for storing image data into image data memory means, and an information processing apparatus, which has arithmetic operation means and is connected to the image forming apparatus, and is characterized by comprising an invalidation step of causing the control means to invalidate image data stored in the image data memory means when receiving information to be invalidated from the arithmetic operation means.

An image processing system according to the invention comprises a valuable information processing apparatus, which processes valuable information equivalent to money, and an image forming apparatus, which is connected to the valuable information processing apparatus and forms an image according to the valuable information, and is characterized in that the image forming apparatus comprises image data memory means which stores image data, and invalidation means which invalidates image data stored in the image data memory means when the valuable information to be managed by the valuable information processing apparatus fulfills a predetermined condition.

The image processing system according to the invention is characterized in that the valuable information processing apparatus comprises valuable information detecting means which detects valuable information, and absence information generating means which generates absence information indicating that there is no valuable information when the valuable information detected by the valuable information detecting means ceases to exist, and the invalidation means is so constructed as to invalidate the image data stored in the image data memory means when the absence information is generated by the absence information generating means.

The image processing system according to the invention is characterized in that the valuable information detecting means comprises a money deposition section which detects information on an amount of money deposited, and the absence information generating means is so constructed as to generate absence information when a remainder of the amount of money detected by the money deposition section becomes zero, or when the amount of money becomes zero through adjustment.

The image processing system according to the invention is characterized in that the valuable information detecting means comprises a card reading section which detects valuable information equivalent to money in a card or an identifier associated with the valuable information, and the absence information generating means is so constructed as to generate absence information when the valuable information in the card detected by the card reading section becomes zero, or when the card is ejected from the card reading section or the card becomes in a non-reading state.

The image processing system according to the invention is characterized in that the invalidation processing means is so constructed as to overwrite random numbers or predetermined numbers in an area of the image data memory means where target image data is stored.

The image processing system according to the invention is wherein said image forming apparatus further comprises invalidation information display means which displays information about invalidation of image data by the invalidation means on display means.

The image processing system according to the invention is characterized in that the invalidation processing means is so constructed as to overwrite random numbers or predetermined numbers in an area of the image data memory means where target image data is stored.

An image processing system according to the invention comprises an image forming apparatus and an information processing apparatus to be connected to the image forming apparatus, and is characterized in that the image forming apparatus comprises image data memory means which stores image data, and invalidation means which invalidates image data stored in the image data memory means when receiving information to invalidate image data from the information processing apparatus.

The image processing system according to the invention is characterized in that the information processing apparatus comprises adjustment processing means which executes an adjustment process on image data to be invalidated, and adjustment-end-information transmission means which transmits adjustment-end-information indicating completion of the adjustment process to the image forming apparatus, and the invalidation means is so constructed as to invalidate image data stored in the image data memory means when receiving the adjustment-end-information from the adjustment-end-information transmission means.

The image processing system according to the invention is characterized in that the image forming apparatus further comprises medium output means, which, upon completion of image formation of image data stored in the image data memory means, outputs a medium added with identification information associated with the image data, the information processing apparatus further comprises recognition means which recognizes the identification information to be added to the medium, and amount-of-money display means which displays an amount of money needed for the image formation of image data corresponding to the recognized identification information on a display section, and the adjustment processing means is so constructed as to determine whether the amount of money needed for the image formation of the image data corresponding to the identification information has been adjusted or not.

The image processing system according to the invention is characterized by further comprising a terminal device that outputs image data to the image forming apparatus and comprises output means which outputs image data and identification information for specifying the image data, and sub-medium output means which outputs a medium added with the identification information output by the output means, and characterized in that the image forming apparatus further comprises identification information accepting means which accepts identification information, and extraction means which extracts corresponding image data when the accepted identification information matches the identification information output by the output means, the recognition means is so constructed as to recognize identification information of the medium output by the sub-medium output means, and the adjustment-end-information transmission means is so constructed as to transmit the adjustment-end-information to the image forming apparatus when image formation of the extracted image data is completed and when an adjustment process of image data corresponding to the recognized identification information is completed.

The image processing system according to the invention is characterized in that the image forming apparatus, the information processing apparatus and the terminal device are connected to one another by a LAN in a store.

The image processing system according to the invention is characterized in that the information processing apparatus is a POS terminal.

The image processing system according to the invention is characterized in that the information processing apparatus further comprises invalidation information display means which displays information about invalidation of image data by the invalidation means on the display section.

The image processing system according to the invention is characterized in that the information processing apparatus is a POS terminal.

An image forming apparatus according to the invention forms an image according to valuable information equivalent to money acquired from the outside, and is characterized by comprising image data memory means which stores image data, and invalidation means which invalidates image data stored in the image data memory means when the valuable information acquired from the outside fulfills a predetermined condition.

The image forming apparatus according to the invention is characterized in that it is so constructed as to invalidate the image data stored in the image data memory means when acquiring, from the outside, absence information indicating that there is no valuable information when the valuable information ceases to exist.

An image forming apparatus according to the invention is characterized by comprising image data memory means which stores image data, and invalidation means which invalidates image data stored in the image data memory means when receiving, from the outside, adjustment-end-information indicating completion of an adjustment process on image data to be invalidated.

The image forming apparatus according to the invention is characterized by further comprising medium output means, which, upon completion of image formation of image data stored in the image data memory means, outputs a medium added with identification information associated with the image data, and characterized in that the invalidation means is so constructed as to invalidate the image data stored in the image data memory means when receiving, from the outside, the adjustment-end-information indicating completion of an adjustment process on image data corresponding to identification information issued by the issuing means.

The image forming apparatus according to the invention is characterized by further comprising invalidation information display means which displays information about invalidation of image data by the invalidation means on display means.

The image forming apparatus according to the invention is characterized by further comprising invalidation information output means which outputs information about invalidation of image data by the invalidation means to the outside.

According to the invention, the information processing system comprises the valuable image processing apparatus which manages valuable information equivalent to money, and the image forming apparatus which is connected to the valuable information processing apparatus and forms an image according to the valuable information. The image forming apparatus stores read or input image data into the image data memory means. Then, image data stored in the image data memory means is invalidated when the valuable information to be managed by the valuable information processing apparatus fulfills a predetermined condition.

Specifically, the valuable information processing apparatus detects valuable information by valuable information detecting means which detects information on the amount of money deposited from the money deposition section or detects valuable information equivalent to money in a card (or an identifier associated with the valuable information) by the card reading section, and generates absence information indicating absence of valuable information. An example of the case where there is no valuable information is a case where the remainder of the amount of money becomes zero, a case where the amount of money becomes zero through adjustment, a case where valuable information in a card becomes zero, or a case where a card is ejected from the card reading section (a case where a non-contact type card becomes a non-reading state).

When absence information is generated, the image forming apparatus invalidates image data stored in the image data memory means. That is, when valuable information fulfills a predetermined condition, such as at the time of adjustment when the use of the image forming apparatus by a user ends or at the time the remaining amount of money is zero, image data is invalidated, thus eliminating a risk of a third party's illegitimate use of image data of a user while stored image data can be used effectively using functions, such as the electronic filing function.

As the image forming apparatus displays information about invalidation of image data on the display means according to the invention, a user can confirm that image data is invalidated and can securely use the image forming apparatus.

Further, according to the invention, the image processing system comprises the image forming apparatus and the information processing apparatus, such as a POS terminal, which transmits and receives information to and from the image forming apparatus. The image forming apparatus stores read or externally output image data into the image data memory means. When information to be invalidate stored image data is received from the information processing apparatus, image data stored in the image data memory means is invalidated. This structure eliminates a risk of a third party's illegitimate use of image data of a user while stored image data can be used effectively using functions, such as the electronic filing function.

Further, according to the invention, the image processing apparatus executes an adjustment process about image data to be invalidated. In the adjustment process, for example, when image formation of image data stored in the image data memory means is finished, the image forming apparatus outputs a medium added with identification information associated with the image data. A user brings the output medium into the information processing apparatus for adjustment. The information processing apparatus identifies the identification information, and displays the amount of money needed for image formation of image data corresponding to the identified identification information on the display section.

The information processing apparatus determines whether the amount of money needed for image formation of image data corresponding to the identified identification information has been adjusted or not. When adjustment is completed this way, adjustment-end-information indicating the end of the adjustment process is sent to the image forming apparatus. When receiving the adjustment-end-information, the image forming apparatus invalidates image data stored in the image data memory means. Triggered by the adjustment process indicating the end of the use of the image forming apparatus by a user, this structure can surely erase image data of the user.

Further, according to the invention, when image data is invalidated or so by writing the memory area for information about an invalidation process, e.g., image data, plural times with a random number generated, the image forming apparatus outputs information about the progress status to the information processing apparatus. Then, as the information processing apparatus displays the output information about the invalidation process, the user or the staff of a store can recognize that data is surely erased, and can securely use the image forming apparatus.

Furthermore, the invention further comprises a terminal device which outputs image data to the image forming apparatus. The terminal device, for example, functions to download an image on the Web server over the Internet and output the downloaded image data to the image forming apparatus for image formation. The terminal device outputs image data and identification information for specifying the image data to the image forming apparatus. In addition, a medium affixed with the identification information output to the image forming apparatus is output. The image forming apparatus receives the identification information, and when the received identification information matches with identification information output from the output means, the image forming apparatus extracts corresponding image data. Then, the image of the extracted image data is formed.

When image formation of the extracted image data is finished, the identification information affixed to the medium is identified, and the adjustment process on the image data corresponding to the identification information is finished, the information processing apparatus sends the adjustment-end-information to the image forming apparatus. Then, the image forming apparatus invalidates the extracted image data. That is, processes of image formation, adjustment and invalidation for the image data output from the terminal device are achieved based on the identification information issued by the terminal device, so that even when wider services are provided, data of a user can be protected.

BRIEF DESCRIPTION OF DRAWINGS

FIG. 13 is an image diagram illustrating the procedures of the copy process.

FIG. 15 is an explanatory diagram illustrating the layout of records of a print data file.

FIG. 16 is an image diagram illustrating the guiding procedures of a print process.

FIG. 18 is an image diagram illustrating the guiding procedures of the print process.

FIG. 19 is an image diagram illustrating the guiding procedures of the print process.

FIG. 33 is an explanatory diagram illustrating the layout of records of a copy data file.

FIG. 36 is an explanatory diagram illustrating the layout of records of a print data file.

FIG. 38 is a schematic diagram illustrating the outline of an example of screens which are displayed on the display section of the multifunction apparatus.

BEST MODE FOR CARRYING OUT THE INVENTION

Preferred embodiments of the present invention will now be specifically described with reference to the accompanying drawings.

First Embodiment

Figure 1:
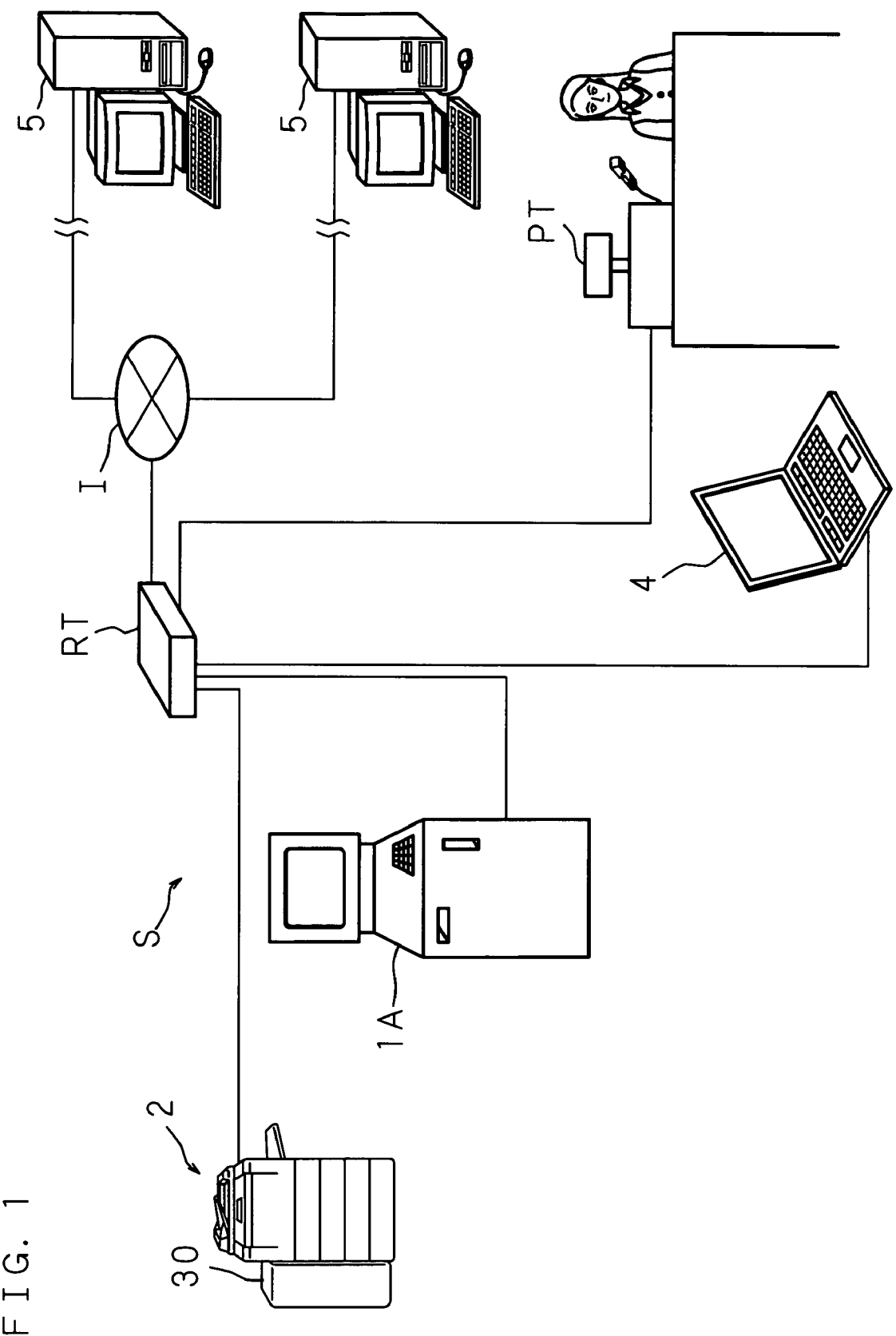
FIG. 1 is a schematic diagram illustrating the outline of an image processing system according to the present invention.

FIG. 1 is a schematic diagram illustrating the outline of an image processing system according to the present invention. In the diagram, 1A is an information processing apparatus (hereinafter called port terminal) to be placed in a store, such as a convenience store, which is connected to an external Internet I via a LAN (Local Area Network, hereinafter called communication network) S in the store, and a rooter RT, and transmits and receives HTML file, computer programs, image data, etc. to and from a Web server 5 by the HTTP (Hyper Text Transfer Protocol)protocol.

The port terminal 1A has various functions, such as purchasing concert tickets and downloading of images from a network album stored in the Web server 5 by executing communication with the Web server 5. Image data downloaded via the Internet I or image data read by a reader for a recording medium, such as a memory card, provided in the port terminal 1A is transmitted as print data to an image forming apparatus 2 likewise placed in the store and connected via the communication network S and the rooter RT, and is printed when predetermined money is deposited. The image forming apparatus (hereinafter called multifunction apparatus) 2 has multiple functions, such as a copy function and a printer function. As one of the functions, it functions as a printer according to a demand from the port terminal 1A.

It also functions as a copy machine which copies an original placed on a document table under the condition that a predetermined amount of money has been deposited or so in a valuable information processing apparatus (hereinafter called coin vendor) 30 which detects and manages valuable information stored in a prepaid card. Although the following description of the embodiment will be given of a case where those devices and network are assembled in a store, such as a convenience store, it is not restrictive but the embodiment may be adapted to within a network which is constructed in a university, an office or the like. Further, while the multifunction apparatus 2 has a copy function and a printer function, it may of course have a facsimile function.

Further connected to the communication network S are a POS terminal PT provided at a cash register, and a personal computer 4. The POS terminal PT manages sales data or the like, and transmits management data managed through a batch process to a server computer (not shown) in the front office of convenience stores over the Internet I. The personal computer is a known personal computer which is not used by customers, but is used at the back of the store by the manager in the store to create sales data, the shift table of part-time staff, posters, and so forth.

Figure 2:
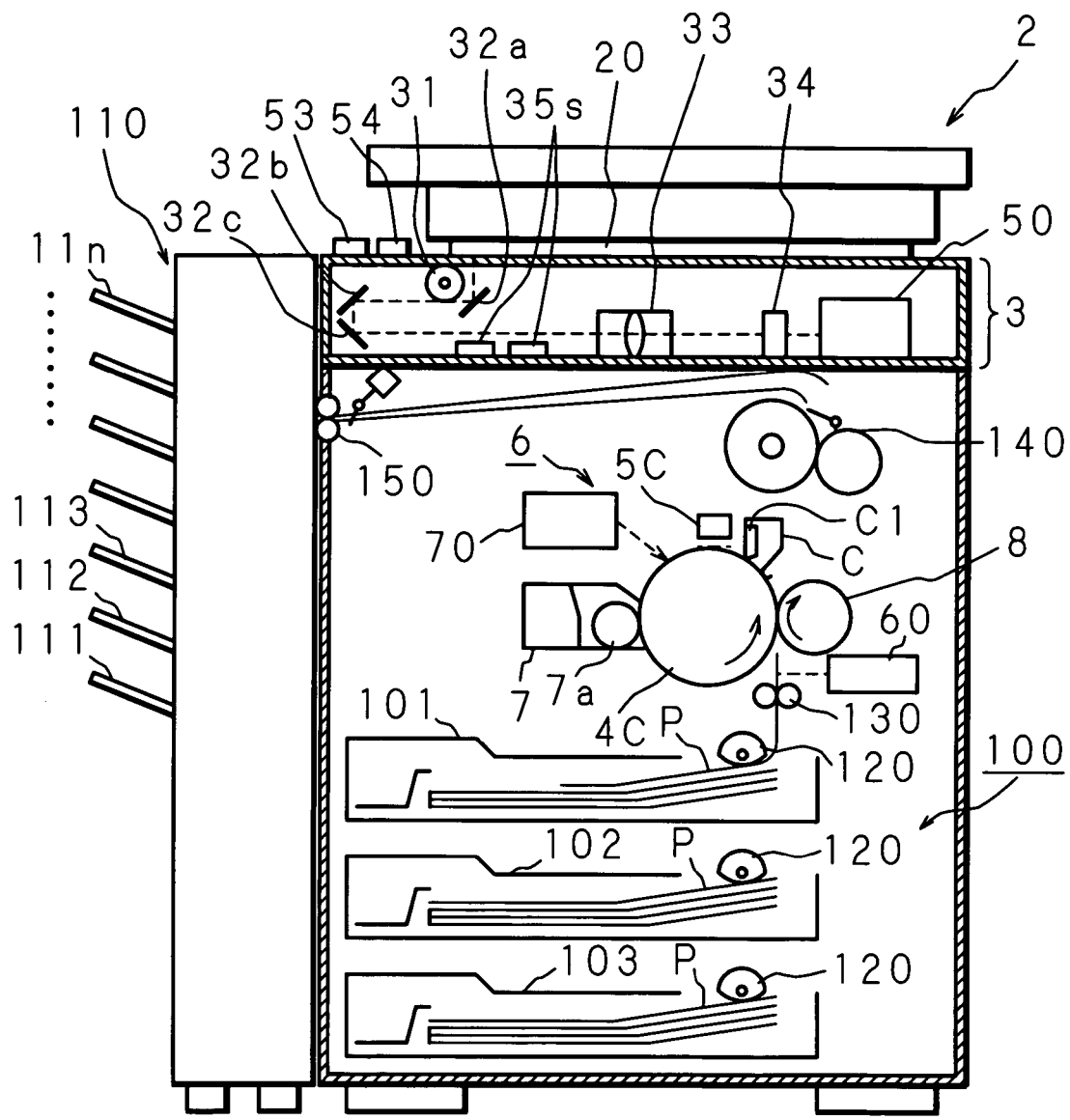
FIG. 2 is a schematic cross-sectional view showing the hardware configuration of a multifunction apparatus.
Figure 3:
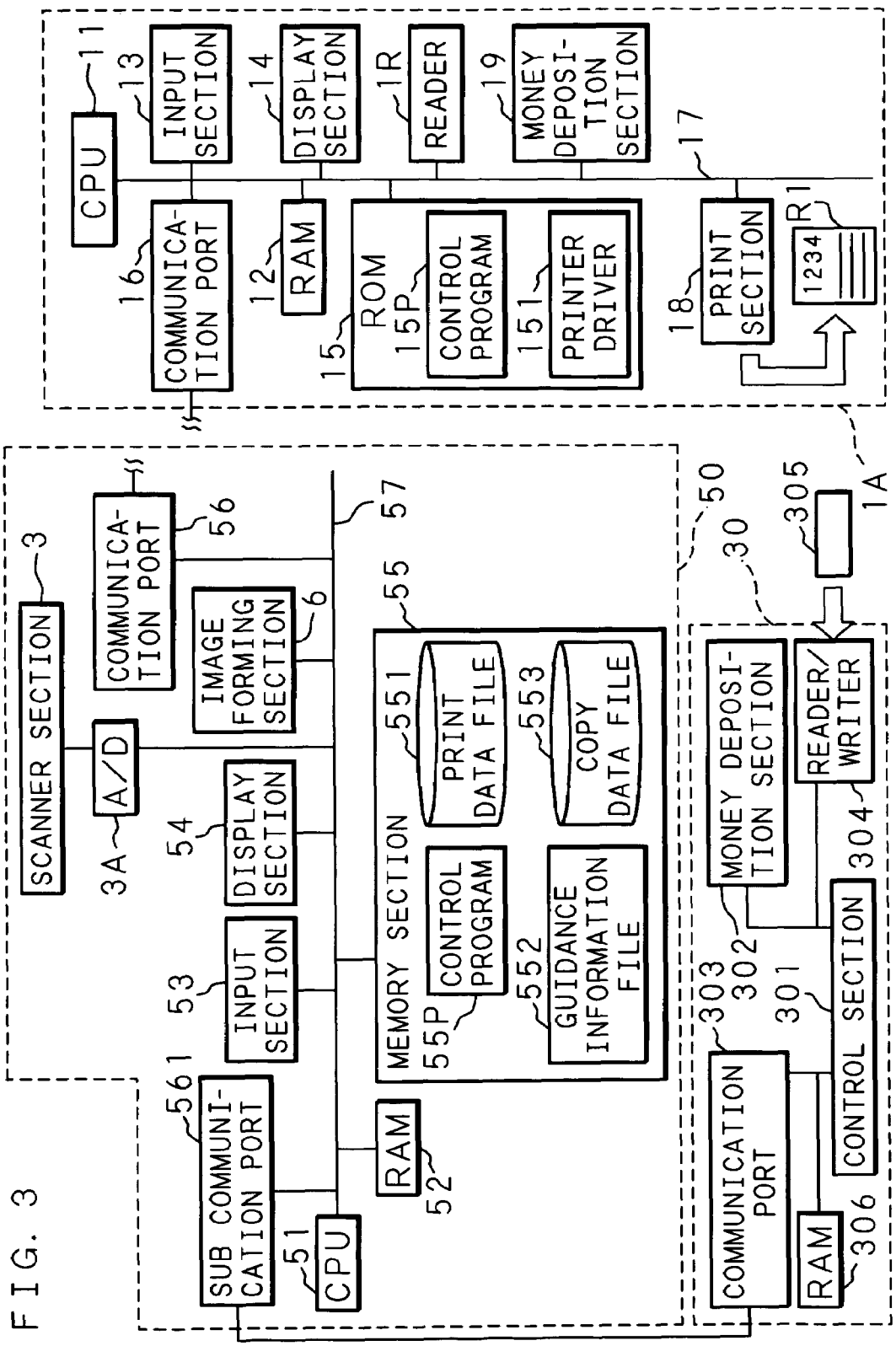
FIG. 3 is a block diagram showing the hardware configurations of a coin vendor, the control section of the multifunction apparatus, and a port terminal.

FIG. 2 is a schematic cross-sectional view showing the hardware configuration of the multifunction apparatus 2, and FIG. 3 is a block diagram showing the hardware configurations of the coin vendor 30, the control section of the multifunction apparatus 2, and the port terminal 1A. A document table 20 of transparent glass is placed on the top surface of the multifunction apparatus 2, and a scanner section 3 as read means is laid out under the document table. The scanner section 3 includes an exposure lamp 31, a first reflector mirror 32a, a second reflector mirror 32b, a third reflector mirror 32c, a lens 33, and a photoelectric converting device 34 using a CCD, and exposes and scans the image of an original placed on the top surface of the document table 20 with light irradiated from the exposure lamp 31 by reciprocating the exposure lamp 31 and the first reflector mirror 32a horizontally at the bottom side of the document table 20. A recognition sensor 35s which recognizes the size of an original placed on the document table 20 is provided at the lower portion of the document table 20.

The reflection light by the exposure lamp 31 forms an image on the light receiving surface of the photoelectric converting device 34 via the first reflector mirror 32a to the third reflector mirror 32c and the lens 33, and the photoelectric converting device 34 outputs a signal according to the amount of light received at the light receiving surface. The signal output from the photoelectric converting device 34 is digitized by an A/D converter 3A of a control section 50, and is stored in a copy data file 553 as image data memory means in a memory section 55 such as a hard disk. In accordance with an operation signal output from an input section 53 like an operational panel, image data is read out from the copy data file 553 of the memory section 55, and is output to an optical scanning device 70.

Subsequently, the contents of the control section 50 of the multifunction apparatus 2 shown in FIG. 3 will be elaborated. As shown in FIG. 3, a RAM (Random Access Memory) 52, the memory section 55 like a hard disk, a display section 54 like a liquid crystal display as display means, and the input section 53 as input means which comprises various input keys, such as a numerical keypad and a start key, and a touch panel provided on the display section 54, etc. are connected to a CPU (Central Processing Unit) 51 as arithmetic operation means by a bus 57.

Also connected thereto are the A/D converter 3A which converts a signal from the photoelectric converting device 34 to a digital signal, a clock section (not shown) which outputs time information to the CPU 51, an image forming section 6 which forms an image on a recording sheet P by irradiating modulated light based on image data to the photosensitive body 4C, a communication port 56, such as a LAN card, for transmission and reception of information to and from the port terminal 1A, and a sub communication port 561, such as an RS232C port, for transmission and reception of information to and from the coin vendor 30. The CPU 51, which is connected to the individual hardware sections like the control section 50 by the bus 57, controls them and executes various software functions according to a control program 55P stored in the memory section 55.

Stored in the memory section 55 are the copy data file 553 as the image data memory means which stores image data scanned by the scanner section 3 as a second printing process (copy process), and a print data file 551 as the image data memory means which stores transmitted print data to be printed as a first printing process (print process) from the port terminal 1A. Hereinafter, the first printing process is called a print process associated with the printer function of the multifunction apparatus 2, and the second printing process is called a copy process associated with the copy printer function of the multifunction apparatus 2. Further stored in the memory section 55 is a guidance information file 552 having stored first information, such as a guidance, procedure guidance, etc. relating to the print process or the first printing process, and second information, such as a guidance, procedure guidance, etc. relating to the copy process or the second printing process. Those guidance information are read out and output to the display section 54 or from an unillustrated sound output section by the CPU 51 as needed. Hereinafter, the first information is called information relating to a print process, and the second information is called information relating to a copy process.

A toner developing process will be discussed below. The photosensitive body 4C is supported rotatable in the direction of the arrow at nearly the center portion of the multifunction apparatus 2, and a charger 5C, such as a conductive brush applied with a predetermined voltage, for example, is provided at the photosensitive body 4C in a contactable manner, so that the top surface of the photosensitive body 4C is charged to a predetermined voltage by the charger 5C. An electrostatic latent image is formed on the photosensitive body 4C by irradiating image light modulated based on image data output from the copy data file 553 or the print data file 551 of the control section 50 onto the photosensitive body 4C from the optical scanning device 70 covered with a light shielding case.

A developer tank 7 where toner is stored supplies toner to the top surface of the photosensitive body 4C through a developer roller 7a to form the electrostatic latent image to a toner image. Thereafter, recording sheets P in a sheet feeding unit 100 are fed into a sheet feeding path one by one by the rotation of a sheet feed roller 120 prior to the rotation of the photosensitive body 4C. The fed recording sheet P is supplied to a resist roller 130 by the sheet feed roller 120. The sheet feeding unit 100 is provided with a plurality of sheet feeding cassettes 101, 102 and 103 according to the sizes of the recording sheets P, and a single sheet feeding cassette 101 (or sheet feeding cassette 102, 103) according to the size recognized by the recognition sensor 35s or the size of the recording sheet P input through the input section 53 by the user is selected.

The recording sheet P is stationary with the front end portion abutting on the resist roller 130, and rotates at a given timing to guide the recording sheet P toward the photosensitive body 4C. Then, the toner image carried on the photosensitive body 4C is transferred onto the top surface of the recording sheet P by a transfer unit 8 applied with a predetermined transfer bias. The transferred recording sheet P is heated and pressed while it passes through a fixing roller 140. Accordingly, the toner image is melted and fixed to the bottom side of the recording sheet P.

The recording sheet P with the toner image fixed thereto is fed by a sheet discharge roller 150 and is discharged onto a multi-level discharge tray 110 (111, 112, . . . , 11n, . . . ). In case of double side copying, after image formation on the top surface, after passing through the fixing roller 140, the sheet is fed to the resist roller 130 again and image formation at the back side is started at a given timing. The toner remaining on the photosensitive body 4C is cleaned off by a cleaning blade C1 of a cleaner C. Although the image forming section 6 only for one color (black) has been described to simply the description of the embodiment, image forming sections 6 as in a case of a color copy machine are prepared in tandem for the individual colors (cyan, magenta and yellow).

Next, the coin vendor 30 will be discussed. The coin vendor 30 comprises a control section 301 as control means, a communication port 303 which transmits and receives information to and from the multifunction apparatus 2, and a money deposition section 302 and a reader/writer 304 (money reading section) as valuable information detecting means. The money deposition section 302 is a deposition slot for receiving deposited money, and outputs valuable information according to the deposited amount of money (hereinafter called amount-of-money data) to the control section. The reader/writer 304 reads and detects amount-of-money data (valuable information) stored in the card 305, such as a magnetic card or an IC card, and outputs it to the control section 301. Although valuable information equivalent to money is described as amount-of-money data in the embodiment, it may be used as available rate data (e.g., one rate being 10 yen in case of monochromatic copy and 30 yen in case of color copy). Although the coin vendor 30 has both the money deposition section 302 and the reader/writer 304 as the valuable information detecting means in the embodiment, it may have one of them.

Note that the reader/writer 304 may detect amount-of-money data in the card 305 by non-contact. In this case, when a user brings the card 305 close to the reader/writer 304, amount-of-money data in the card 305 is read out, whereas when the user brings the card 305 out of a predetermined range, the state goes to a non-reading state, which is the same as the state when a card is ejected from a non-contact reader/writer. Amount-of-money data should not necessarily be stored in the card 305, but the mode may be such that only an identifier, such as a credit card number, is stored in the card, and, as needed, an access is made to the Web server 5 of a credit company or so based on the identifier to read and use amount-of-money data of the user corresponding to the identifier.

The control section 301 stores amount-of-money data, output from the money deposition section 302 or the reader/writer 304, into a RAM 306. When amount-of-money data is stored in the RAM 306, the control section 301 outputs the amount-of-money data to the CPU 51 of the control section 50 of the multifunction apparatus 2 via the communication port 303. Every time copying or printing ends, the multifunction apparatus 2 outputs information indicative of the end of copying or printing to the control section 301 of the coin vendor 30. The control section 301 decreases the amount-of-money data stored in the RAM 306 according to the number of copies or printouts, and generates (sets) absence information indicative of absence of amount-of-money data (hereinafter called absence flag) when the remaining amount of money becomes zero. In addition, even when a deposited money is paid back to execute an adjustment process by an unillustrated adjustment button, amount-of-money data in the RAM 306 is erased and the absence flag is generated. Furthermore, even when the card inserted from the reader/writer is ejected to execute an adjustment process, amount-of-money data in the RAM 306 is erased and the absence flag is generated.

When the absence flag is generated in the RAM 306, the control section 301 of the coin vendor 30 outputs the absence flag to the control section 50 of the multifunction apparatus 2. Although amount-of-money data stored in the RAM 306 and the absence flag are output to the control section 50 of the multifunction apparatus 2 from the control section 301 of the coin vendor 30 in the embodiment, this is not restrictive, and the CPU 51 of the multifunction apparatus 2 may access the RAM 306 of the coin vendor 30 at a regular cycle to check amount-of-money data and the state of generation of the absence flag. In the latter case, the details will be given in a second embodiment.

The hardware configuration of the port terminal 1A will be discussed next. As shown in the diagram, a RAM 12, a ROM 15, a communication port 16 of a LAN card or the like for transmission and reception of information to and from the multifunction apparatus 2, a display section 14, such as a liquid crystal display, and an input section 13, such as a touch panel, a keyboard and the like, in addition to a reader 1R, a money deposition section 19 and a print section 18 are connected to the CPU 11 by a bus 17. The CPU 11, which is connected to the individual hardware sections of the port terminal 1A by the bus 17, controls them and executes various software functions according to a control program 15P stored in the ROM 15.

A printer driver 151 for the multifunction apparatus 2 is installed in the ROM 15. When printing is done using the port terminal 1A, it is executed by outputting print data downloaded from a network album of the Web server 5 by the user's operating the input section 13, or print data read from a recording medium, such as a CD-ROM or a memory card, inserted in the reader 1R, to the multifunction apparatus 2. After print data is output to the multifunction apparatus 2, unique identification information for specifying print data, e.g., a 4-digit password or a bar code, from the print section 18 as identification information output means is printed on a receipt R1 as a recording sheet. The outputting of the identification information is not limited to the method of printing and outputting it onto the receipt R1, but may be carried out by a method of simply displaying identification information on the display section 14, or by transmitting identification information from an unillustrated infrared communication section to a cellular phone (not shown) or a PDA (Personal Digital Assistant; not shown) of a customer using communication means, such as Bluetooth.

In case where print data is printed by the multifunction apparatus 2, as the user inputs identification information printed on the receipt R1, or deposits a predetermined money or inserts the card 305 having amount-of-money data stored therein into the coin vendor 30, the print data corresponding to the identification information is read from the print data file 551 and printed.

Figure 4:
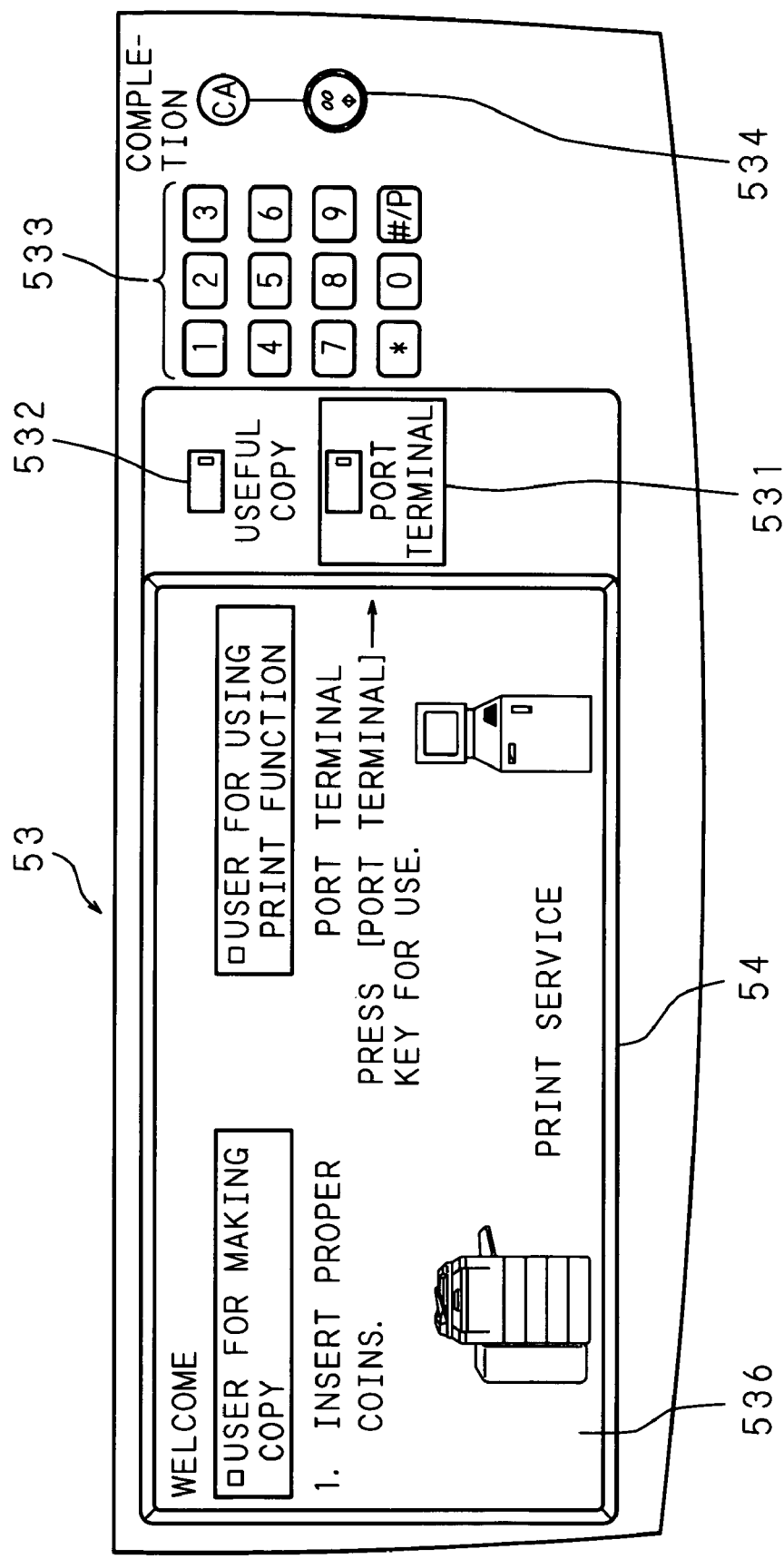
FIG. 4 is an explanatory diagram illustrating the images of a display section and an input section.

FIG. 4 is an explanatory diagram illustrating the images of the display section 54 and the input section 53. The input section 53 comprises a touch panel 536, a numerical keypad 533, etc. laminated on the display section 54. Information relating to a copy process (first information) and information relating to a print process (second information) are displayed on the display section 54 in FIG. 4 in such a way as to be recognized by a user at a time. In the information processing system according to the invention, when there is no print process command from the port terminal 1A, only information relating to a copy process is displayed, whereas only when there is a print process command from the port terminal and a copy process is not carried out, information relating to the copy process and information relating to a print process are displayed as shown in FIG. 4.

Figure 5:
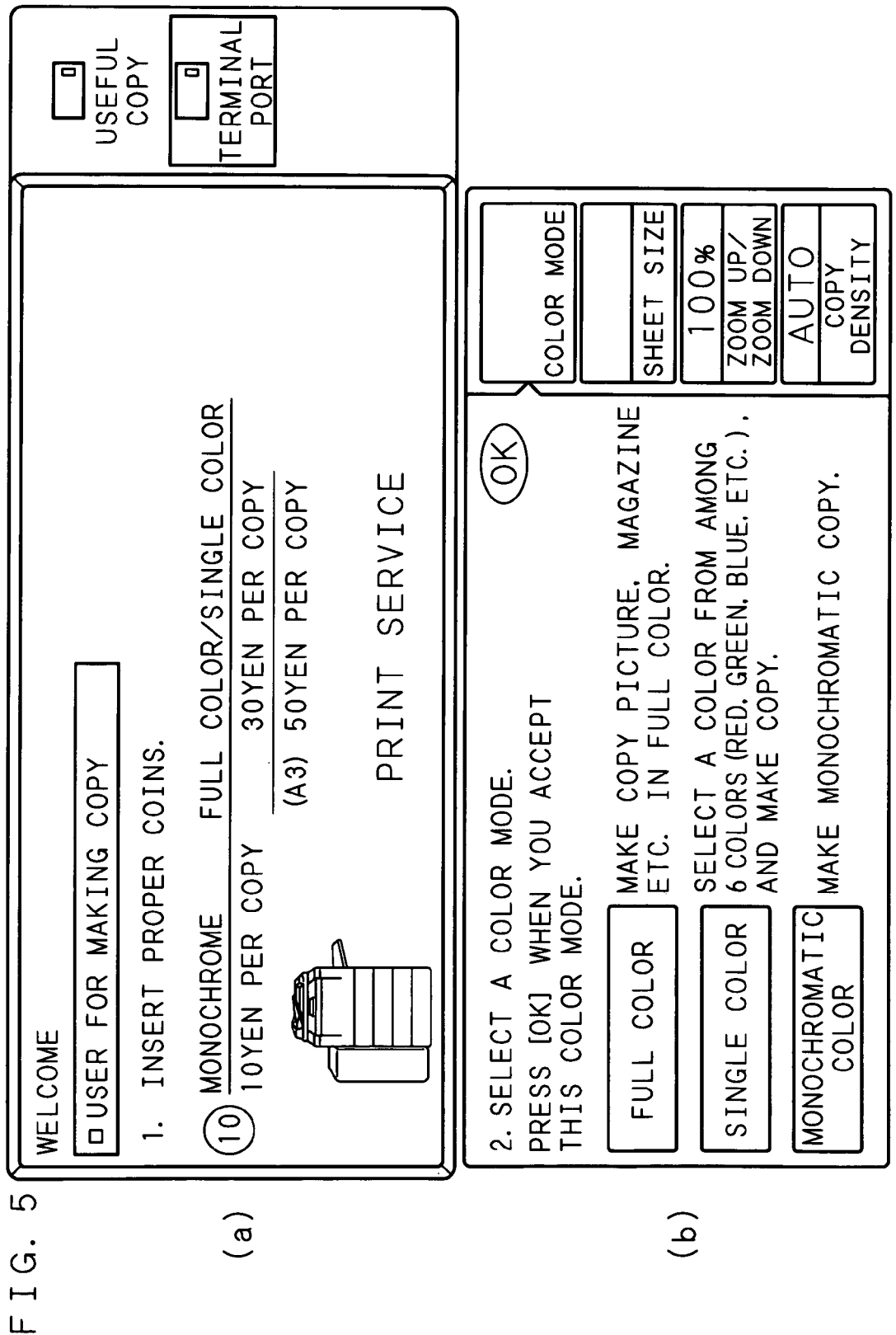
FIG. 5 is an image diagram illustrating the procedures of a copy process.

First, a description will be given of a process when a copy process command is received at the multifunction apparatus 2. FIGS. 5 through 14 are image diagrams illustrating the procedures of a copy process. FIG. 5(*a*) is a diagram showing a copy-process standby state when there is no print process command from the port terminal 1A. In the standby state in FIG. 5(a) or in case where a copy process command is received from the port terminal 1A as shown in FIG. 4, when a predetermined amount of money is deposited from the money deposition section 302 of the coin vendor 30 or when the card 305 where amount-of-money data is stored is inserted into the reader/writer 304, the amount-of-money data is output to the control section 301, which stores the amount-of-money data into the RAM 306.

When the control section 301 sends amount-of-money data to the CPU 51, a color mode screen as shown in FIG. 5(b) is displayed. The user inputs either full color or monochromatic color through the touch panel 536. FIG. 6(a) shows a state where full color is selected, and FIG. 6(b) shows a state where monochromatic color is selected. When monochromatic color is selected as shown in FIG. 6(b), information of a single color, such as red or green, is further displayed on the display section 54. Those information on a series of copy processes to be displayed on the display section 54 are stored in the guidance information file 552, and the CPU 51 reads an adequate file according to an instruction from the input section 53 and outputs it to the display section 54.

Figure 7:
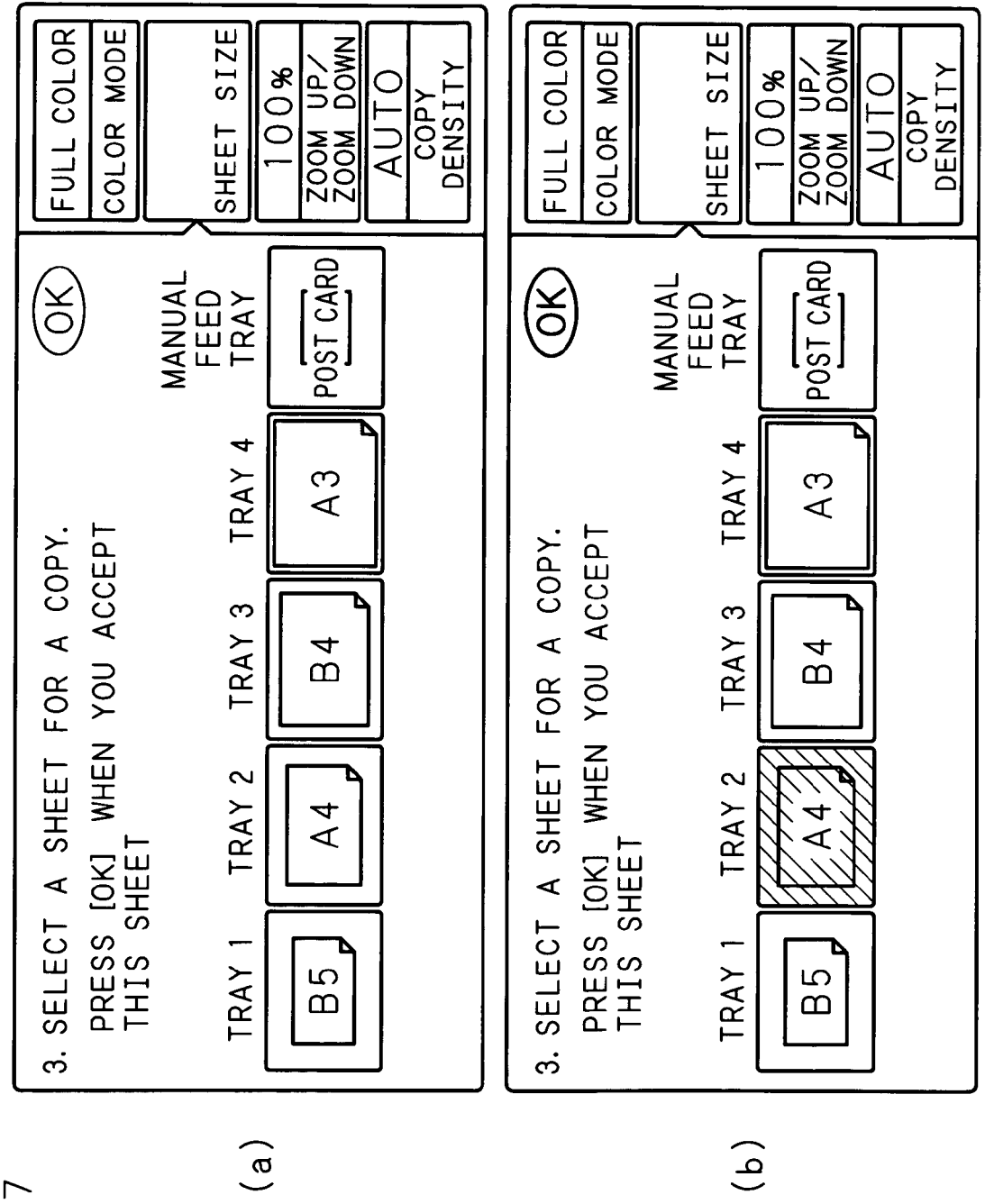
FIG. 7 is an image diagram illustrating the procedures of the copy process.
Figure 8:
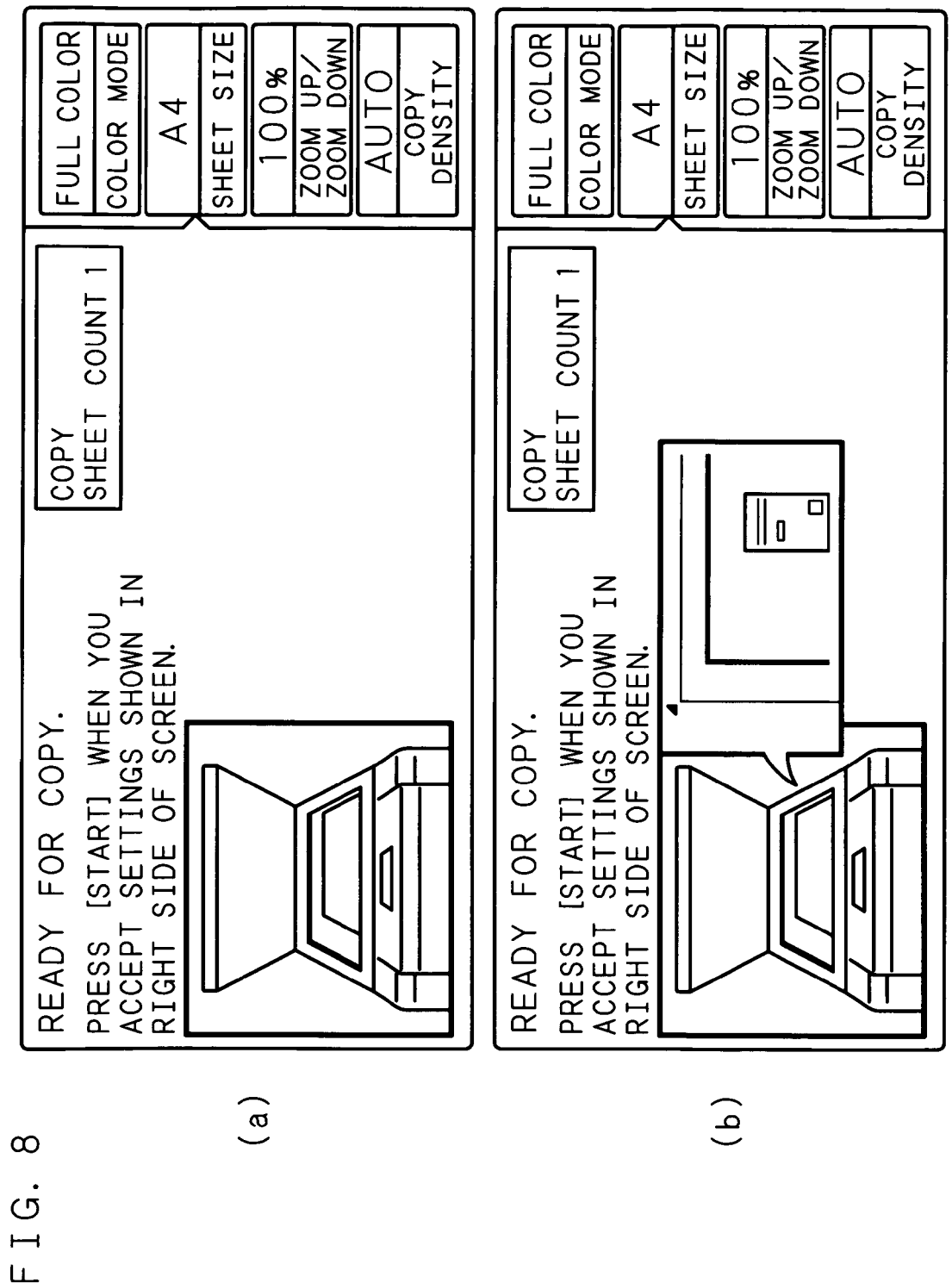
FIG. 8 is an image diagram illustrating the procedures of the copy process.
Figure 9:
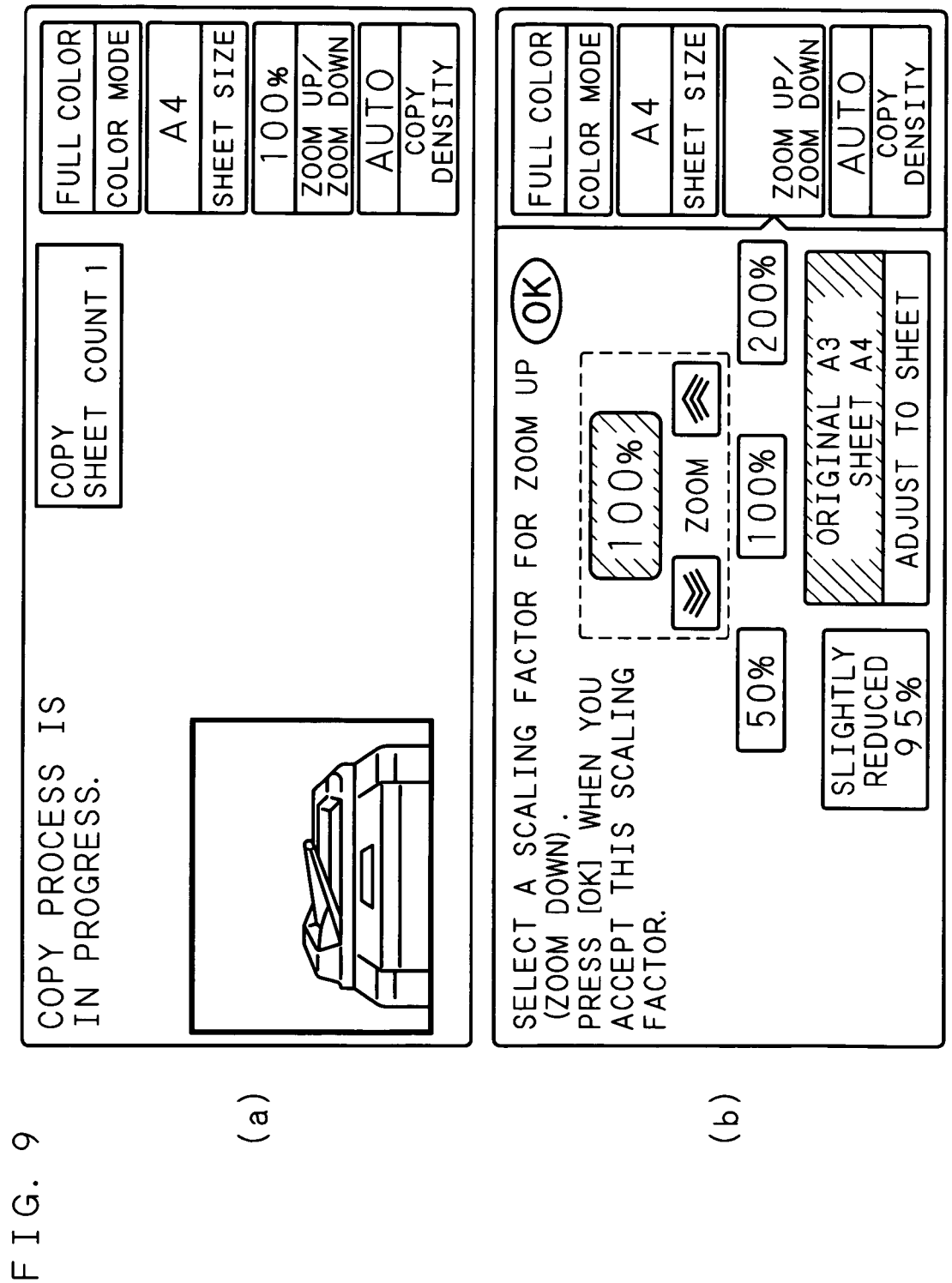
FIG. 9 is an image diagram illustrating the procedures of the copy process.
Figure 10:
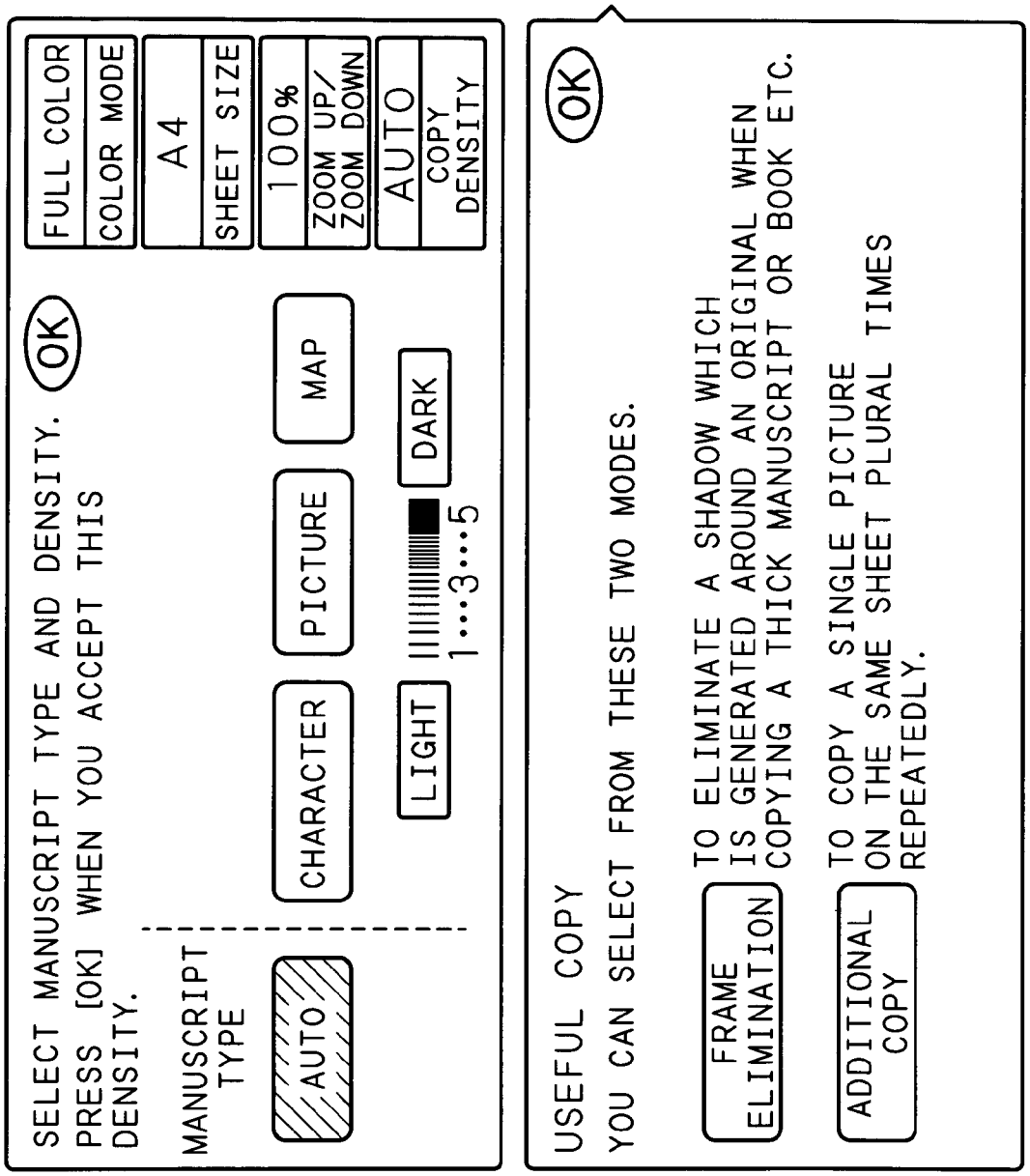
FIG. 10 is an image diagram illustrating the procedures of the copy process.
Figure 11:
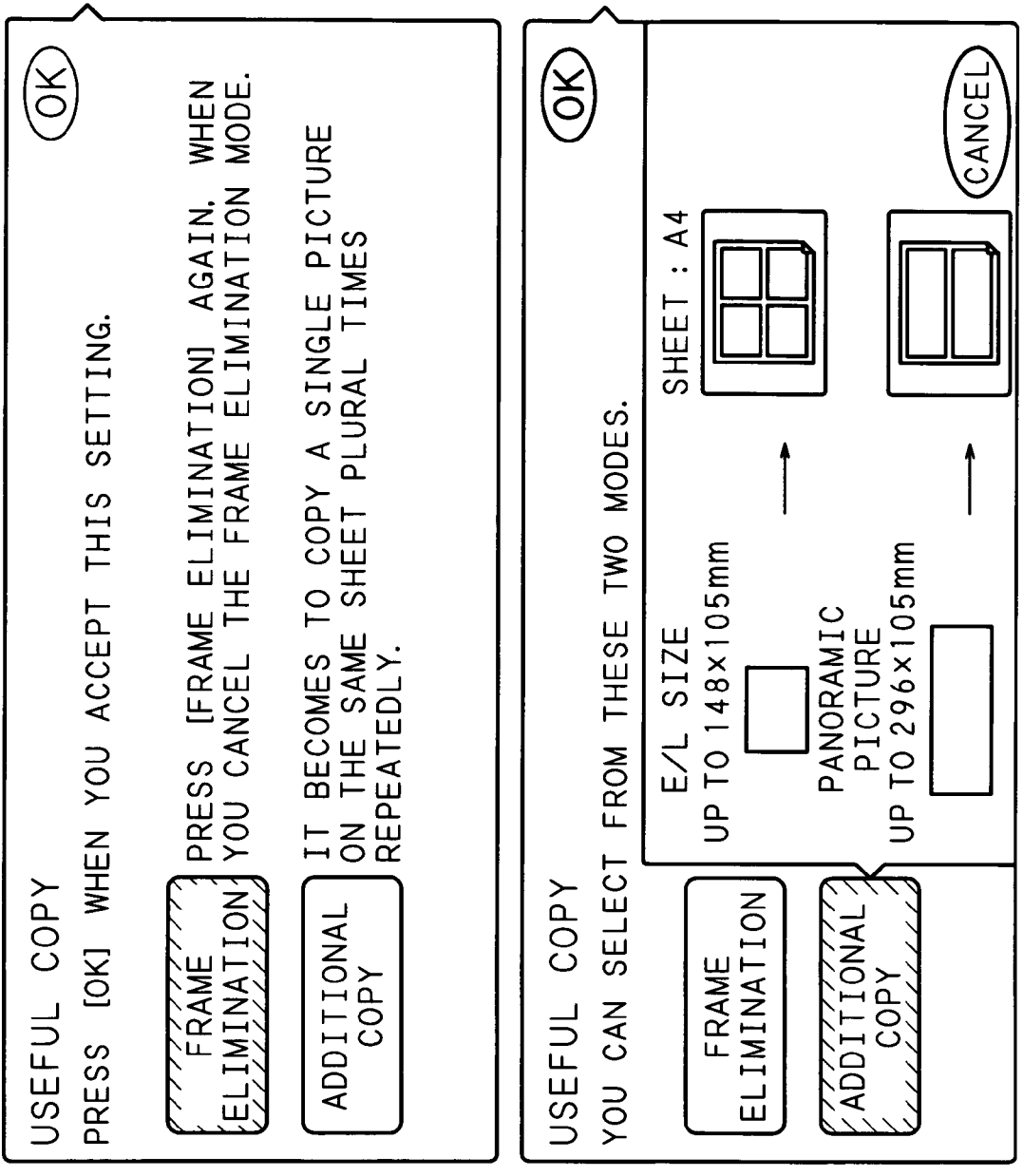
FIG. 11 is an image diagram illustrating the procedures of the copy process.

When selection of the color mode is finished, a sheet selecting menu is then displayed as shown in FIG. 7. The user selects the size of a sheet desired for a copy through the touch panel 536. In the example in FIG. 7(b), an A4 sheet is selected. Accordingly, a guidance screen showing that copying is ready to do is displayed as shown in FIGS. 8(a) and 8(b). Here, when a start button 534 of the input section 53 is depressed, copying is started and an image indicating that copying is underway is displayed as shown in FIG. 9(a). When zoom-up/down copying is to be carried out, a zoom-up/down button displayed on the display section 54 is input through the touch panel 536. This operation displays a screen for setting magnification as shown in FIG. 9(b). When the copy density is to be set, a button "Copy Density" displayed on the display section 54 is input through the touch panel 536. This operation displays a guidance for setting the density as shown in FIG. 10(a). As shown in FIG. 10(a), the user can input the type of an original from "character", "picture", "map" and "auto" according to the type of the original. In addition, the density is displayed in levels (density level 5 is the darkest and density level 1 is the lightest) in such a way that the density can be adjusted finely, allowing the user to select a preferred density. In this case, a numeral corresponding to the density is selected through the touch panel 536 or the numerical keypad 533.

When the user operates a useful copy button 532 shown in FIG. 4, a useful copy mode shown in FIG. 10(b) is displayed. In useful copy mode, two types of special copies, a frame elimination mode and an additional copy mode, are selectable. The frame elimination mode is used to eliminate a shadow which is generated around an original when copying a thick original or an original like a book. The user who wants frame elimination inputs a frame elimination button through the touch panel 536 as shown in FIG. 11(a). The additional copy mode is for repeatedly copy a single picture on the same sheet plural times, and a single picture is copied bisected or quadrisected on the sheet as shown in FIG. 11(b).

In the embodiment, as shown in FIG. 4 or FIG. 5(a), it is set that 10 yen per copy in case of monochromatic copy and 30 yen per copy for full color or single color (50 yen for the A3 sheet). For each copy process, the CPU 51 outputs amount-of-money data corresponding to a copy value in each mode mentioned above to the control section 301 of the coin vendor 30. When receiving amount-of-money data corresponding to a copy value, the control section 301 deducts the received amount-of-money data corresponding to the copy value from amount-of-money data stored in the RAM 306, and stores amount-of-money data after deduction in the RAM 306. When the amount-of-money data in the RAM 306 becomes zero as a result of deduction, the control section 301 generates the absence flag indicating that there is no amount-of-money data, in the RAM 306, and outputs the absence flag to the CPU 51.

When receiving the absence flag from the coin vendor 30, the CPU 51 displays information indicating that there is no remaining amount of money on the display section 54 as shown in FIG. 12(a). When deposited money is paid back through an unillustrated adjustment button, or when the inserted card 305 is ejected from the reader/writer 304, the absence flag is likewise generated in the RAM 306, and the control section 301 outputs the absence flag to the CPU 51. In case of receiving the absence flag, at the time of paying back money, the CPU 51 reads a screen indicating adjustment of the deposited money from the guidance information file 552 and displays it as shown in FIG. 12(b). At the time the card 305 is ejected, a screen indicating ejection of the inserted card 305 is read from the guidance information file 552 and is displayed as shown in FIG. 13(a).

Figure 12:
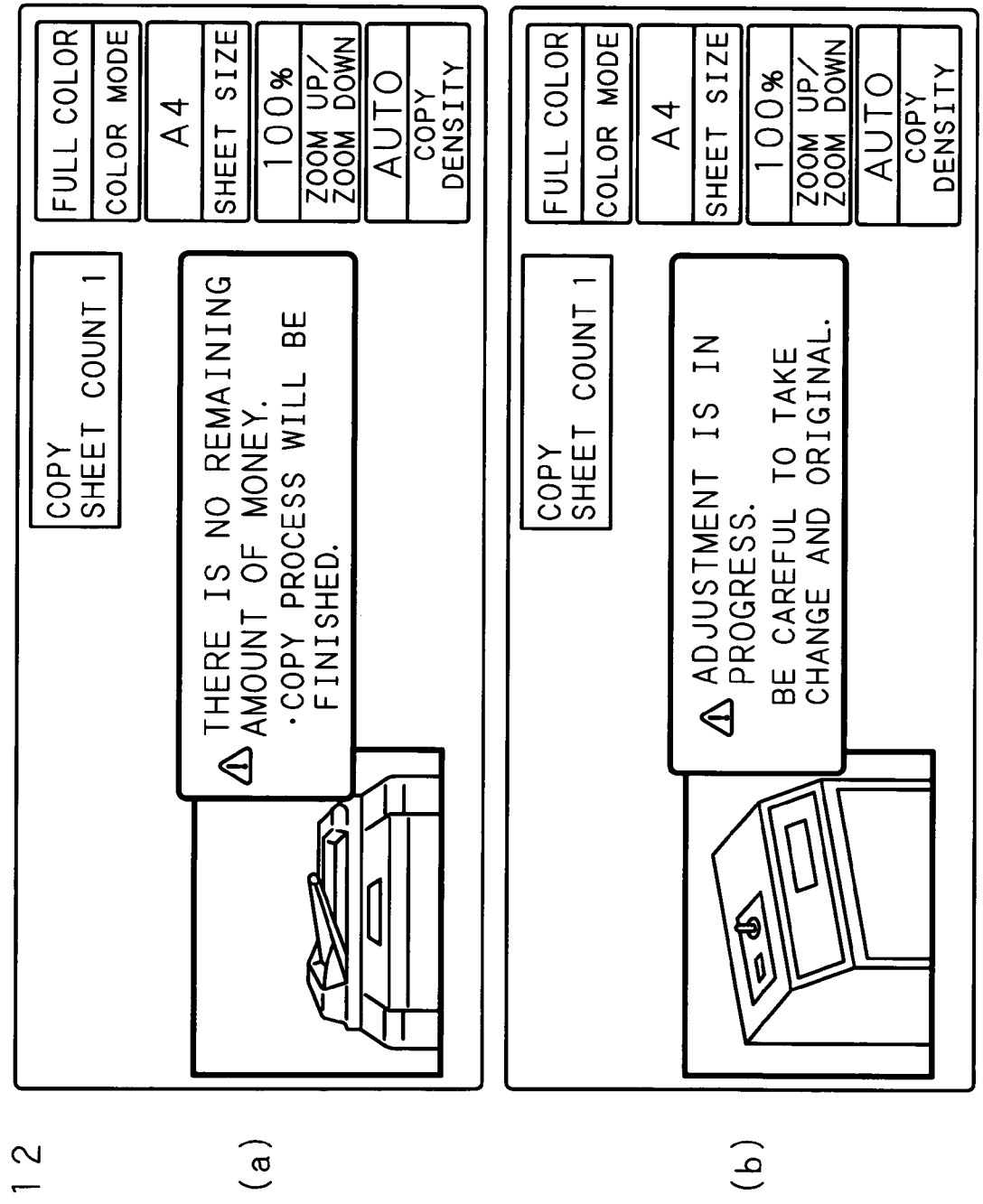
FIG. 12 is an image diagram illustrating the procedures of the copy process.

When a guidance for terminating the copy process after generation of the absence flag is displayed, as shown in FIG. 12 and FIG. 13(a), the CPU 51 invalidates image data in the copy data file 553. During invalidation, information relating to invalidation, such as the progress of invalidation, is read from the guidance information file 552 and is displayed on the display section 54 as shown in FIG. 13(b). The invalidation process should be done by, for example, overwriting random numbers or predetermined numbers (e.g., the value of consecutive 0's) in an area where target image data is stored. Although image data in the copy data file 553 is erased in the embodiment, image data temporarily stored in the RAM 52 at the time of outputting the image data to the image forming section 6 may be erased too.

Figure 14:
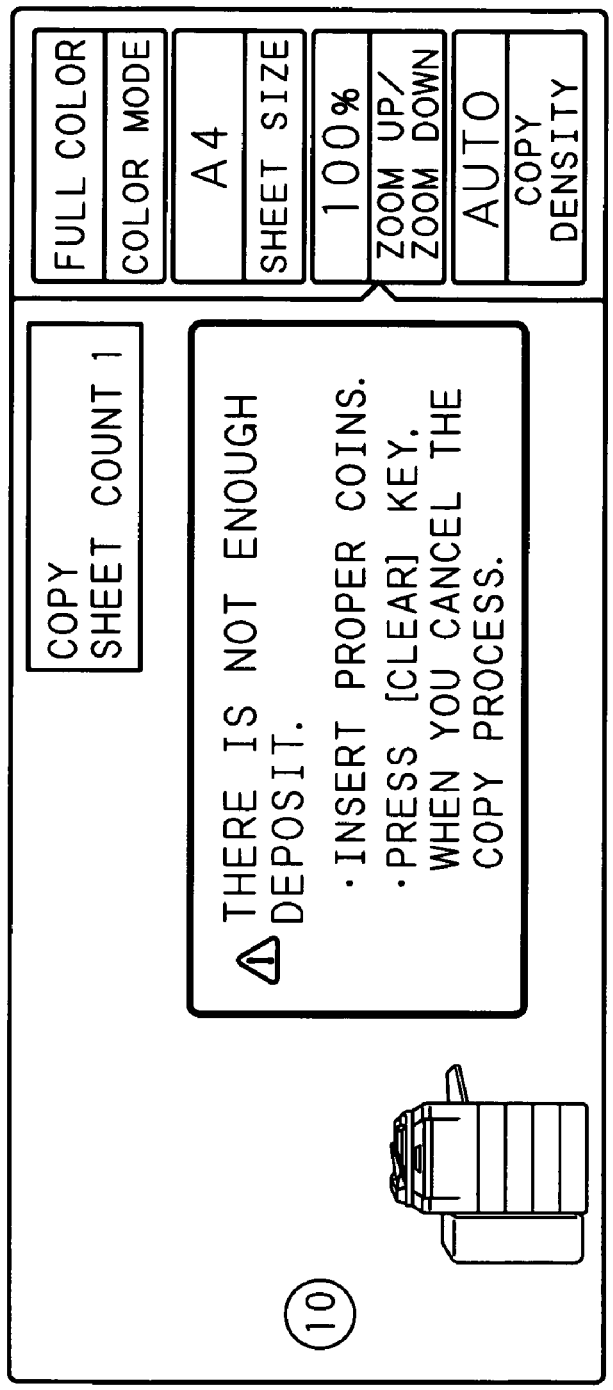
FIG. 14 is an image diagram illustrating the procedures of the copy process.

In case where the minimum amount of money needed is insufficient when copying is carried out in color mode, information indicating shortage of a charge is displayed on the display section 54 as shown in FIG. 14. The case of the shortage of a charge is such that amount-of-money data stored in the RAM 306 is 20 yen or 10 yen while, for example, the minimum amount of money needed for color copying is set to 30 yen. When amount-of-money data becomes insufficient, deposition of a predetermined amount of money through the money deposition section 302 or insertion of a card 305 given with new amount-of-money information causes amount-of-money data to be sent to the multifunction apparatus 2 again, thus permitting copying to continue.

Subsequently, a description will be given of a process after the print process command is sent from the port terminal 1A. Print data acquired from the Web server 5 or the like is added with unique identification information and sent to the multifunction apparatus 2, and the CPU 51 stores the sent print data in the print data file 551 in association with the identification information. FIG. 15 is an explanatory diagram illustrating the layout of records of the print data file 551. As shown in FIG. 15, the reception date, the file name of the print data, the history, etc. are stored in association with the identification information. Stored in the reception date field is information of the date where the CPU 51 has received print data from the port terminal 1A and has written the print data in the print data file 551. Stored in the print data (file name) field is print data, such as document data, image data and html data, sent from the port terminal 1A. Unique identification information of four digits is stored in the identification information field in association with the print data. Information on whether a print process has been finished or not is stored as a history in the history field. "Done" indicates that printing has already finished, and "not done" indicates that the print process has not completed yet and is standing by as a job.

When a copy process is not executed and when a print process command is received and new print data is stored into the print data file 551, as shown in FIG. 4, information relating to a copy process and information relating to a print process are evenly displayed with nearly the center portion of the display section 54 as the border. When the user inputs a port terminal button 531 here, a guidance for a print process is started.

Figure 17:
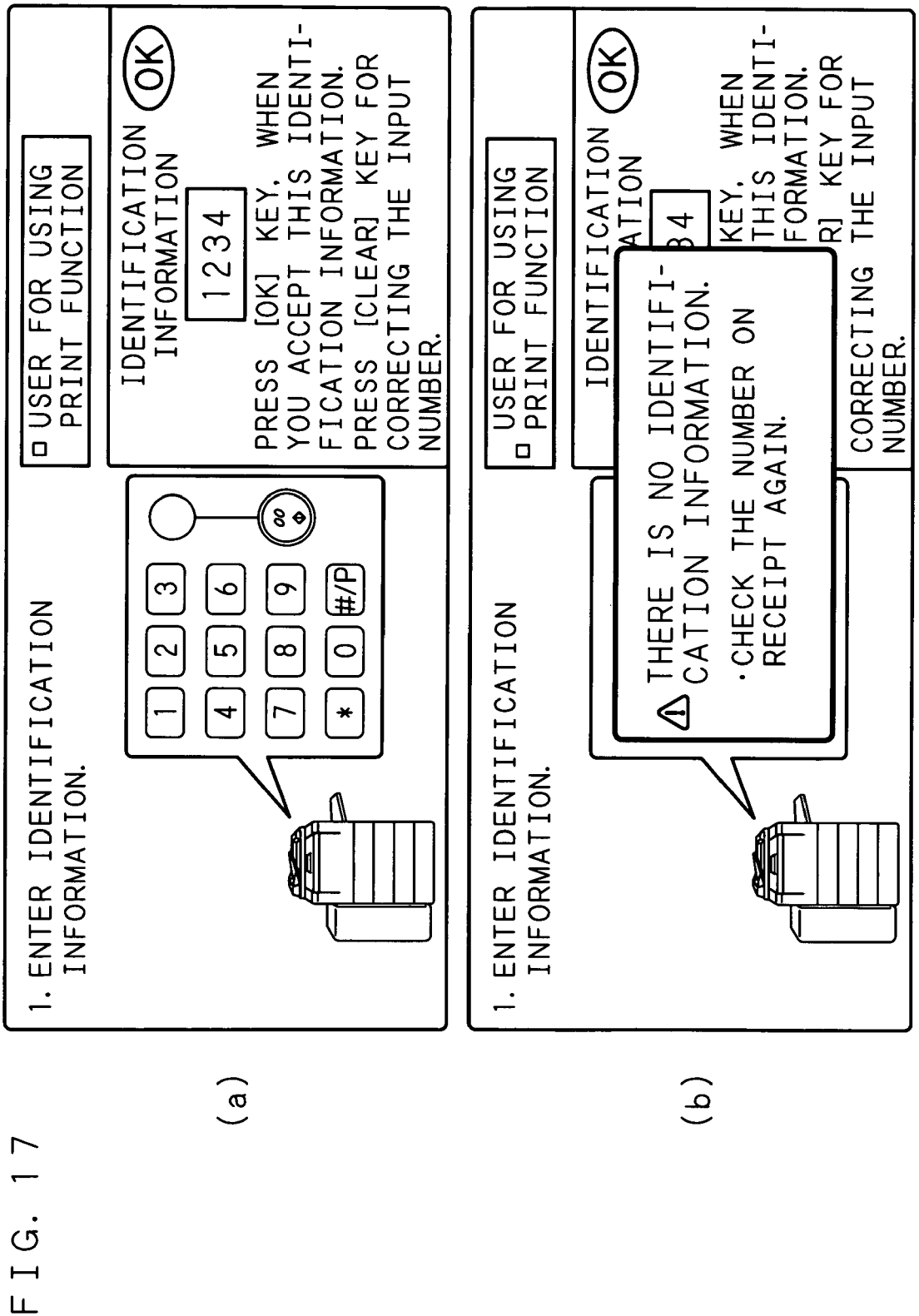
FIG. 17 is an image diagram illustrating the guiding procedures of the print process.

FIGS. 16 through 20 are image diagrams illustrating the guiding procedures of a print process. When the port terminal button 531 is input while information relating to a copy process and information relating to a print process are displayed, on the display section, first information relating to a print process alone is displayed on the display section 54 and a screen to request entry of identification information is displayed first, as shown in FIG. 16(*a*). The user inputs identification information printed on the receipt R1, output from the print section 18 of the port terminal 1A, through the numerical keypad 533. Through the operation of the numerical keypad 533 by the user, the identification information is displayed as shown in FIG. 16(*b*). When having finished inputting the identification information, the user inputs an "OK" button displayed on the display section 54 through the touch panel 536 as shown in FIG. 17(*a*). Although entry of identification information is received from the numerical keypad 533 as identification information reception means in the embodiment, such is not restrictive, and the multifunction apparatus 2 may be provided with a bar code reader as the identification information reception means to read a bar code as identification information printed on the receipt R1. Or, identification information may be transmitted and received to and from a cellular phone (not shown) by using an infrared reception section (not shown) having an infrared communication function or a communication module (not shown) having a Bluetooth function, which is provided at the multifunction apparatus 2.

The CPU 51 searches the print data file 551 based on the input identification information, and reads corresponding print data and starts printing it out. When there is no corresponding identification information, on the other hand, guidance information indicative of absence of identification information is displayed on the display section 54 as shown in FIG. 17(*b*). Those information relating to a print process, like information relating to a copy process, are stored in the guidance information file 552, and are read out from a corresponding file at the adequate timing and output to the display section 54 by the CPU 51.

The CPU 51 computes the amount of money needed to print print data associated with the read file, and displays the computed amount of money as shown in FIG. 18(*a*). As shown in FIG. 18(*a*), the CPU 51 displays the amount of money needed for printing, and reads a guidance to request deposition of money through the money deposition section 302 or insertion of the card 305 in the reader/writer 304 from the guidance information file 552 and displays it.

After the amount-of-money data is output to the CPU 51 from the control section 301 and the print process is started, guidance information indicating that printing is underway is displayed as shown in FIG. 18(*b*). After printing is finished, guidance information indicating that printing has finished is displayed as shown in FIG. 19(*a*). When amount-of-money data becomes zero through adjustment or ejection of the card, the control section 301 of the coin vendor 30 likewise generates the absence flag of amount-of-money data in the RAM 306, and outputs the absence flag to the CPU 51 of the multifunction apparatus 2. When the CPU 51 receives the absence flag, the CPU 51 invalidates image data in the print data file 551. During the invalidation process, information about invalidation, such as the progress status, is read from the guidance information file 552 and is displayed on the display section 54 as shown in FIG. 13(*b*).

Figure 20:
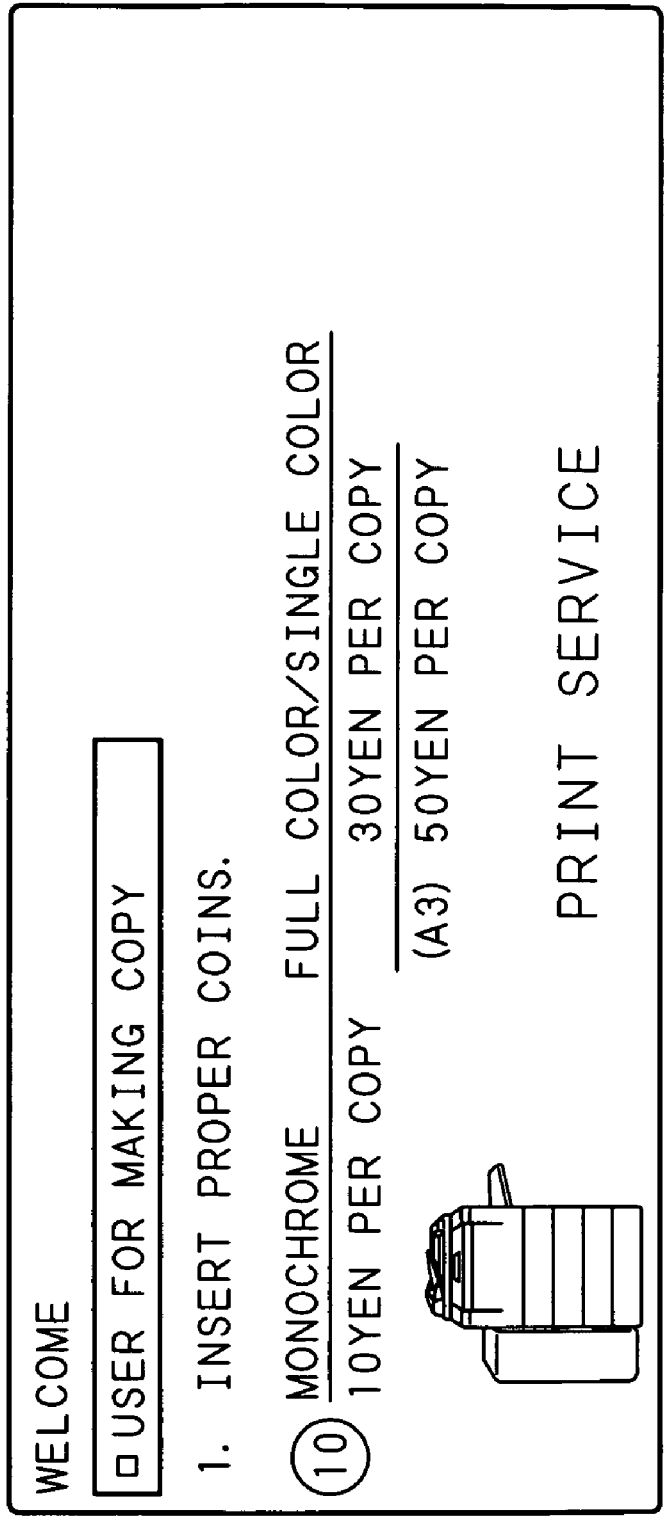
FIG. 20 is an image diagram illustrating the guiding procedures of the print process.

When the CPU 51 has received another print process command, i.e., when print data with the history "not done" is present in the print data file 551, the CPU 51 displays information relating to a print process and information relating to a copy process as shown in FIG. 19(*b*). When the CPU 51 has not received another print process command, i.e., when print data with the history "not done" is not present in the print data file 551, on the other hand, the CPU 51 displays only information relating to a copy process on the display section 54 as shown in FIG. 20.

Figure 21:
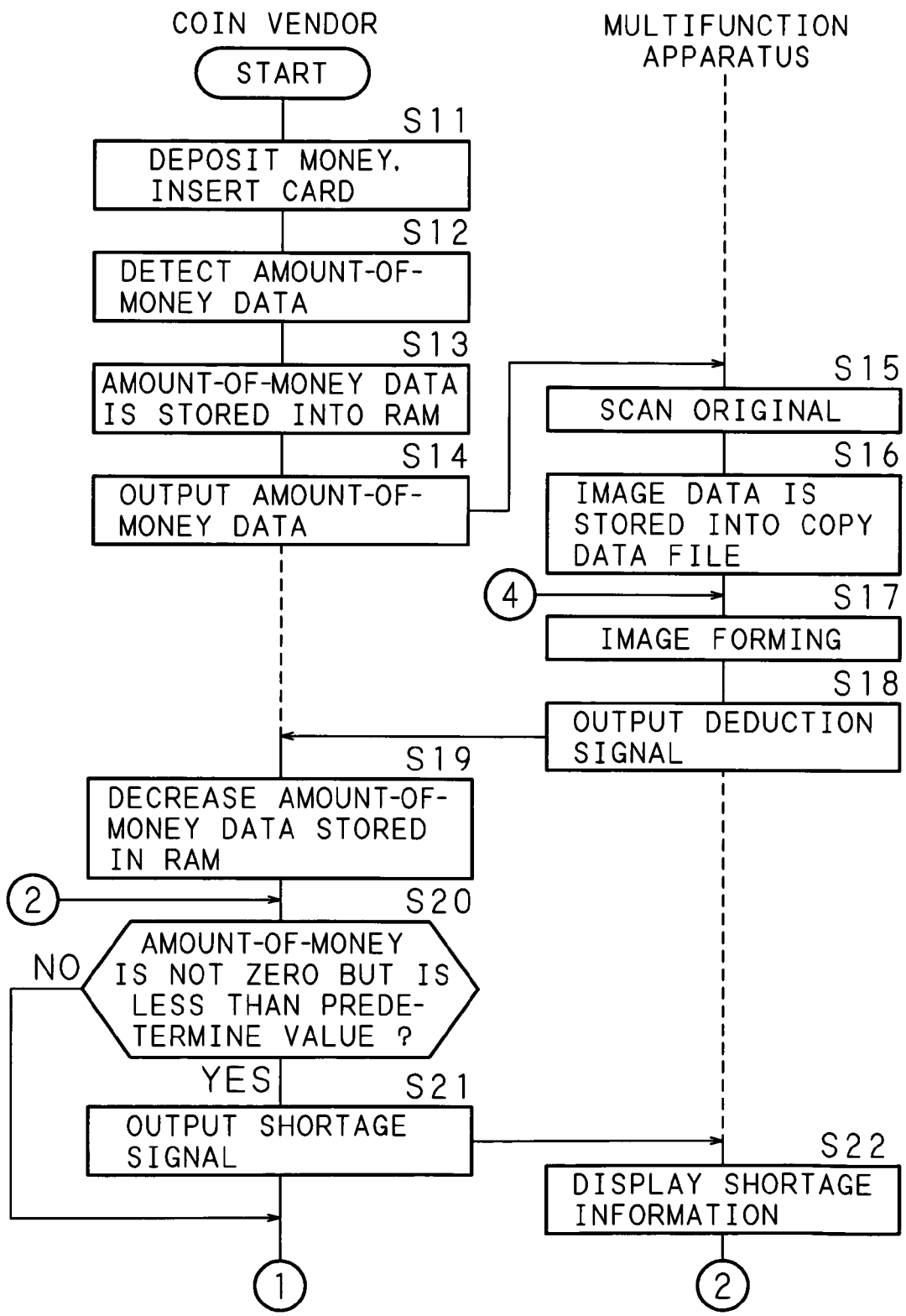
FIG. 21 is a flowchart illustrating the procedures of an invalidation process after copying.
Figure 22:
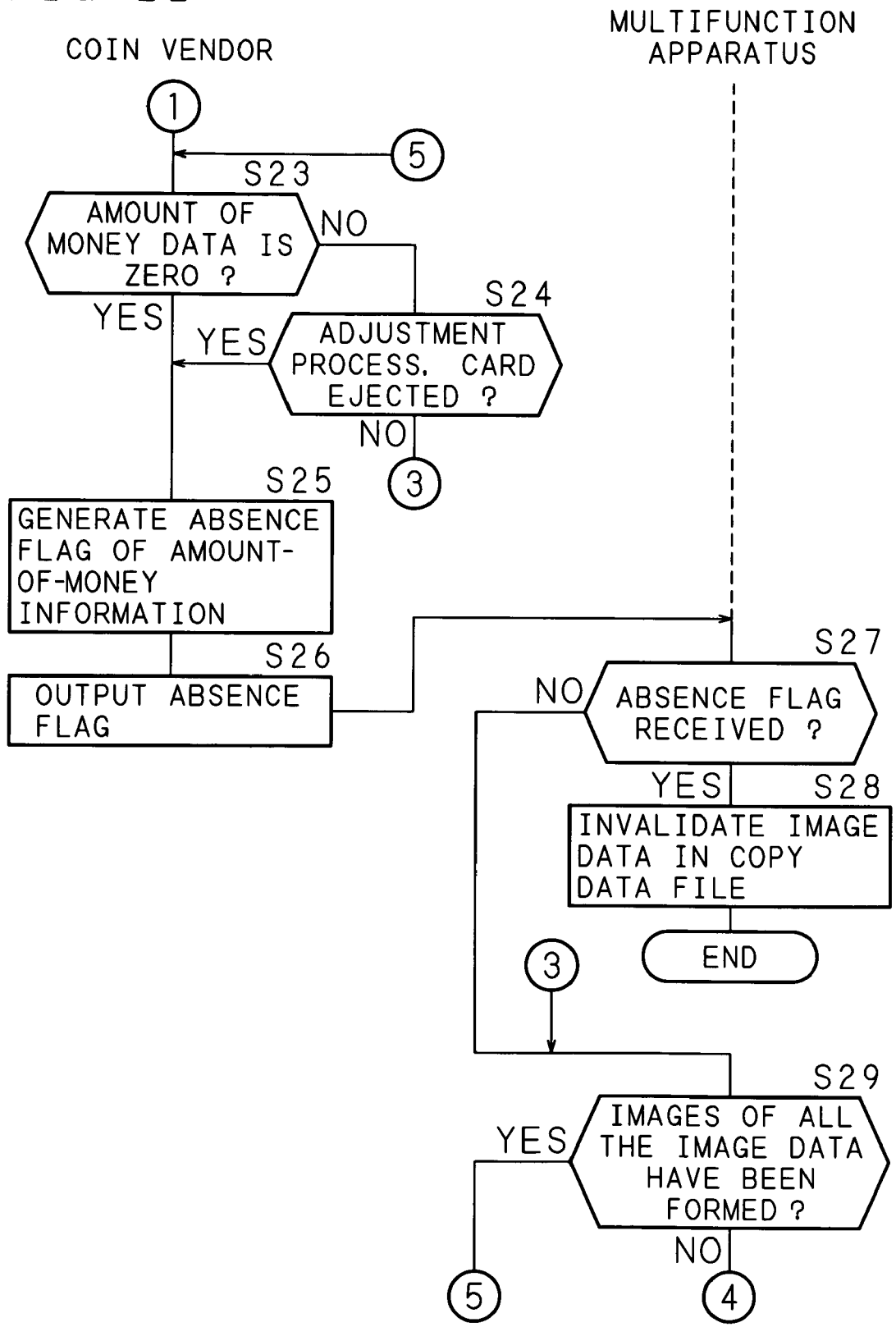
FIG. 22 is a flowchart illustrating the procedures of the invalidation process after copying.

The process procedures of the image processing system according to the invention with the above-described hardware configuration will be described referring to flowcharts. FIGS. 21 and 22 are flowcharts illustrating the procedures of an invalidation process after copying. First, the user deposits money in the money deposition section 302 or inserts the card 305 into the reader/writer 304 (step S11). The money deposition section 302 identifies the money and detects amount-of-money data corresponding to the deposited amount of money (step S12). The reader/writer 304 detects amount-of-money data stored in the inserted card 305. The amount-of-money data is output to the control section 301, which performs a process of storing the detected amount-of-money data into the RAM 306 (step S13). In case where the reader/writer 304 is of a non-contact type, amount-of-money data is detected when the card 305 is brought in within a predetermined range. When an identifier is detected instead of amount-of-money data, the identifier is output to the multifunction apparatus 2, which acquires amount-of-money data from the Web server 5 based on the identifier and outputs the acquired amount-of-money data to the coin vendor 30.

Figure 6:
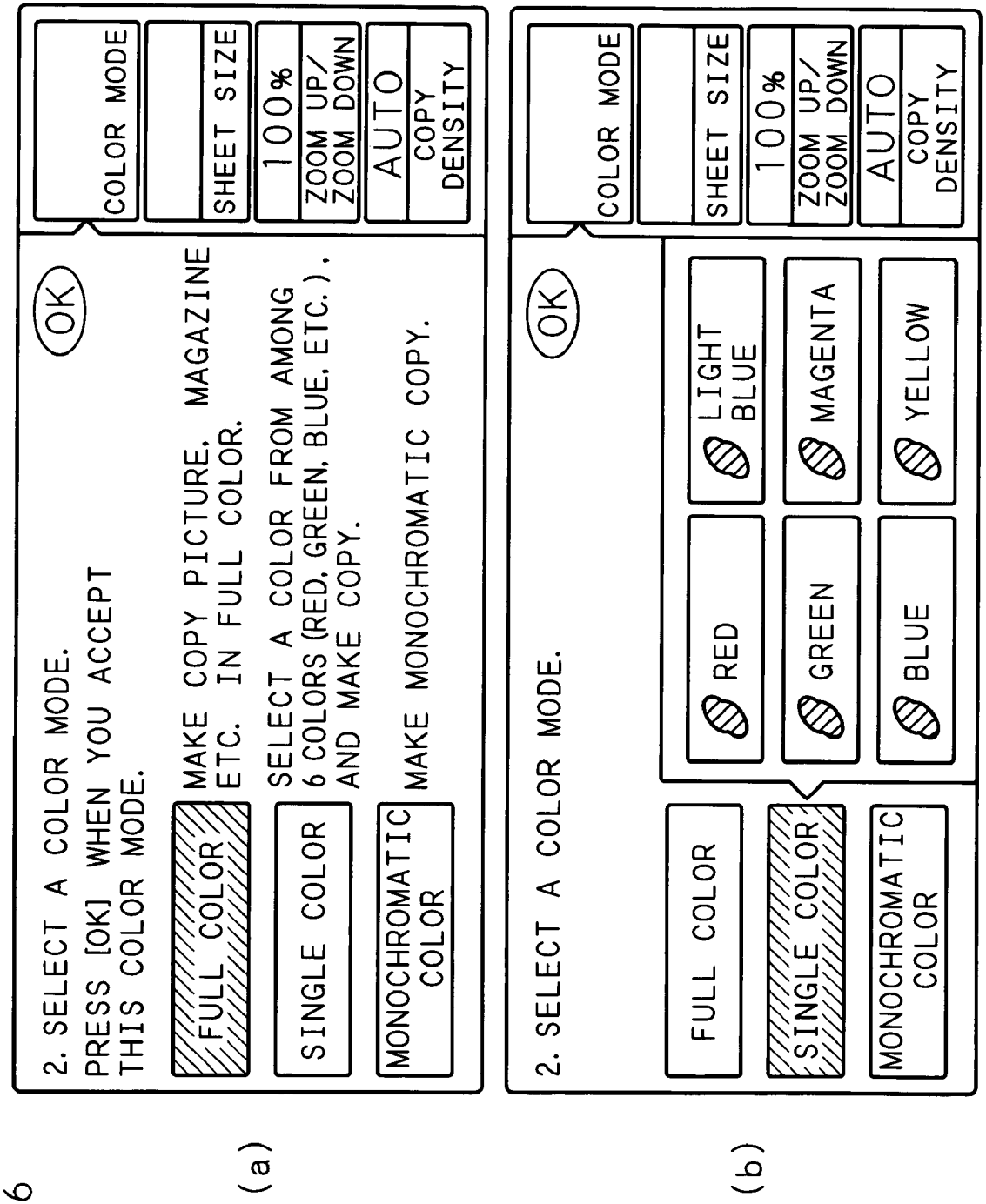
FIG. 6 is an image diagram illustrating the procedures of the copy process.

The control section 301 reads the stored amount-of-money data from the RAM 306 at the adequate timing and outputs it to the CPU 51 of the multifunction apparatus 2 (step S14). The CPU 51 reads information relating to a copy process from the guidance information file 552, and outputs it to the display section 54 as shown in FIG. 5, FIG. 6 and so forth. The user places an original on the document table 20 or sets an original to an unillustrated automatic original feeding device. When a read signal of the original is input from the input section 53, the scanner section 3 is driven to scan the original (step S15).

The CPU 51 stores image data digitized by the A/D converter 3A into the copy data file 553 (step S16). After the CPU 51 scans all the originals and stores all the image data into the copy data file 553, the CPU 51 reads adequate image data one after another and develops the data in the RAM 52, outputs the developed image data to the image forming section 6 to form an image (step S17). Every time single image formation is finished, the CPU 51 outputs a deduction signal of amount-of-money data to the coin vendor 30 (step S18). The deduction signal to be output is a signal corresponding to a unit price for copying, for example, "minus 10" for monochromatic copy and "minus 30" for color copy.

The control section 301 which has received the deduction signal performs a process of decreasing the amount-of-money data stored in the RAM 306 (step S19). When the card is inserted into the reader/writer 304, the amount-of-money data in the card in the reader/writer 304 is updated in synchronism with update of the amount-of-money data in the RAM 306. Then, the control section 301 determines whether or not the amount-of-money data after deduction is not zero but is less than a predetermined value (step S20). In this determination, when color copying with the unit price of 30 yen is carried out, for example, it is determined whether or not the remaining amount of money is not 0 yen but is less than 30 yen. When monochromatic copying with the unit price of 10 yen is carried out, it is determined whether or not the remaining amount of money is not 0 yen but is less than 10 yen.

When the amount-of-money data is not zero but is less than the predetermined value (S20: YES), the control section 301 sends the multifunction apparatus 2 a shortage signal indicating that the amount of money is short (step S21). For example, it is 10 yen or 20 yen for color copying, and 5 yen for monochromatic. The CPU 51 of the multifunction apparatus 2 reads guidance information indicating a short charge from the guidance information file 552 and displays it on the display section 54 as shown in FIG. 14 (step S22). When additional money is deposited after shortage information is displayed, the flow goes to step S20. When the amount-of-money data is zero or is not less than the predetermined value (S20: NO) (e.g., when the amount-of-money data is 0 yen or 300 yen), on the other hand, the control section 301 determines whether the amount-of-money data after deduction stored in the RAM 306 is zero or not (step S23).

When having decided that the amount-of-money data is not zero (S23: NO), the control section 301 determines whether or not the unillustrated adjustment button has been operated and an adjustment process has been executed or the unillustrated card ejection button has been operated and the card 305 has been ejected (step S24). When the adjustment button has been operated and when the card 305 has been ejected, money for the amount-of-money data stored in the RAM 306 or the card 305 is ejected and the amount-of-money data stored in the RAM 306 becomes zero. When the amount-of-money data is zero at step S23 (S23: YES) and when the adjustment process or card ejection has been done (S24: YES), the control section 301 generates (sets) the absence flag indicating that amount-of-money information is not present, in the RAM 306 (step S25). The process in case where the adjustment process or card ejection has not been done (S24: NO) will be discussed later. In case where the reader/writer 304 is of a non-contact type, when the card 305 is brought out of a predetermined range, the card 305 becomes a non-reading state which is the same as ejection of the card 305 at step S24.

The control section 301 outputs information indicating that the absence flag has been generated to the multifunction apparatus 2 (step S26). The CPU 51 of the multifunction apparatus 2 determines whether the information indicating that the absence flag has been generated has been received or not (step S27). When the information indicating that the absence flag has been generated has been received (S27: YES), the CPU 51 decides that the copy process by a user has been completed, and invalidates all the scanned image data including the image data in the copy data file 553 and the image data developed in the RAM 52 (step S28). During the invalidation process, information about invalidation is displayed as shown in FIG. 13(b). With regard to the invalidation process, which is carried out by a predetermined random number generating algorithm, the CPU 51 may execute a process of generating random numbers and overwriting it in the area in the copy data file 553 where the image data is stored, or overwriting a value of consecutive "0's" or "1's" in the area in the copy data file 553 where the image data is stored. The invalidation process (erasure process) of data is not limited to the above-described method, but the invalidation process (erasure process) may be executed using other known methods.

When the information indicating that the absence flag has been generated has not been received (S27: NO) and when an adjustment process or a card ejection process has not been done at step S24 (S24: NO), the copy process by a user has not been finished yet, so that the CPU 51 determines whether images of all the image data have been formed or not by referring to the image data stored in the copy data file 553 (step S29). When it is determined that images of all the image data have been formed (S29: YES), the flow goes to the step S23. When it is determined that images of all the image data have not been formed (S29: NO), on the other hand, the flow goes to the step S17 to newly read image data on the next page of the original from the copy data file 553 and perform image formation. As it is determined whether or not the copy process by a user has been finished by determining whether valuable information of the coin vendor fulfills a predetermined condition, i.e., according to the state of amount-of-money data, it is possible to prevent the contents of a copy by a user from being leaked to a third party.

Figure 23:
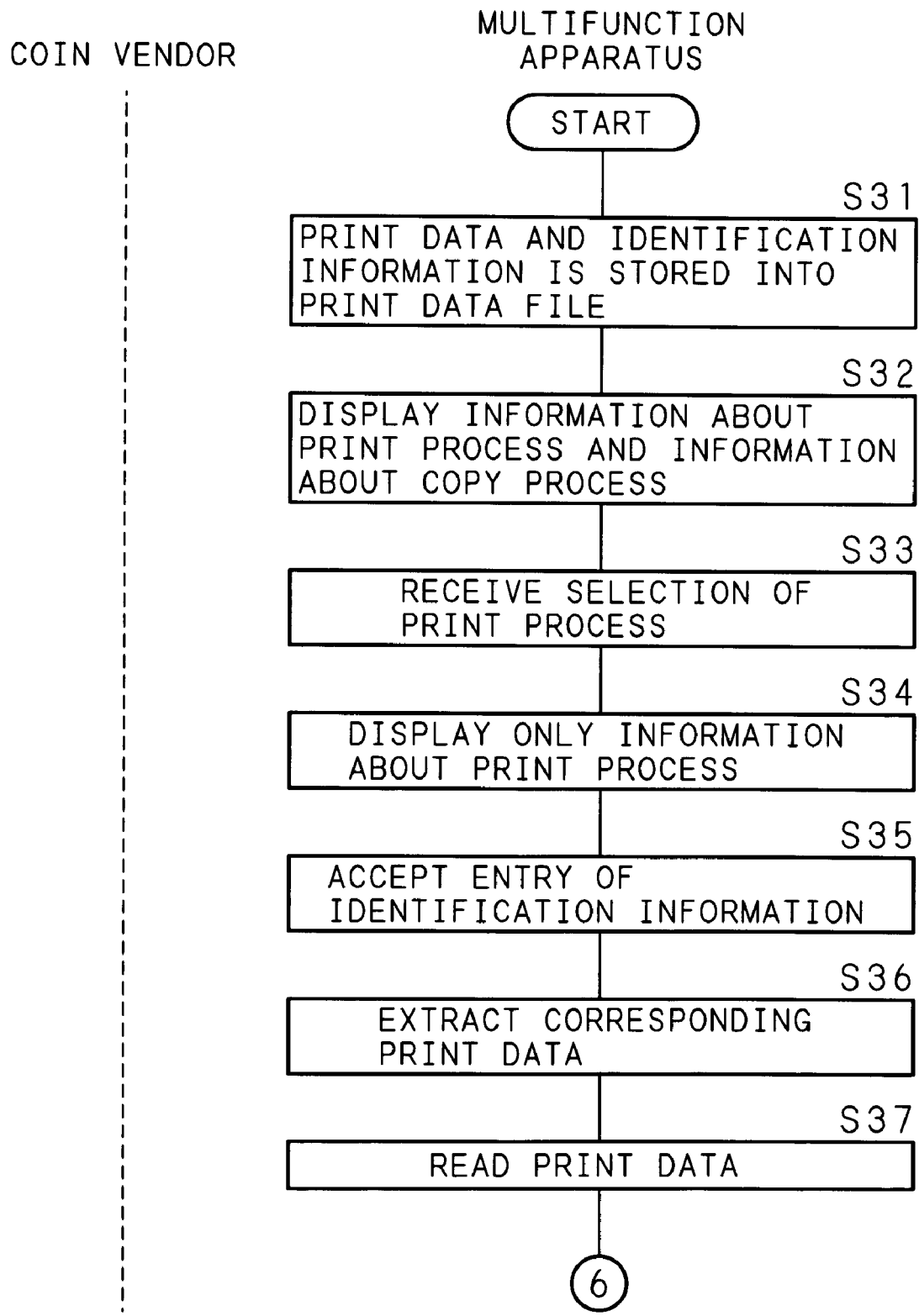
FIG. 23 is a flowchart illustrating the procedures of an invalidation process after printing print data.
Figure 24:
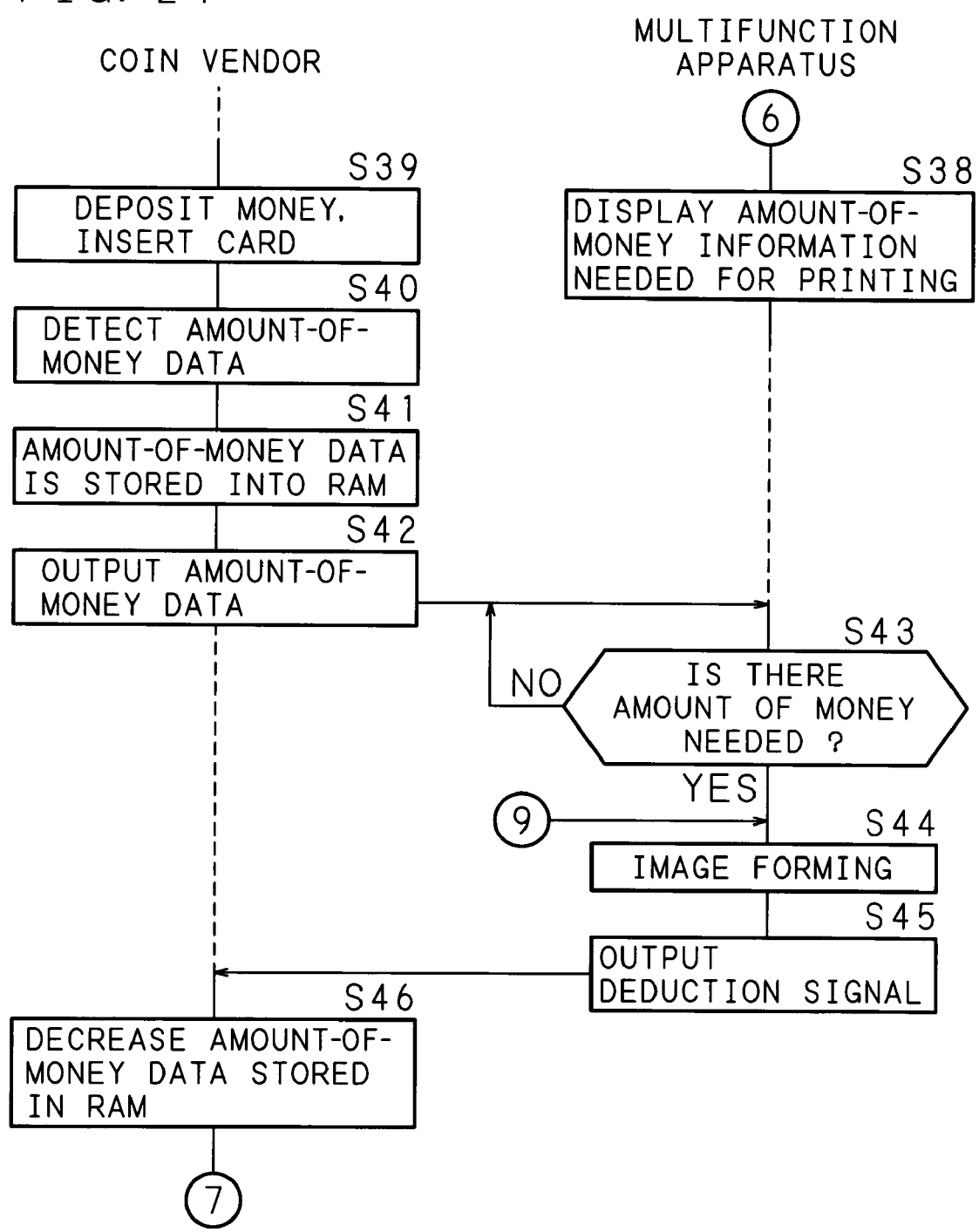
FIG. 24 is a flowchart illustrating the procedures of an invalidation process after printing the print data.
Figure 25:
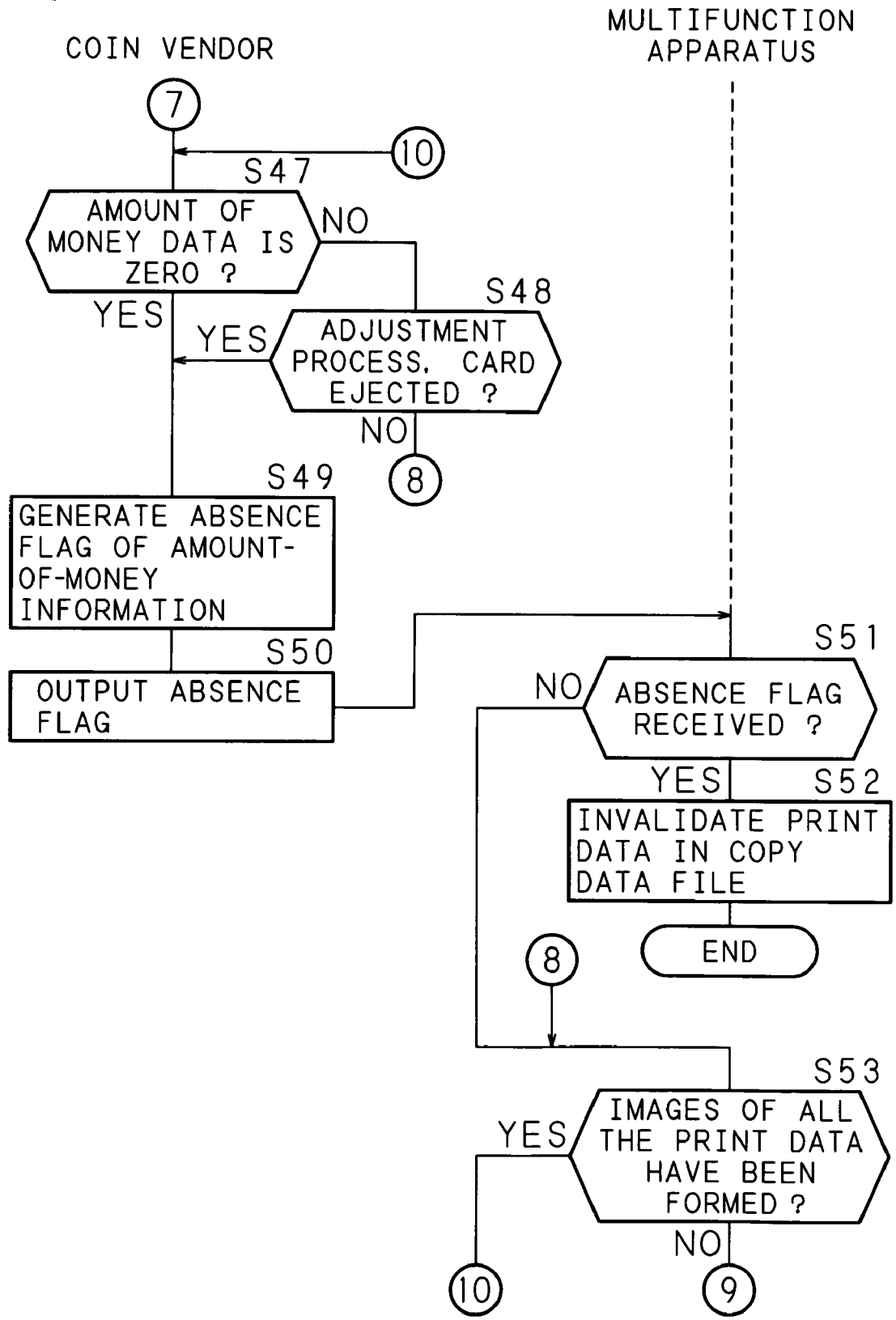
FIG. 25 is a flowchart illustrating the procedures of an invalidation process after printing the print data.

Next, a description will be given of the procedures of an invalidation process after print data (image data) output from the port terminal 1A is printed (image formation). FIGS. 23 through 25 are flowcharts illustrating the procedures of an invalidation process after printing print data. The user operates the input section 13 of the port terminal 1A to download image data or the like from the Web server 5, and outputs it as print data to the multifunction apparatus 2. Upon reception of a print command, the port terminal 1A generates print data and unique identification information to specify the print data and outputs them to the multifunction apparatus 2. The CPU 51 stores the print data and the identification information for specifying the print data, both sent from the port terminal 1A, into the print data file 551 as shown in FIG. 15 (step S31).

Subsequently, the CPU 51 reads information about a print process (first information) and information about a copy process (second information) from the guidance information file 552, and displays them in such a way that the user can view both information as shown in FIG. 4 (step S32). Although information relating to a print process and information relating to a copy process are displayed evenly with nearly the center portion of the display section 54 as the border in the embodiment, the embodiment is not restrictive and the layout may be determined freely.

After the copy process is initiated with information relating to the copy process and information relating to the print process displayed as shown in FIG. 4, guidance information as shown in FIGS. 5 to 13 is adequately read from the guidance information file 552 and is displayed on the display section 54 by the CPU 51. The CPU 51 determines whether selection as to whether or not execute the print process from the port terminal 1A has been received or not. Specifically, the CPU 51 determines whether an operation signal from the port terminal button 531 shown in FIG. 4 has been input or not.

When the selection of execution of the print process has been received (step S33), i.e., when an operation signal originated from the operation of the port terminal button 531 has been received, information relating to the copy process is removed (erased) from the display section 54 and only the information relating to the print process is displayed as shown in FIGS. 15 to 19 (step S34). Note that while the information relating to the copy process is removed, common information, such as information relating to the print process and time information, may be displayed. This can allow the user who wants the print process to efficiently execute the print process without confusion for irrelevant information is not displayed on the display section 54.

The CPU 51 displays information to prompt entry of identification information on the display section 54, and accepts the entry of the identification information through the numerical keypad 533 as shown in FIG. 16(a) (step S35). The user inputs the identification information through the numerical keypad 533 referring to the identification information printed on the receipt R1 generated by the print section 18 of the port terminal 1A. After accepting the entry of the identification information, the CPU 51 searches the print data file 551 to extract corresponding print data based on the input identification information (step S36). The CPU 51 reads the extracted print data on the RAM 52 (step S37).

The CPU 51 computes the amount of money needed for printing according to the number of pieces of the read print data, and displays it on the display section 54 as shown in FIG. 18(a). Specifically, the unit price per page (e.g., 10 yen) is multiplied by the number of sheets and the result is displayed (step S38). The user inserts the card 305 into the reader/writer 304 or deposits money into the money deposition section 302 (step S39). The money deposition section 302 detects amount-of-money data of the deposited money, or detects amount-of-money data by reading amount-of-money data stored in the card 305 (step S40).

The control section 301 stores the amount-of-money data detected by the money deposition section 302 or the reader/writer 304 into the RAM 306 (step S41). The control section 301 outputs the amount-of-money data to the CPU 51 of the multifunction apparatus 2 at a given timing (step S42). The CPU 51 determines whether there is the amount of money needed or not (step S43), i.e., determines whether amount-of-money data output from the coin vendor 30 matches with the amount of money computed at step S38 or not. When the needed amount of money is not present (S43: NO), the process at step S43 is regularly repeated until the needed amount of money is present. When the needed amount of money is present (S43: YES), on the other hand, the print data read at step S37 is printed (image-formed) (step S44).

When single image formation is completed, the CPU 51 outputs the deduction signal to the coin vendor 30 (step S45). The control section 301 which has received the deduction signal performs the process of decreasing the amount-of-money data stored in the RAM 306 (step S46). When a card is inserted in the reader/writer 304, the amount-of-money data of the card in the reader/writer 304 is updated in synchronism with update of the amount-of-money data in RAM 306. Then, the control section 301 determines whether the amount-of-money data after deduction is zero or not (step S47). When having decided that the amount-of-money data is not zero (S47: NO), the control section 301 determines whether or not the unillustrated adjustment button has been operated to do an adjustment process or the unillustrated card ejection button has been operated to eject the card 305 (step S48). When the adjustment button is operated, and when the card 305 is ejected, money for the amount-of-money data stored in the RAM 306 or the card 305 is ejected, and the amount-of-money data stored in the RAM 306 becomes zero. When the amount-of-money data stored in the RAM 306 is zero at step S47 (S47: YES) and the adjustment process or the ejection of the card is done (S48: YES), the control section 301 generates (sets) the absence flag indicating that the amount-of-money information is not present, in the RAM 306 (step S49). The process for the case where the adjustment process or the ejection of the card has not been done at step S48 (S48: NO) will be discussed later.

The control section 301 outputs information indicating that the absence flag has been generated to the multifunction apparatus 2 (step S50). The CPU 51 of the multifunction apparatus 2 determines whether information indicating that the absence flag has been received or not (step S51). When the information indicating that the absence flag has been generated has been received (S51: YES), the CPU 51 determines that the print process of one user is completed, and performs a process of invalidating printed print data in the print data file 551 (step S52). That is, the process of erasing the memory area in the print data file 551 where the print data extracted at step S36 is stored and the process of erasing the memory area in the RAM 52 where the print data has been developed at the time of printing are performed. During the invalidation process, information relating to invalidation is displayed as shown in FIG. 13(b). Likewise, the CPU 51 outputs an invalidation signal to the port terminal 1A. When print data corresponding to the print data erased by the multifunction apparatus 2 is stored in the ROM 15 or the RAM 12, the port terminal 1A likewise performs the process for invalidation.

When the information indicating that the absence flag has been generated has not been received (S51: NO), and when the adjustment process or the card ejection process has not been done at step S48 (S48: NO), the print process by one user has not been finished yet and the CPU 51 determines whether or not image formation of all the print data has been done by referring to the print data read at step S37 (step S53). When it is determined that image formation of all the print data has been done (S53: YES), the flow goes to step S47. When it is determined that image formation of all the print data has not been done (S53: NO), on the other hand, the flow goes to step S44 to do image formation of print data of the next page.

After printing of all the pages is completed, considering that the job has been completed, the CPU 51 performs a process of rewriting the information in the history field relating to the corresponding print data in the print data file 551 from "not done" to "done". When there is no corresponding print data, information to prompt the entry of identification information through the numerical keypad 533 is displayed again on the display section 54 as shown in FIG. 17(b).

As identification information is printed on the receipt R1 and print data of a plurality of users is managed using the identification information this way, it is possible to prevent a plurality of users from erroneously printing other persons' print data. After the process at step S52, the CPU 51 determines whether there is another print process command in the print data file 551 or not. Specifically, the CPU 51 determines whether there is a history "not done" or not by referring to the history field in the print data file 551. When there is another print process command, i.e., when "not done" is present in the history field, the flow goes to step S32 to display information relating to the copy process and information relating to the print process again as shown in FIG. 4, and the above-described processes will be repeated. When another print process command is not present, i.e., when "not done" is not present in the history field, only information relating to the copy process is displayed on the display section 54 as shown in FIG. 5(a).

Second Embodiment

Although amount-of-money data or the absence flag or the like is output to the multifunction apparatus 2 from the coin vendor 30 in the first embodiment, the multifunction apparatus 2 may regularly accesses the coin vendor 30 and checks if there is amount-of-money data or the absence flag or the like as in the second embodiment. The contents will be elaborated below.

Figure 26:
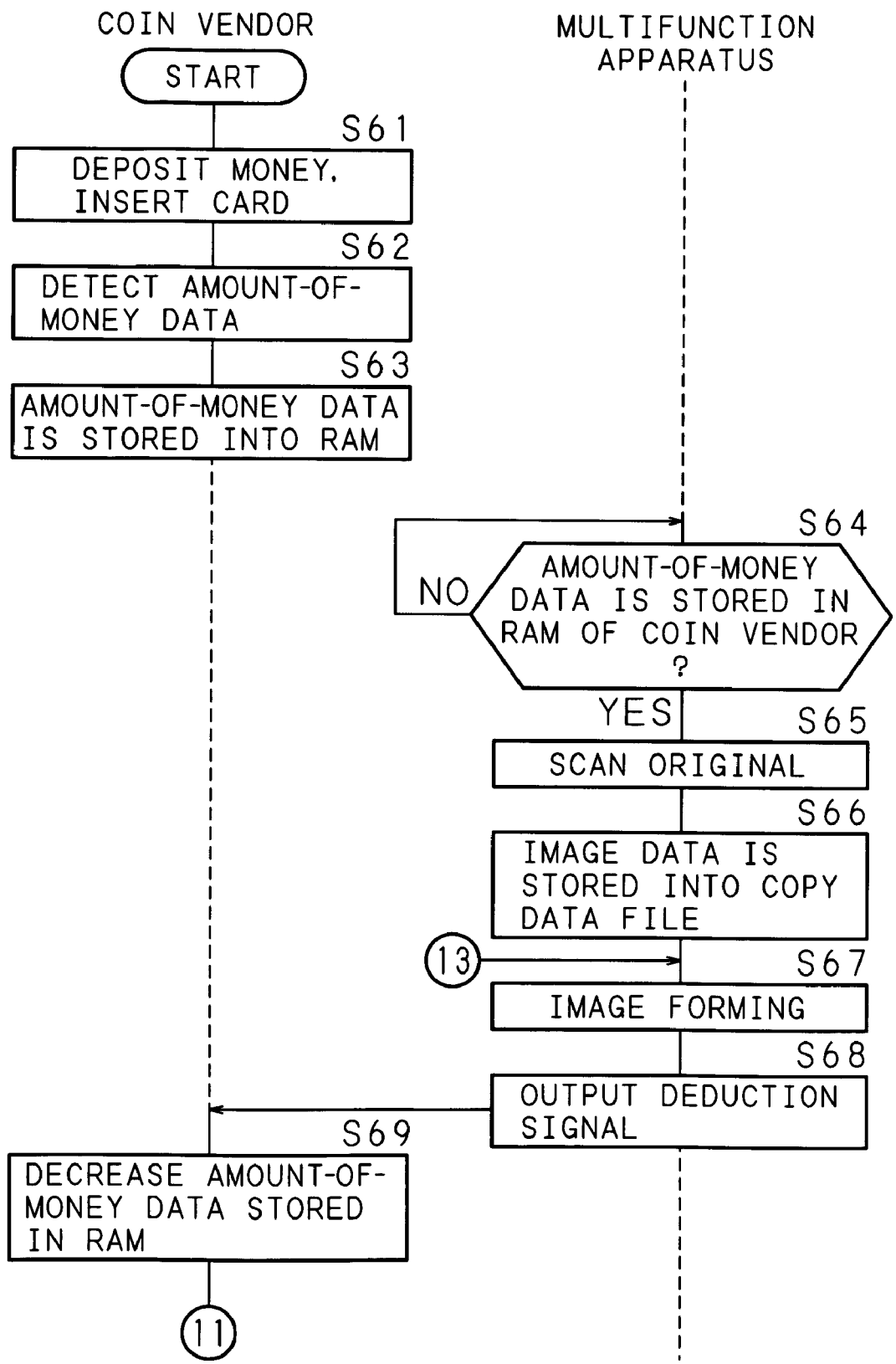
FIG. 26 is a flowchart illustrating the procedures of an invalidation process according to a second embodiment.
Figure 27:
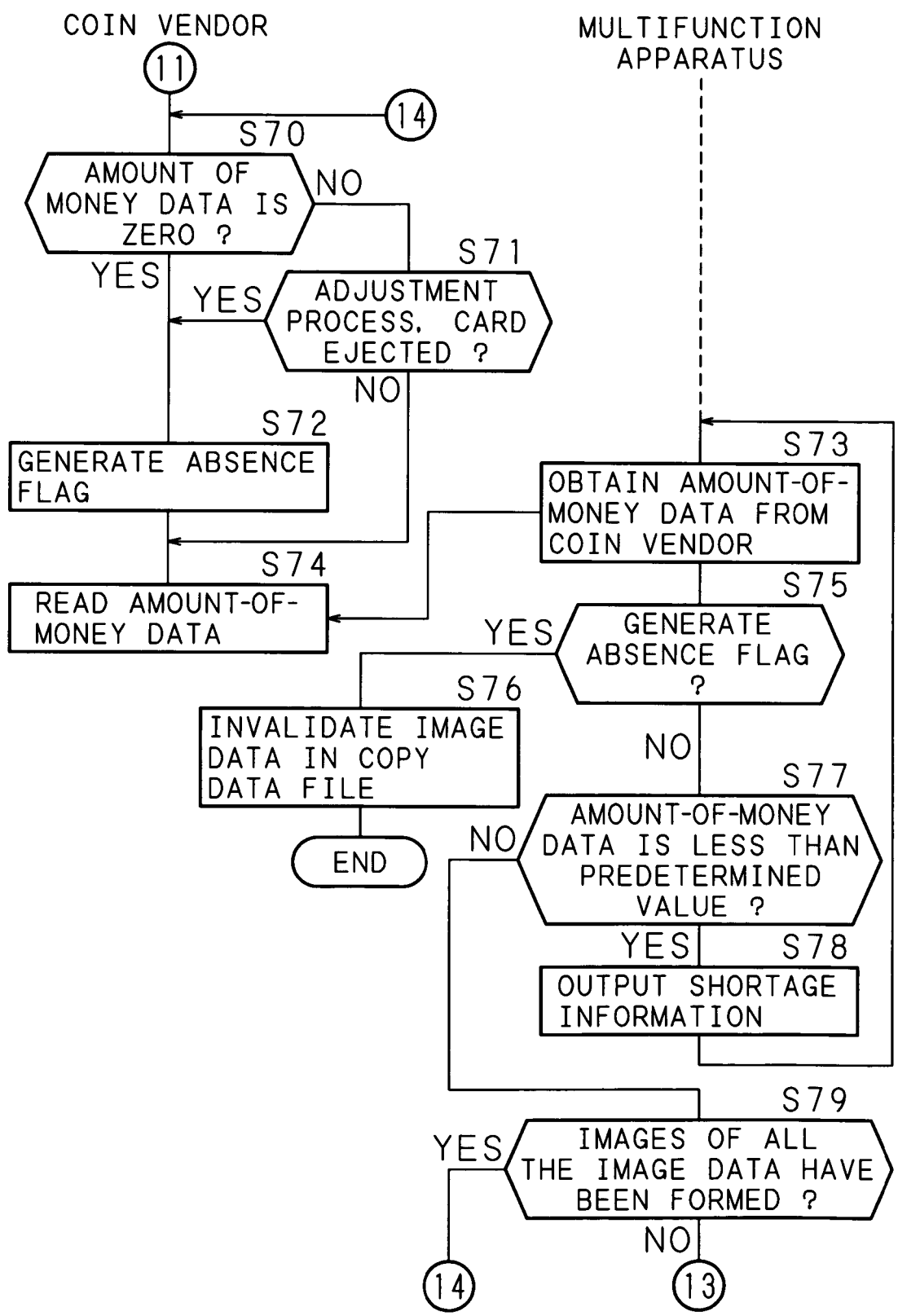
FIG. 27 is a flowchart illustrating the procedures of the invalidation process according to the second embodiment.

FIGS. 26 and 27 are flowcharts illustrating the procedures of an invalidation process according to the second embodiment. First, the user deposits money in the money deposition section 302 or inserts the card 305 into the reader/writer 304 (step S61). The money deposition section 302 identifies the money and detects amount-of-money data corresponding to the deposited amount of money (step S62). The reader/writer 304 detects amount-of-money data stored in the inserted card 305. The amount-of-money data is output to the control section 301, which performs a process of storing the detected amount-of-money data into the RAM 306 (step S63).

The CPU 51 of the multifunction apparatus 2 regularly accesses the RAM 306 of the coin vendor 30 to determine whether amount-of-money data is stored or not (step S64). When amount-of-money data is not stored (S64: NO), the process at step S64 is repeatedly and regularly executed. When it is determined that amount-of-money data is stored in the RAM 306 (S64: YES), on the other hand, the CPU 51 reads information relating to a copy process from the guidance information file 552, and outputs it to the display section 54 as shown in FIG. 5, FIG. 6 and so forth. The user places an original on the document table 20 or sets an original to an unillustrated automatic original feeding device. When a read signal of the original is input from the input section 53, the scanner section 3 is driven to scan the original (step S65).

The CPU 51 stores image data digitized by the A/D converter 3A into the copy data file 553 (step S66). After the CPU 51 scans all the originals and stores all the image data into the copy data file 553, the CPU 51 reads adequate image data one after another and develops the data in the RAM 52, outputs the developed image data to the image forming section 6 to form an image (step S67). Every time single image formation is finished, the CPU 51 outputs the deduction signal of amount-of-money data to the coin vendor 30 (step S68).

The control section 301 which has received the deduction signal performs a process of decreasing the amount-of-money data stored in the RAM 306 (step S69). When the card is inserted into the reader/writer 304, the amount-of-money data in the card in the reader/writer 304 is updated in synchronism with update of the amount-of-money data in the RAM 306. Then, the control section 301 determines whether the amount-of-money data after deduction is zero or not (step S70).

When having decided that the amount-of-money data is not zero (S70: NO), the control section 301 determines whether or not the unillustrated adjustment button has been operated and an adjustment process has been executed or the unillustrated card ejection button has been operated and the card 305 has been ejected (step S71). When the adjustment button has been operated and when the card ejection button has been operated, money for the amount-of-money data stored in the RAM 306 or the card 305 is ejected and the amount-of-money data stored in the RAM 306 becomes zero. When the amount-of-money data is zero at step S70 (S70: YES) and when the adjustment process or card ejection has been done (S71: YES), the control section 301 generates (sets) the absence flag indicating that amount-of-money information is not present, in the RAM 306 (step S72). When the adjustment process or card ejection has not been done at step S71 (S71: NO), deducted amount-of-money data is held in the RAM 306. When the absence flag has been generated at step S72, amount-of-money data is not present in the RAM 306 but the absence flag is stored therein.

After a given time elapses, the CPU 51 of the multifunction apparatus 2 accesses the RAM 306 of the coin vendor 30 and executes a process of obtaining amount-of-money data (step S73). The control section 301 of the coin vendor 30 outputs amount-of-money data to the multifunction apparatus 2 according to an acquisition request (step S74). The CPU 51 determines whether the absence flag has been generated or not as a result of acquisition (step S75). When there is the absence flag (S75: YES), the CPU 51 decides that the copy process by a user has been completed, and invalidates all the scanned image data including the image data in the copy data file 553 and the image data developed in the RAM 52 (step S76). During the invalidation process, information about invalidation is displayed as shown in FIG. 13(b).

When there is no absence flag, i.e., when amount-of-money data has been acquired at step S73 (S75: NO), the CPU 51 determines whether the amount-of-money data is less than a predetermined value or not (step S77). That is, it is determined whether the amount-of-money data is less than 30 yen or not for color copying (unit price of 30 yen), and it is determined whether the amount-of-money data is less than 10 yen or not for monochromatic copying. When it is determined that the amount-of-money data is less than the predetermined value (S77: YES), the CPU 51 reads shortage information indicating that the amount-of-money data is short from the guidance information file 552, and displays it on the display section 54 as shown in FIG. 14 (step S78). Thereafter, to determine whether the insufficient amount of money is added or not, the flow goes to step S73 to access the RAM 306 of the coin vendor 30 again and acquire amount-of-money data. When it is determined that the amount-of-money data is not less than the predetermined value (S77: NO), the copy process by a user has not been finished yet, so that the CPU 51 determines whether images of all the image data have been formed or not by referring to the image data stored in the copy data file 553 (step S79). When it is determined that images of all the image data have been formed (S79: YES), the flow goes tot step S70. When it is determined that images of all the image data have not been formed (S79: NO), on the other hand, the flow goes tot step S67 to newly read image data on the next page of the original from the copy data file 553 and perform image formation. Although the process procedures about a copy process have been described in the embodiment, the same is true of a print process from the port terminal 1A so that its detailed description will be omitted.

Third Embodiment

Figure 28:
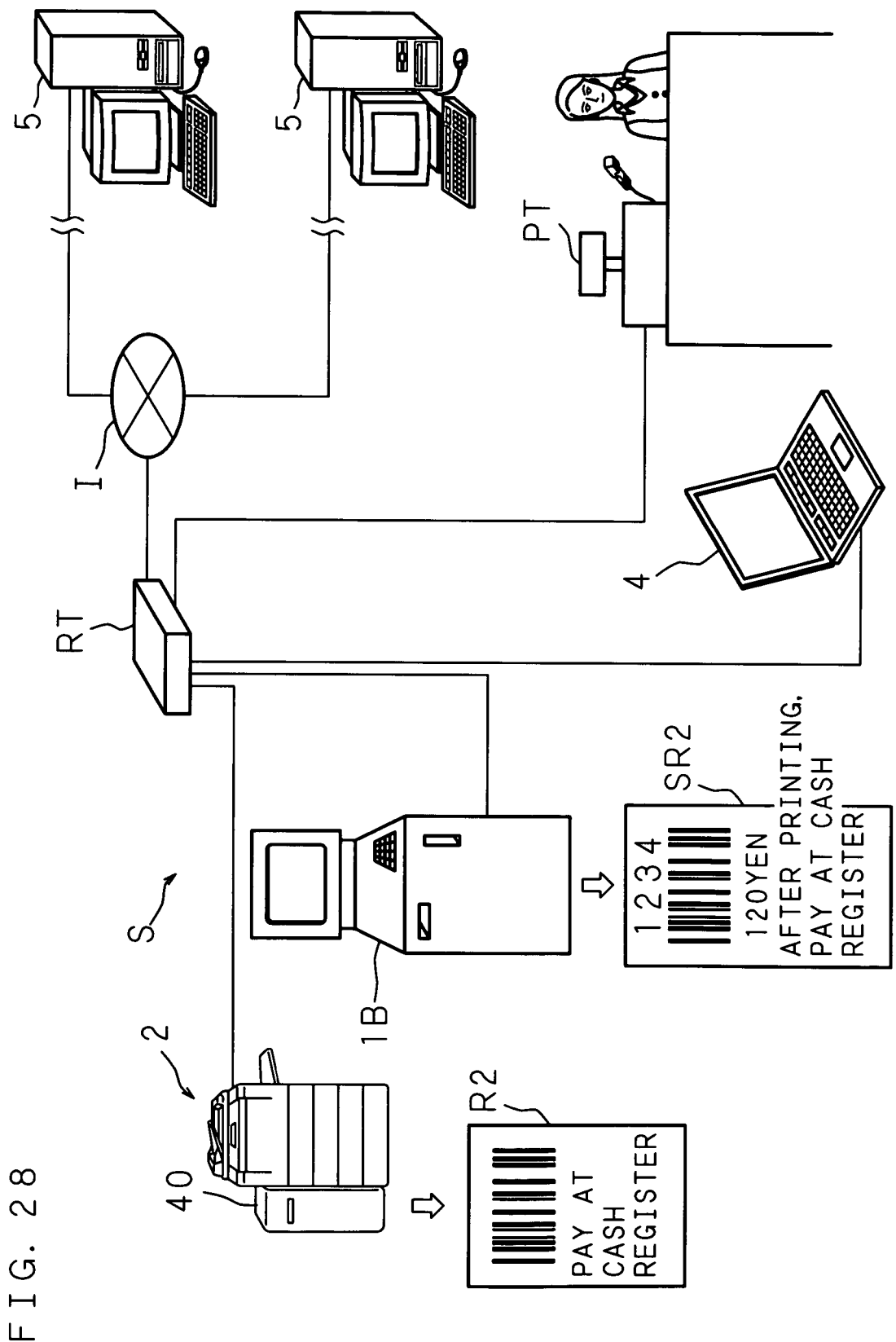
FIG. 28 is an exemplary diagram illustrating the outline of an information processing system according to an embodiment.

FIG. 28 is an exemplary diagram illustrating the outline of an image processing system according to an embodiment. In the diagram, 1B is a terminal device (hereinafter called port terminal) to be placed in a store, such as a convenience store, which is connected to the external Internet I via an LAN (hereinafter called communication network) S in the store, and the rooter RT and transmits and receives HTML files, computer programs, image data, etc. to and from the Web server 5 by the HTTP protocol.

The port terminal 1B has various functions, such as purchasing concert tickets and downloading of images from a network album stored in the Web server 5 by executing communication with the Web server 5. Image data downloaded via the Internet I or image data scanned by a reader for a recording medium, such as a memory card, provided in the port terminal 1B is transmitted as print data to an image forming apparatus 2 likewise placed in the store and connected via the communication network S and the rooter RT, and is printed when predetermined money is deposited. The image forming apparatus (hereinafter called multifunction apparatus) 2 has multiple functions, such as a copy function and a printer function. As one of the functions, it functions as a printer according to a demand from the port terminal 1B.

The multifunction apparatus 2 functions as a copy machine which scans an original placed on the document table and copies the scanned image data (copy data). To facilitate the distinction, image data scanned by the multifunction apparatus 2 will be called copy data, and image data to be output from the port terminal 1B will be called print data below. Although the following description of the embodiment will be given of a case where those devices and network are assembled in a store, such as a convenience store, it is not restrictive but the embodiment may be adapted to within a network which is constructed in a university, an office or the like. Further, while the multifunction apparatus 2 has a copy function and a printer function, it may of course have a facsimile function.

Because the hardware configuration of the multifunction apparatus 2 is the same as that of the first embodiment explained, the description will be omitted.

Further connected to the communication network S are a POS terminal PT provided at a cash register, and a personal computer 4. The POS terminal PT manages sales data or the like, and transmits management data managed through a batch process to a server computer (not shown) in the front office of convenience stores over the Internet I. The personal computer 4 is a known personal computer which is not used by customers, but is used at the back of the store by the manager in the store to create sales data, the shift table of part-time staff, posters, and so forth.

The multifunction apparatus 2 is provided with a receipt generator 40 as the medium issuing means for outputting the medium R added with identification information like a bar code for specifying copy data after finishing the printing. The receipt generator 40 prints out amount-of-money information required for the copying and the information for specifying the copy data as the bar code on the receipt R2, which is then discharged. The user carries the receipt R2 to the POS terminal placed at the cash register, and the staff of the store reads the receipt R2 with the reader. When the user pays a predetermined amount of money and finishes the adjustment process, adjustment-end-information indicating that the adjustment is finished, e.g., identification information for specifying copy data, is output to the multifunction apparatus 2, and the multifunction apparatus 2 invalidates the corresponding copy data. Although the medium is explained as the receipt R2, and the medium output means is explained as the receipt generator 40 in the embodiment, they are not restrictive, the medium may be an IC card, a magnetic card or the like, and the medium output means may be a reader/writer for the IC card, or the like. The reader/writer may be of a non-contact type. Further, the medium output means may be the multifunction apparatus 2 itself, and with the medium being a recording sheet stored in the multifunction apparatus 2, necessary information may be printed and discharged.

When print data is output to the multifunction apparatus 2 from the port terminal 1B, by way of contrast, the sub receipt SR2 as the medium is discharged from the print section (refer to FIG. 29) as the sub-medium-output means. On the sub receipt SR2, a four-digit number as the identification information and the information on the amount of money required for the printing are printed, and, the four-digit number and the information on the amount of money are printed as the bar code. The user inputs the four digit number to the multifunction apparatus 2, and carries out the printing. After the printing, as same as the case of the copying, the user carries out the receipt R2 to the POS terminal PT placed on the cash register, and the staff of the store reads the receipt R2 with the reader. When the user pays the predetermined amount of money, and the adjustment process is finished, adjustment-end-information indicating that the adjustment is finished, like identification information for specifying the print data, is output to the multifunction apparatus 2, and the multifunction apparatus 2 invalidates the corresponding print data.

Figure 29:
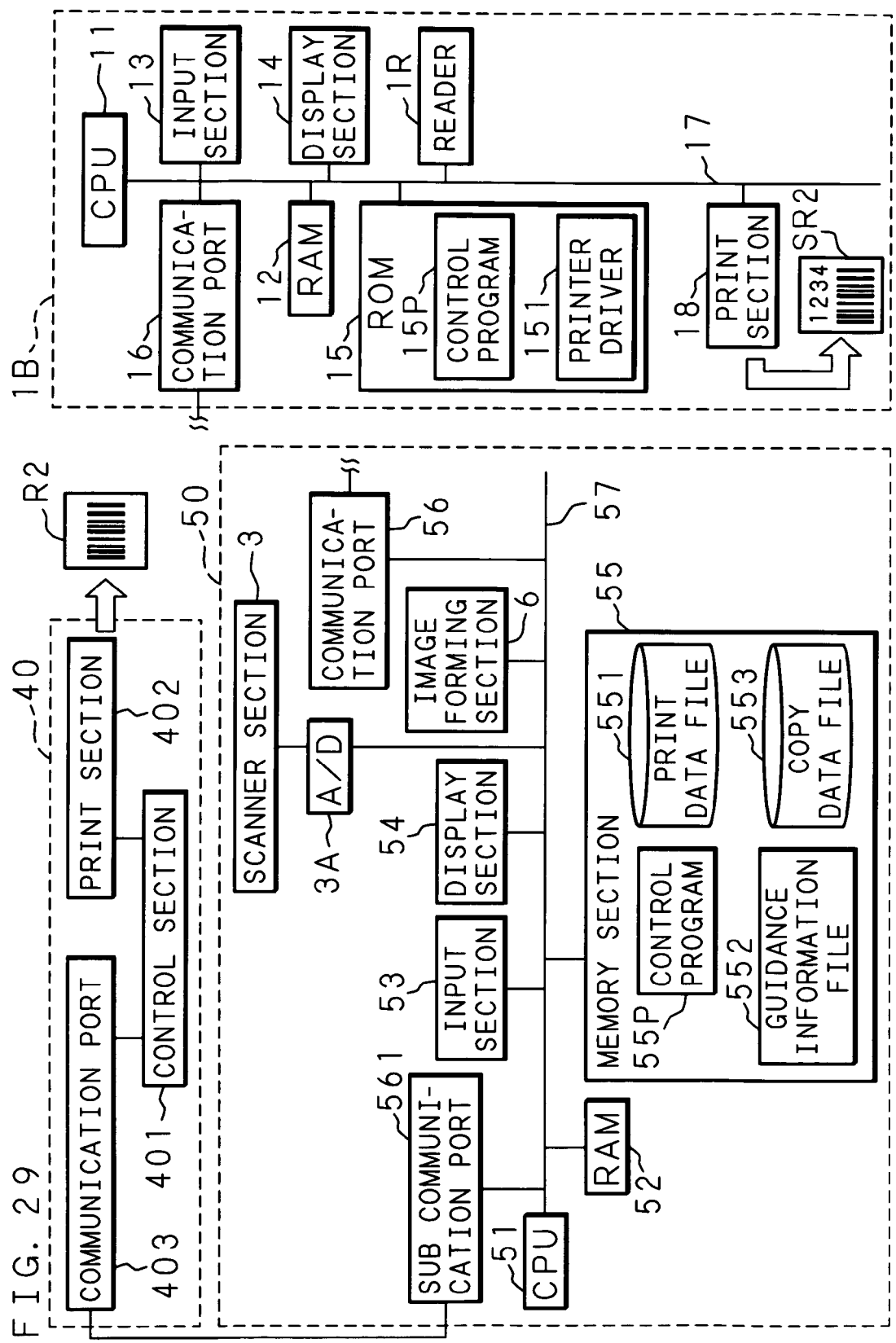
FIG. 29 is a block diagram showing the hardware configurations of a receipt generator, the control section (control means) of the multifunction apparatus, and a port terminal.
Figure 30:
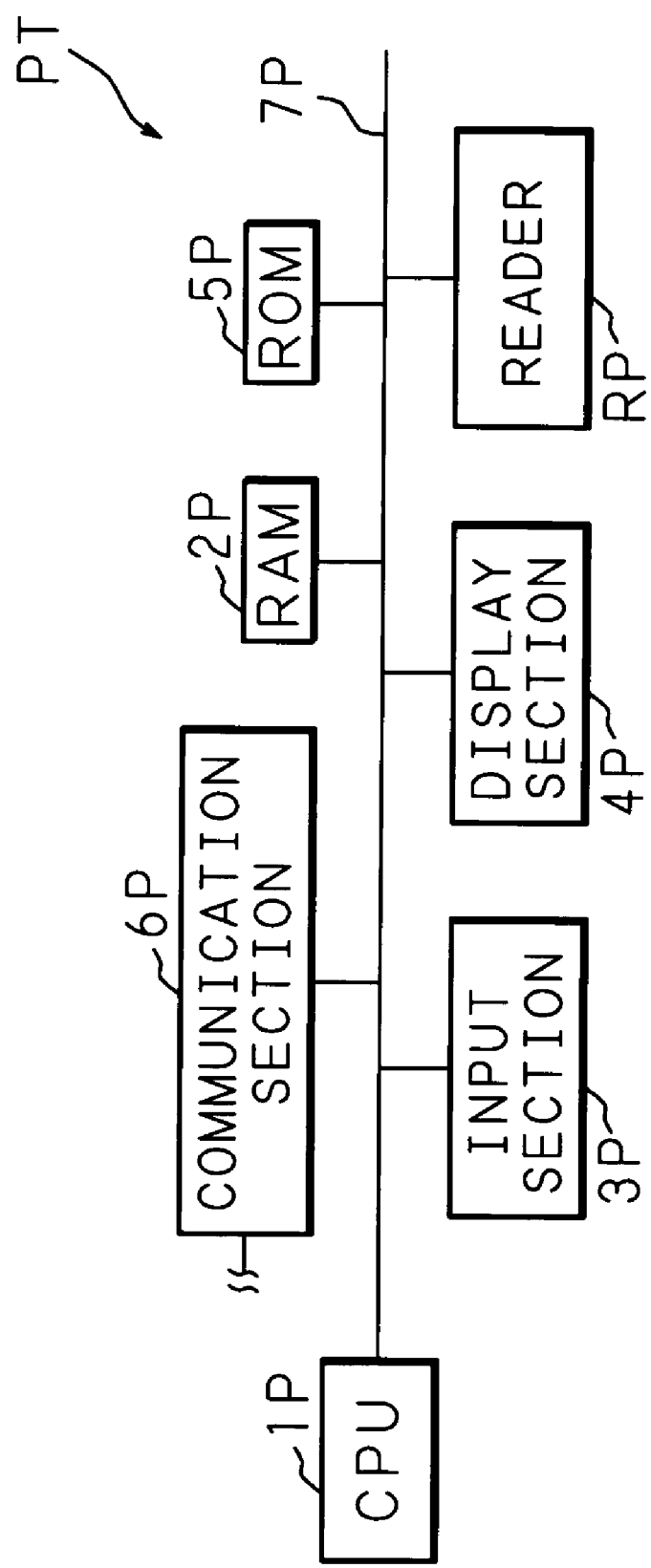
FIG. 30 is a block diagram showing the hardware configuration of a POS terminal.

The structure of the control system of each apparatus which constitutes the image forming process system will now be explained below. FIG. 29 is a block diagram illustrating the hardware structures of the receipt generator 40, the control section (control means) of the multifunction apparatus 2, and the port terminal 1B, and FIG. 30 is a block diagram illustrating the hardware structure of the POS terminal PT. The structure of the control section 50 of the multifunction apparatus 2 is same as the structure illustrated in the first embodiment. That is, the multifunction apparatus 2 comprises the CPU 51, and the CPU 51 is connected to the RAM 52, the memory section 55 like a hard disk, the display section 54 like a liquid crystal display as the display means, and the input section 53 as the input means, which comprises various input keys, such as a numerical keypad, and a start key, and a touch panel provided over the display section 54, by the bus 57. The CPU 51 controls each hardware mentioned in accordance with a control program 551 stored in the memory section 55, and allows them to function as the image forming apparatus.

The receipt generator 40 comprises a control section 401 as the control means, a communication port 403 which sends and receives information between the multifunction apparatus 2, and a print section 402 which prints and discharges the receipt R2. In the multifunction apparatus 2, when printing of the copy data is finished, information on the amount of money according to the number of the printouts and the identification information for specifying the copy data are output to the receipt generator 40. The control section 401 of the receipt generator 40 converts the received information on the amount of money and the identification information to the bar code, and prints and ejects the bar code from the print section 402. The amount of money is set as, for example, 10 yen per sheet for a black and white printing, and 30 yen per sheet for a color printing.

The port terminal 1B comprises the CPU 11, and the CPU 11 is connected to the RAM 12, the ROM 15, the communication port 16 like a LAN card for sending and receiving information to and from the multifunction apparatus 2, the display section 14 like a liquid crystal display, and the input section 13 like a touch panel, and moreover, the reader 1R, and the print section 18 as the sub-medium output means, by the bus 17. The CPU 11 is connected to the individual hardware sections of the port terminal 1B by the bus 17, controls them, and executes various software functions in accordance with a control program 15P stored in ROM 15.

The printer driver 151 for the multifunction apparatus 2 is installed on the ROM 15. Printing with the port terminal 1B is executed as the user operates the input section 13, the print data downloaded from the network album of the Web server 5, or the print data read from a recording medium like a CD-ROM, or a memory card inserted into the reader 1R, is output to the multifunction apparatus 2. After the print data is output to the multifunction apparatus 2, the unique identification information for specifying the print data, for example, a four digit password, is printed and output on the receipt R2 as the recording sheet by the print section 18. On the sub receipt SR2, the identification information and the amount-of-money information required for the printing are printed as a bar code. As explained above, the medium may be an IC card, etc, and the sub-medium output means may be, for instance, a reader/writer for the IC card or the like.

In printing the print data by the multifunction apparatus 2, as the user input the identification information printed on the sub receipt SR2, the print data corresponding to the identification information is read from the print data file 551 and printed.

Next, the hardware structure of the POS terminal PT will be explained. As illustrated in the diagram, the CPU 1P is connected to the RAM 2P, the ROM 5P, the communication section 6P like a LAN card for transmitting and receiving information to and from the multifunction apparatus 2, the display section 4P like a liquid crystal display, the input section 3P like a numerical keypad, and the reader RP by the bus 7P. The CPU 1P is connected to the individual hardware sections of the POS terminal PT by the bus 7P, controls them, and executes various software functions in accordance with the control program (not shown) stored in ROM 5P.

When the reader RP reads the bar code on the receipt R2, the CPU 1P reads the amount-of-money information in the bar code, and displays the amount of money for the copying on the display section 4P. When a predetermined amount of money is adjusted, the identification information for specifying the copy data, which is read by the reader RP, is output to the multifunction apparatus 2 as the adjustment-end-information. The CPU 51 of the multifunction apparatus 2 executes the process which searches the copy data file 553 and invalidates the area where the corresponding copy data is stored, in accordance with the identification information output from the POS terminal PT. The invalidation process may be done by overwriting with random numbers generated, or overwriting a predetermined numeral (for example, a value of consecutive 0's) by the CPU 51. In the embodiment, the copy data of the copy data file 553 is erased, but the copy data temporarily stored in the RAM 52 at the time of outputting the copy data to the image forming section 6 may also be erased.

Likewise, when the reader RP reads the sub receipt SR2, the CPU 1P reads the amount-of-money information in the barcode, and displays the amount of money for the printing on the display section 4P. When a predetermined amount of money is adjusted, and the printing is finished, the identification information for specifying the print data, which is read by the reader RP, is output to the multifunction apparatus 2 as the adjustment-end-information. The CPU 51 of the multifunction apparatus 2 executes the process of searching the print data file 551 and invalidating the area where the corresponding copy data is stored, in accordance with the identification information output from the POS terminal PT.

Figure 31:
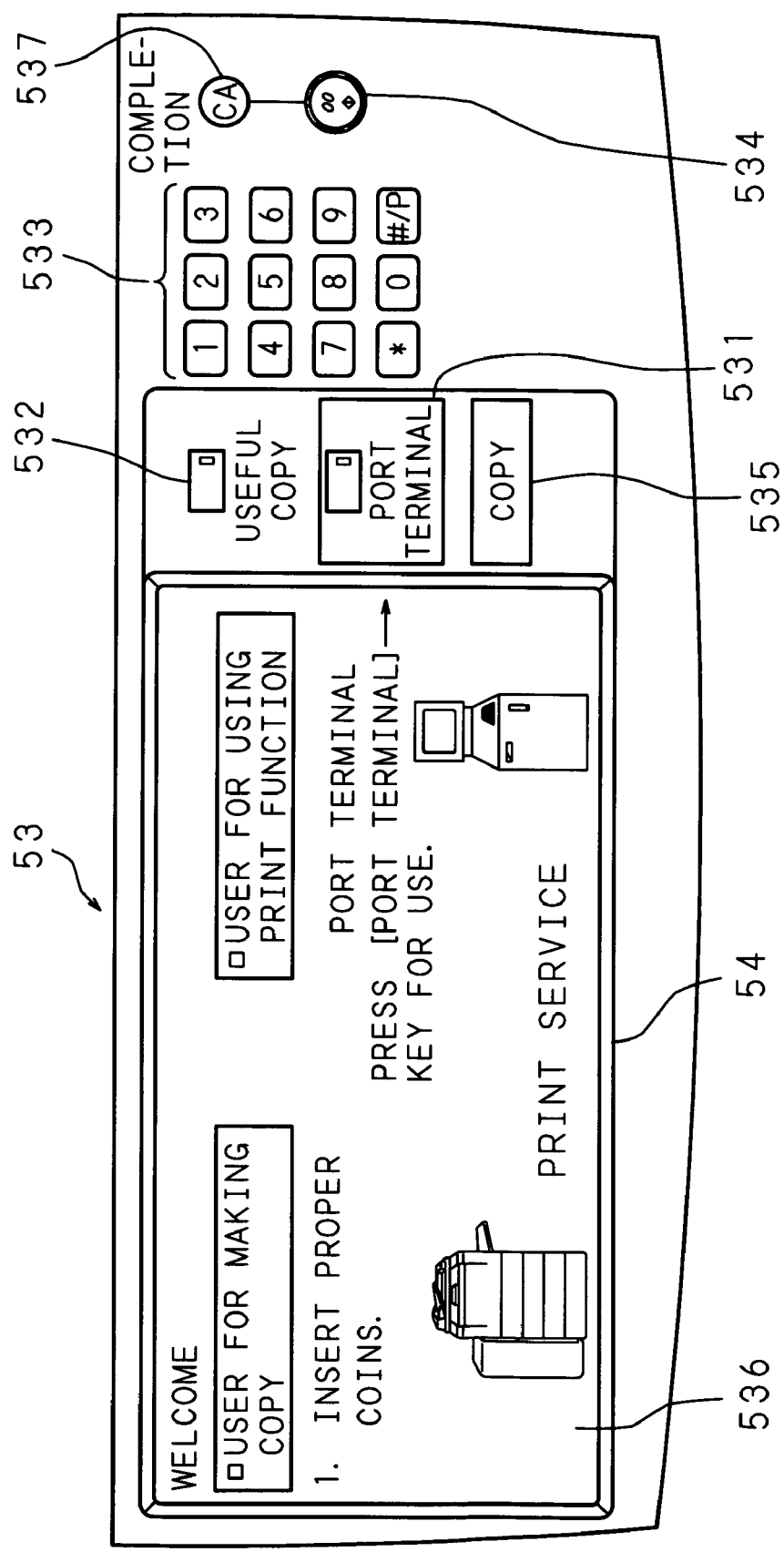
FIG. 31 is an explanatory diagram illustrating the images of a display section and an input section.

FIG. 31 is an explanatory diagram illustrating the images of the display section 54 and the input section 53. The input section 53 comprises the touch panel 536 which is placed over the display section 54, and the numerical keypad 533, etc. On the display section 54 in FIG. 31, information relating to the copy process (first information) and information relating to the print process (second information) are displayed so that the user can recognize both simultaneously. In the image process system according to the invention, when there is no print process command from the port terminal 1B, only the information relating to the copy process is displayed, and only when there is the print process command from the port terminal and the copy process is not yet executed, the information relating to the copy process and the information relating to the print process are displayed as shown in FIG. 31.

For instance, in the embodiment, the white and black copying is set as 10 yen per sheet, and the full color or a single color copying is set as 30 yen per sheet (50 yen for a A3 sheet). The CPU 51 stores amount-of-money data in accordance with the copy price of each mode in the RAM 52 for every copy process. When the user operates the completion button 537 for finishing the copying, the CPU 51 receives the operation signal, converts the amount-of-money information, stored in the RAM 52, and the identification information for specifying the copy data stored in the copy data file 553, to a bar code, and outputs it to the receipt generator 40. The control section 401 of the receipt generator 40 prints the bar code including the amount-of-money information and the identification information by the print section 402, and generates the receipt R2.

Figure 32:
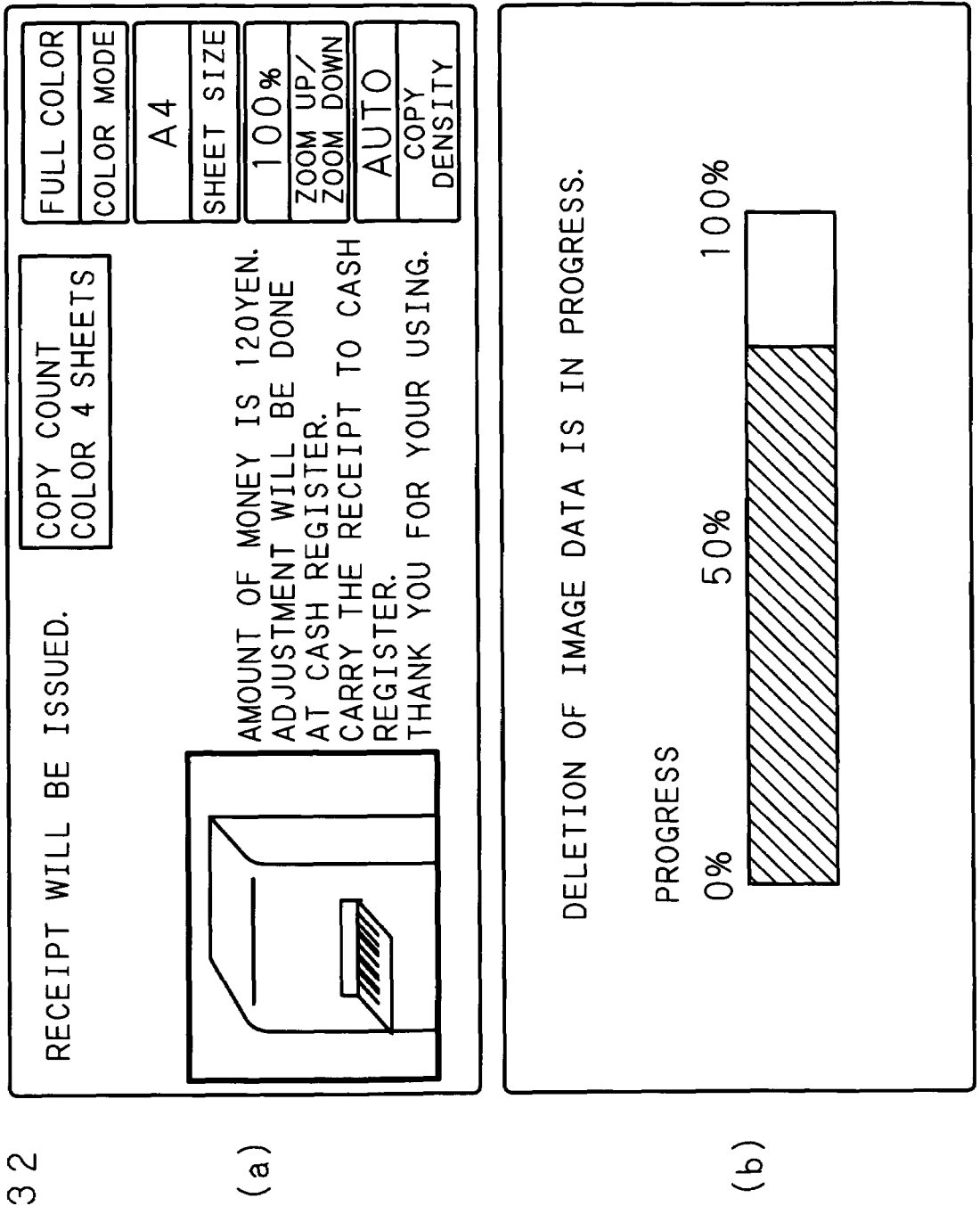
FIG. 32 is a schematic diagram illustrating the outline of an example of screens which are displayed on the display section of the multifunction apparatus.

FIG. 32 is a schematic diagram illustrating a screen example displayed on the display section 54 of the multifunction apparatus 2. At the time the receipt generator 40 generates the receipt R2, the multifunction apparatus 2 displays the screen as shown in FIG. 32(a) on the display section 54, thereby providing a guidance to the user.

When the adjustment is finished at the POS terminal PT, and the identification information as the adjustment-end-information is output to the multifunction apparatus 2, the CPU 51 of the multifunction apparatus 2 searches the copy data based on the identification information, and executes the invalidation process for the memory area in the copy data file 553 where the copy data is stored. When the invalidation process is started, information relating to the invalidation process, like the progress of the invalidation process, is displayed as shown in FIG. 32(b). Regarding the invalidation process, the CPU 51 may execute a process like generating random numbers in accordance with a predetermined random number generation algorithm, and overwriting them in the area of the copy data file 553 where the image data is stored, or overwriting a value of consecutive 0's or 1's in the area of the copy data file 553 where the image data is stored. Regarding the data invalidation process (the erasure process), it is not limited to the above described method, but the other well known method may be applied, so that the invalidation (erasure) process is executed. When the memory section 55 of the hard disk or the like is used and the RAM 52 is temporary used for the image formation, the invalidation process may be applied to the RAM 52.

FIG. 33 is an explanatory diagram illustrating the record layout of the copy data file 553. AS illustrated, the amount of money, the copy data, etc, are stored in association with the identification information. The scan date field stores information on the date when the original placed on the original table 20 is scanned. When the original comprises a plurality of sheets, and is scanned plural times, the date when the first original page is scanned may be stored. A unique number for specifying the scanned copy data is generated and stored in the identification information field by the CPU 51. The identification information should be generated in association with the scan date or the like.

In the amount-of-money field, the amount of money required for the copying is stored. Stored in the adjustment status field is information indicating whether or not the adjustment is finished. "Done" represents that the user has already finished the adjustment at the POS terminal PT. "Not done" represents that the copy is finished, but the adjustment has not finished yet. "In use" represents the state where the user is still using the multifunction apparatus 2. Set in the copy data field are copy data and an "invalidation done" flag indicating that the invalidation has already been finished for copy data storing information about the invalidation whose adjustment has been finished. When the adjustment is not finished, and the user is still using the multifunction apparatus 2, the copy data is held in the stored state.

Figure 34:
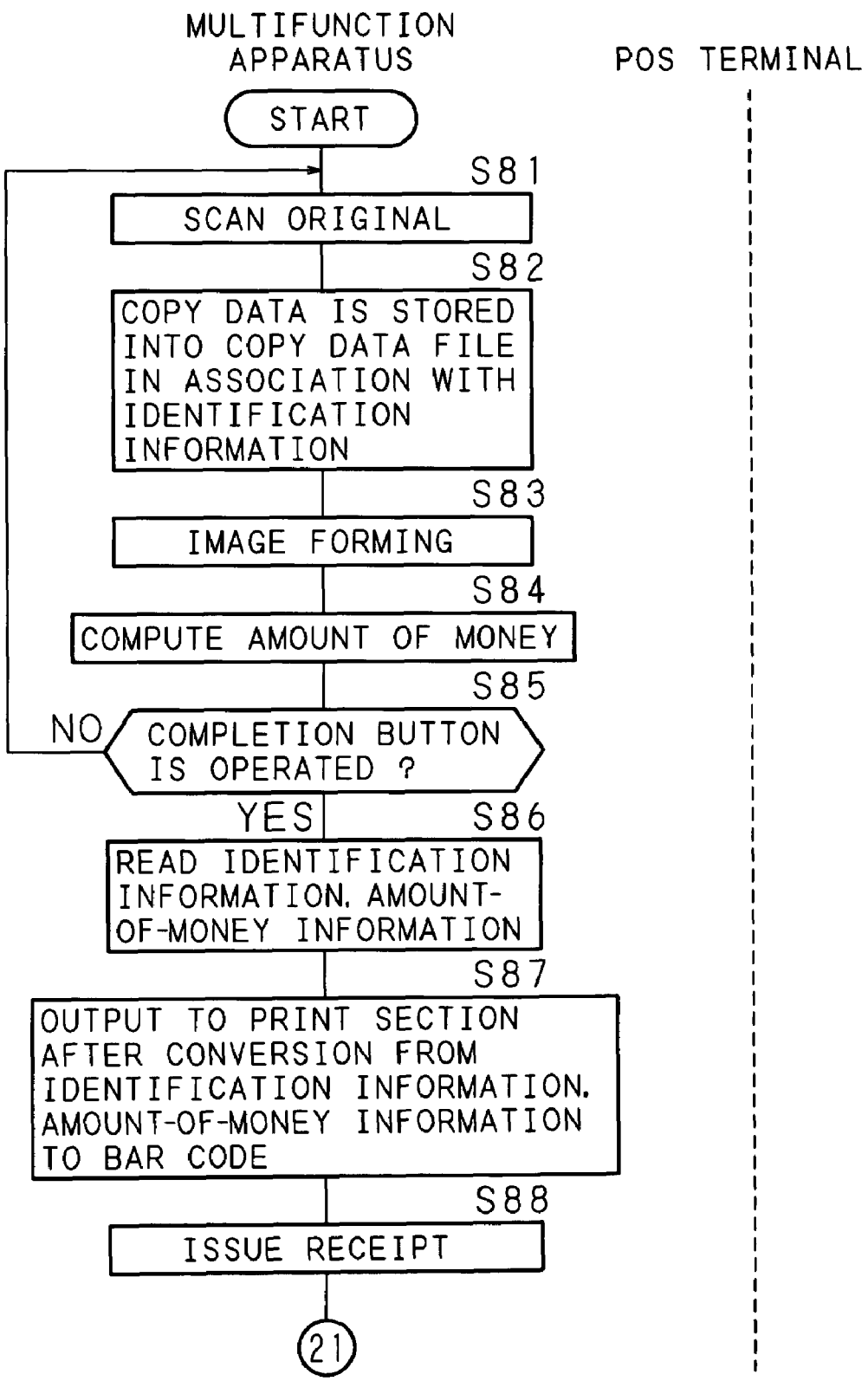
FIG. 34 is a flowchart illustrating the procedures of an invalidation process.
Figure 35:
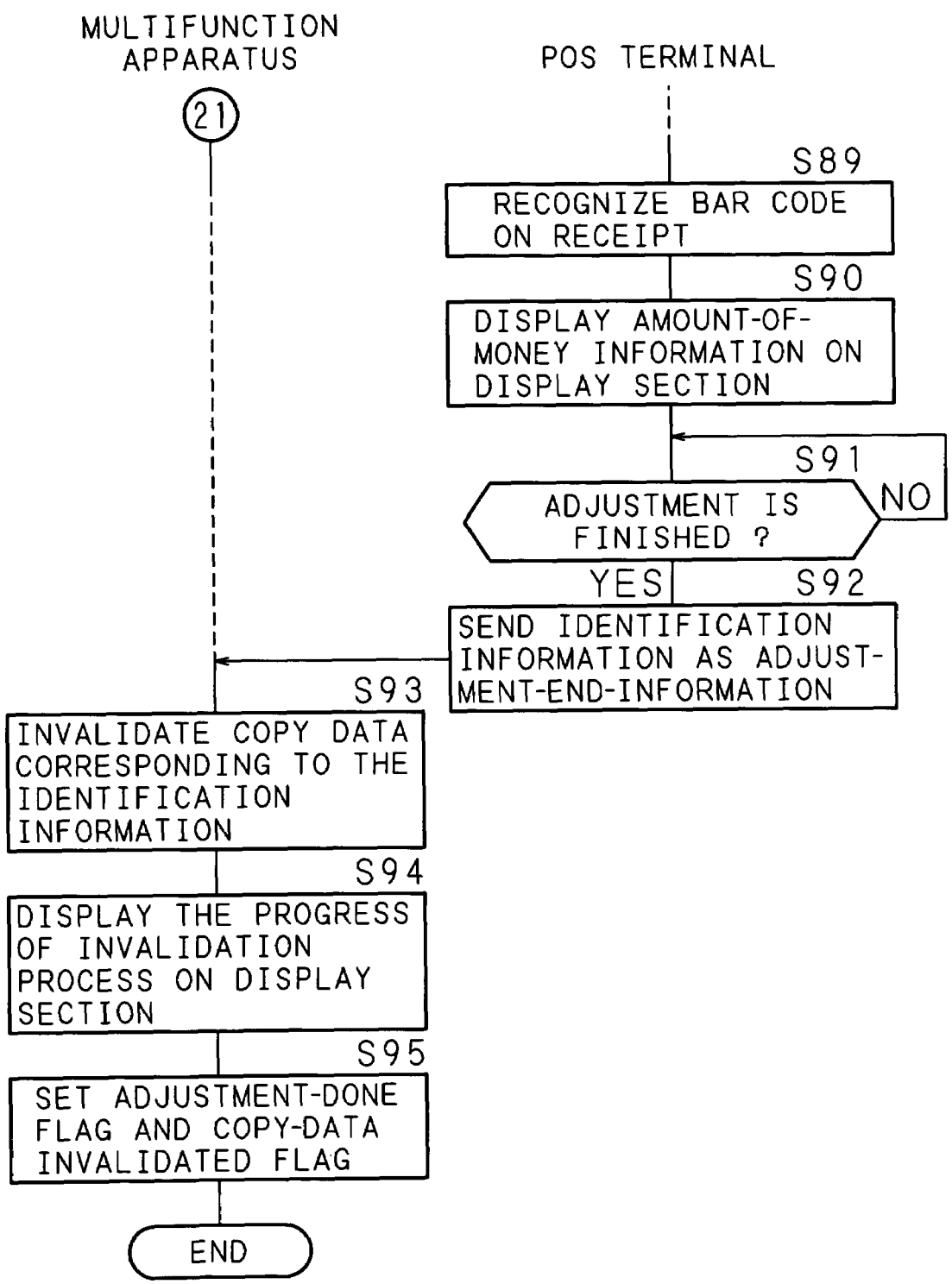
FIG. 35 is a flowchart illustrating the procedures of the invalidation process.

The procedures of the image processing of the invention with the above-described hardware configuration will be explained with the flowcharts. FIG. 34 and FIG. 35 are flowcharts illustrating the procedures of the invalidation process. First, the user set the original on the original table 20, and operates the copy button 535. Triggered with the operation signal from the copy button 535, the CPU 51 starts scanning the original (step S81). The CPU 51 stores the copy data of the scanned original in the copy data file 553 in association with the identification information (step S82). Next, the CPU 51 operates the image forming section 6 to form the image of the scanned copy data on the recording sheet (step S83).

The CPU 51 computes the amount of money required for the copying every time the image formation is finished (step S84). The CPU 51 stores the information on the computed amount of money in the copy data file 553 in association with the identification information. The CPU 51 determines whether or not the completion button 537 is operated (step S85). When it is determined that the completion button is not operated (step S85: NO), the flow goes to step S81, and above process is repeated. In contrast, when it is determined that the completion button is operated (step S85: YES),it is determined that the user finishes the copying, and, the CPU 51 reads out the identification information and the information on the amount of money from the copy data file 553 (step S86), and dereferences them at the RAM 52.

The CPU 51 convert the read out identification information and amount-of-money information to the bar code with referring to the unillustrated conversion table, and outputs the converted bar code to the print section 402 of the receipt generator 40 (step S87). Accordingly, the receipt R2 on which the bar code including the identification information and the information on the amount of money can be generated (step S88). When the user carries on the receipt R2 to the POS terminal PT, the bar code on the receipt R2 is read by the reader RP. The CPU 1P recognizes the bar code on the read receipt R2 (step S89), and displays the information on the amount of money on the display section 4P (step S90). The CPU 1P determines whether or not the adjustment is finished (step S91). When it is determined that the adjustment is not finished (S91: NO), the process at step S91 is repeated until the adjustment is finished.

In contrast, when the adjustment is finished (S91:YES), the CPU 1P sends the identification information identified at step S89 as the adjustment-end-information to the multifunction apparatus 2 (step S92). The CPU 51 of the multifunction apparatus 2 searches the copy data corresponding to the sent identification information in the copy data file 553, and executes the process for invalidating the searched copy data (step S93). The CPU 51 displays the information indicating the invalidation process together with the progress thereof as shown in FIG. 32(b) (step S94). The CPU 51 sets the adjustment-done flag and the copy-data invalidated flag in the adjustment status field and the copy data field in the copy data file 553, respectively (step S95). When the invalidation process in the multifunction apparatus 2 is completed, information indicating the completion may be sent to the POS terminal PT, and displayed on the display section 4P of the POS terminal PT.

Fourth Embodiment

The third embodiment relates to the technology which performs invalidation after print data output from the port terminal 1B is adjusted. FIG. 36 is an explanatory diagram illustrating the layout of records of the print data file 551. As shown in the diagram, the file name of the print data, the amount of money, the print data, etc. are stored in association with the identification information. Stored in the reception date field is information of the date where print data has been transmitted from the port terminal 1B and has been received by the CPU 51. The file name of the transmitted print data is stored in the print data (file name) field. Data to be transmitted is bmp data, jpeg data, html data and so forth. A number for specifying received print data is stored in the identification information field. This identification information is transmitted, together with the print data, to the multifunction apparatus 2 from the port terminal 1B. This number is the same as the number described on the sub receipt SR2 generated by the print section 18 of the port terminal 1B.

Information indicating whether printing of print data transmitted to the multifunction apparatus 2 from the port terminal 1B has been finished or not is stored in the history field. "Done" indicates that printing has already finished, and "not done" indicates that the print process has not completed yet and is standing by as a job. The amount of money needed for printing is stored in the amount-of-money field. The information on the amount of money is transmitted, together with the identification information and print data, to the multifunction apparatus 2 from the port terminal 1B. Note that the information on the amount of money is the same as the information on the amount of money described on the sub receipt SR2 generated by the print section 18 of the port terminal 1B. Information indicating whether adjustment has been finished or not is stored in the adjustment field. "Done" indicates that the user has already finished adjustment through the POS terminal PT. "Not done" indicates that the user has not finished adjustment at the POS terminal PT yet. In addition to the print data, information about invalidation is stored in the print data field. With regard to print data whose adjustment has been finished, an "invalidation done" flag indicating that invalidation has already been finished is set. When adjustment is not finished, print data is held in the stored state.

Figure 37:
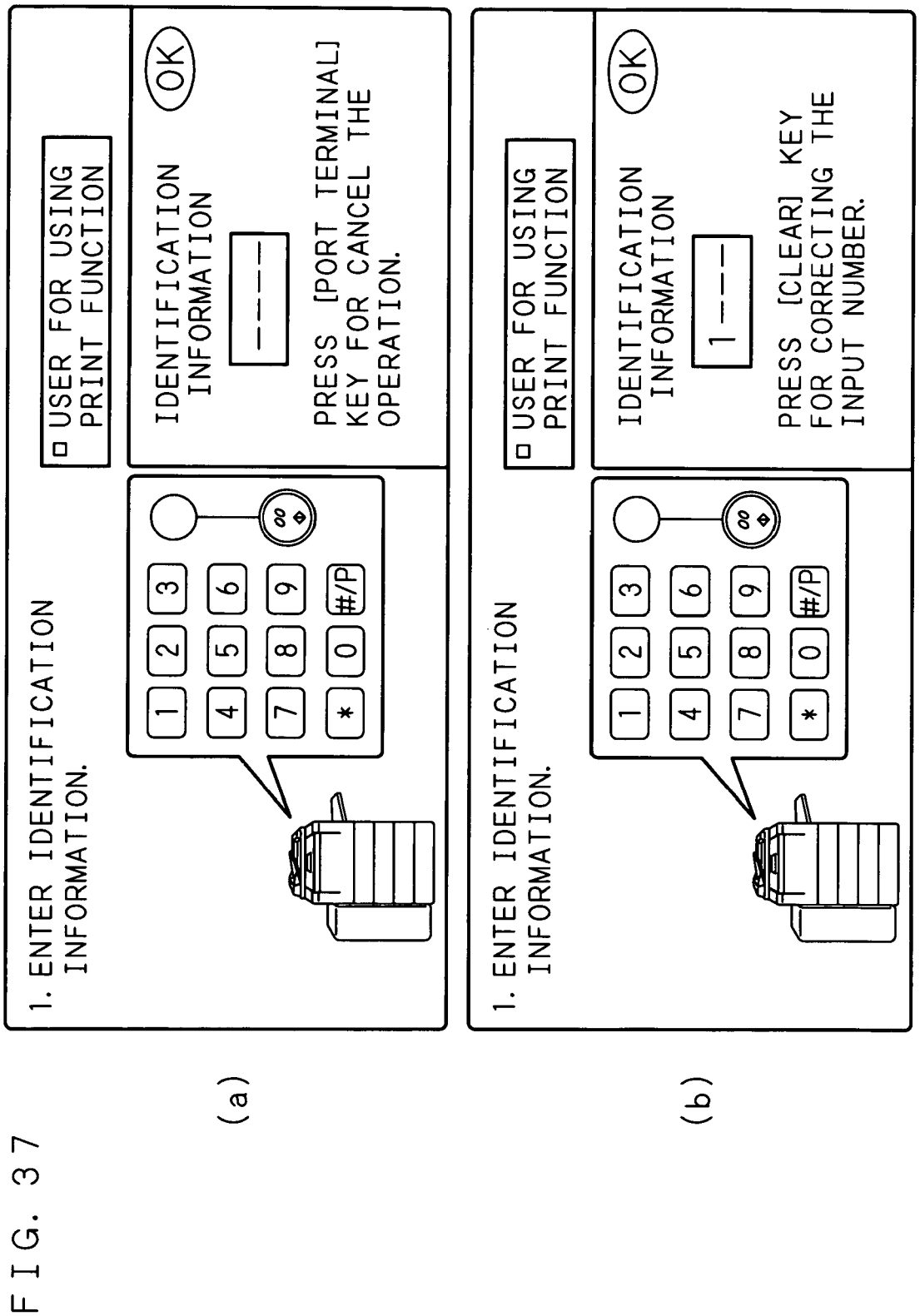
FIG. 37 is a schematic diagram illustrating the outline of an example of screens which are displayed on the display section of the multifunction apparatus.
Figure 39:
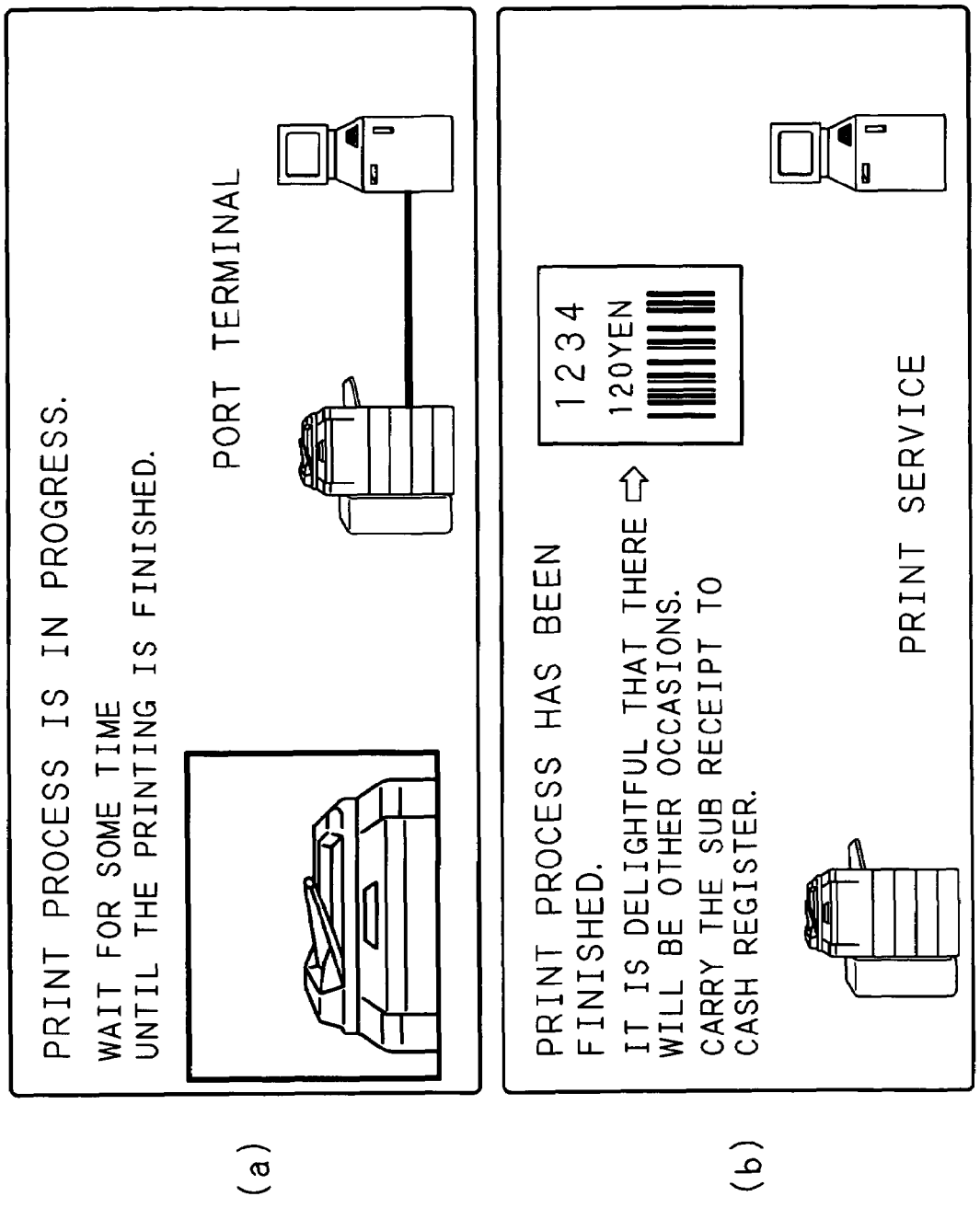
FIG. 39 is a schematic diagram illustrating the outline of an example of screens which are displayed on the display section of the multifunction apparatus.
Figure 40:
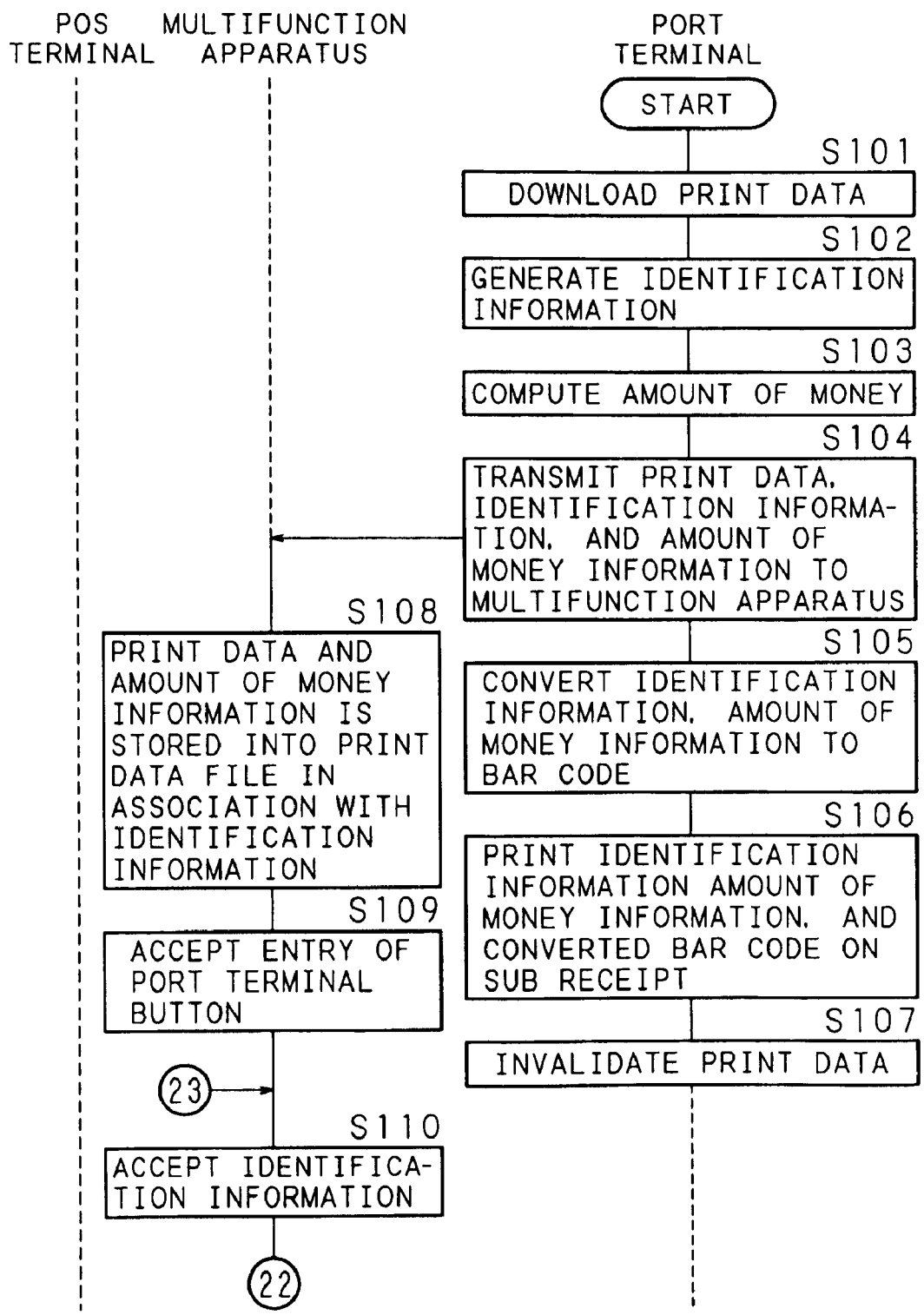
FIG. 40 is a flowchart illustrating the procedures of an invalidation process on print data.
Figure 41:
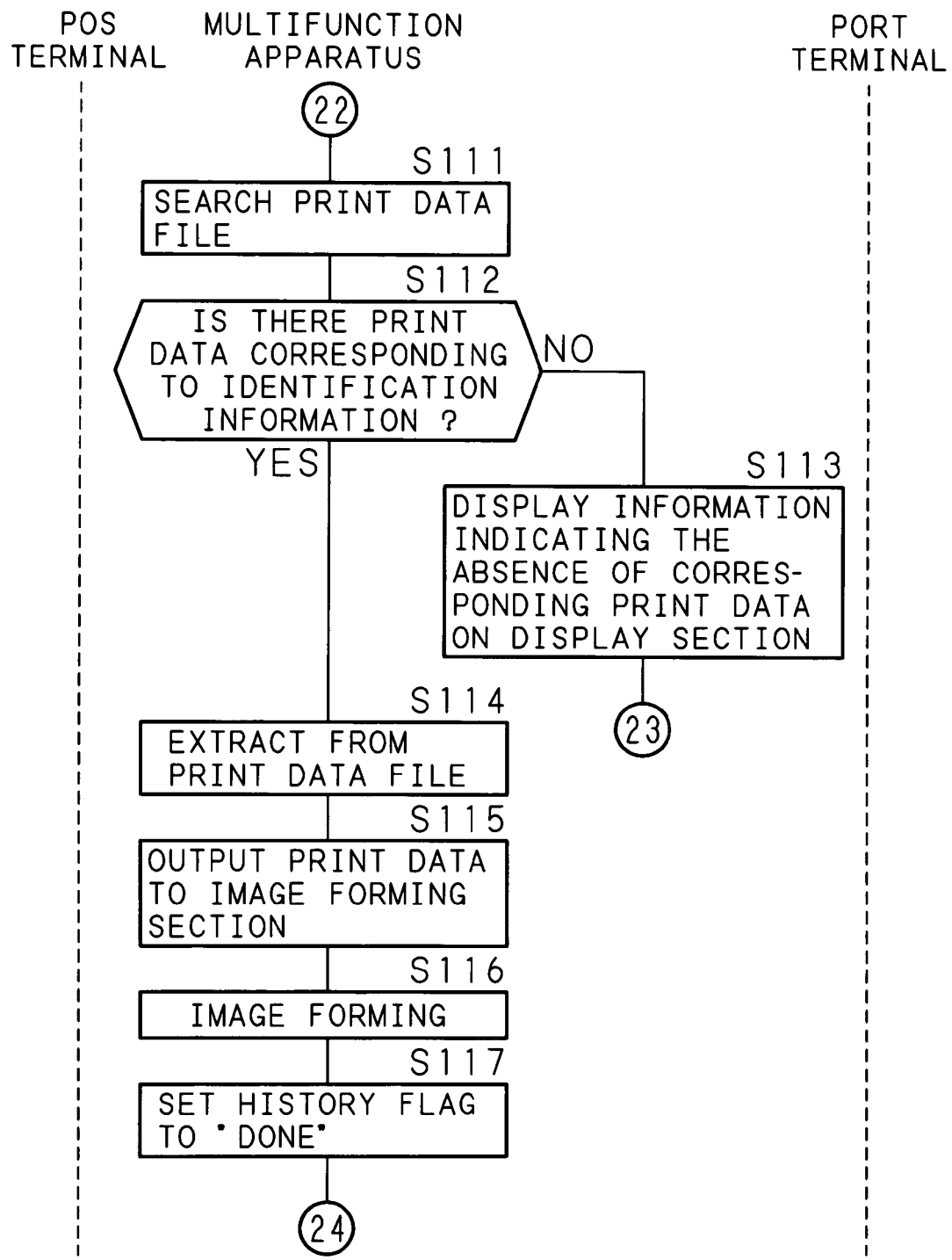
FIG. 41 is a flowchart illustrating the procedures of the invalidation process on the print data.
Figure 42:
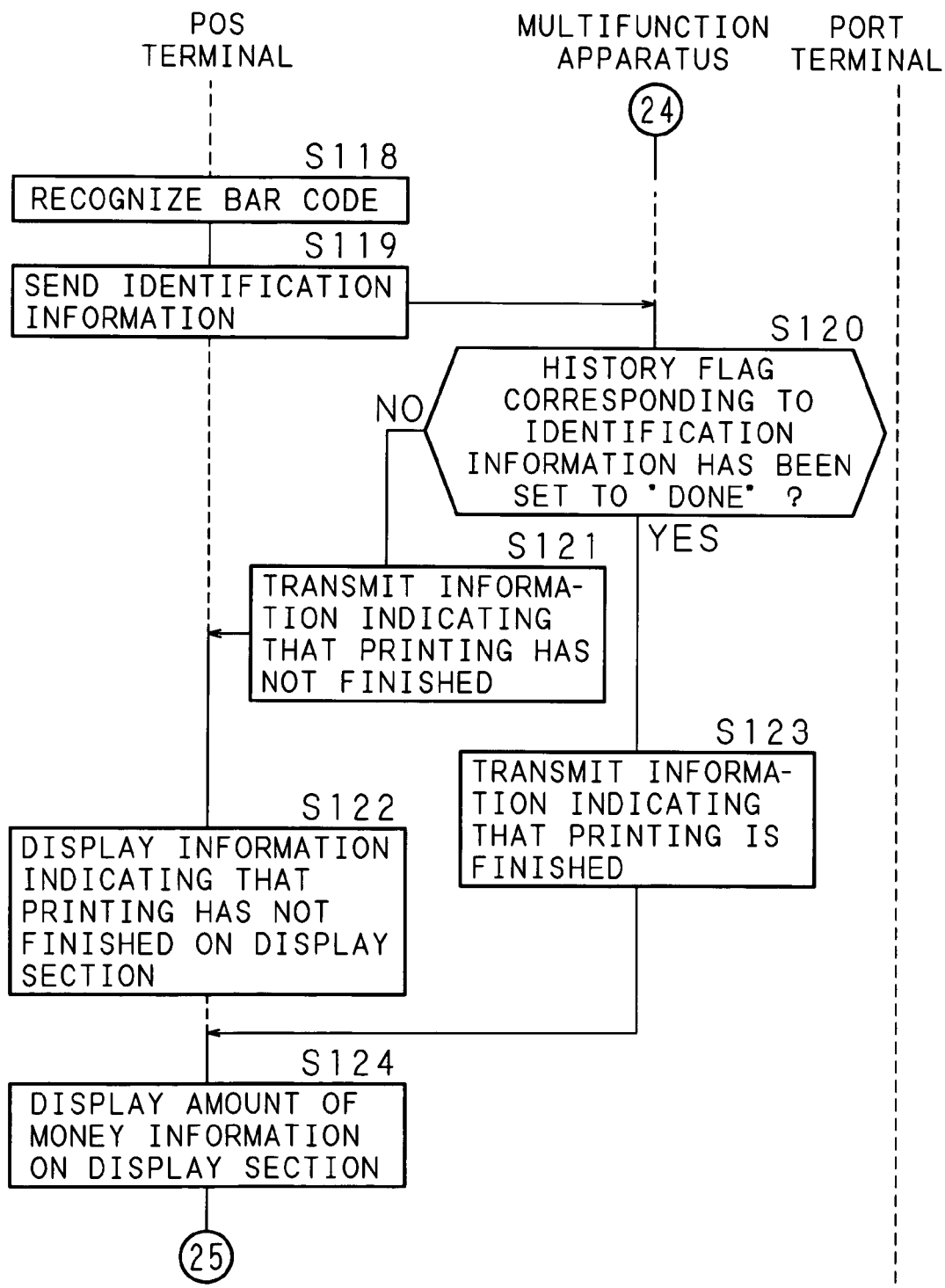
FIG. 42 is a flowchart illustrating the procedures of the invalidation process on the print data.
Figure 43:
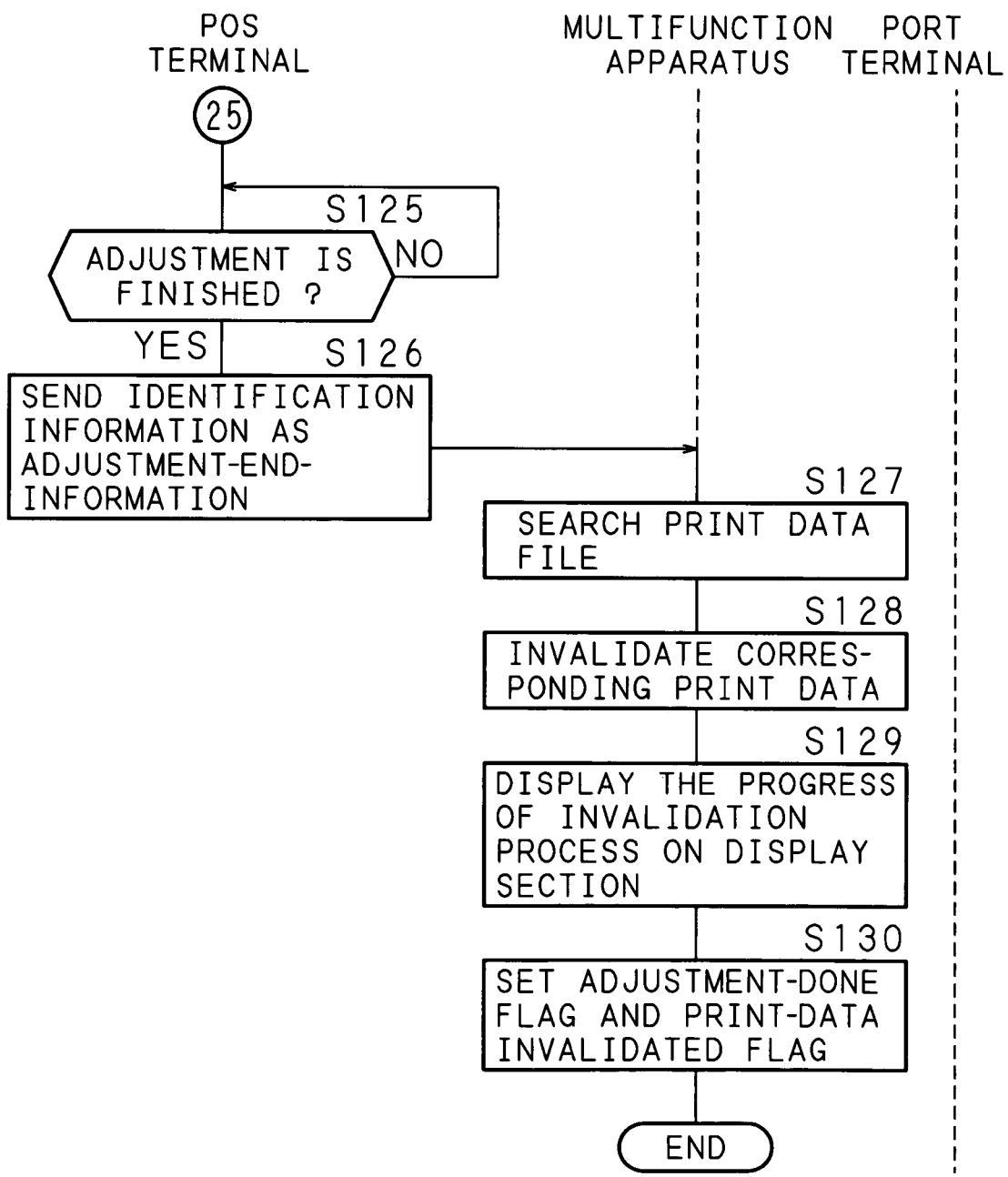
FIG. 43 is a flowchart illustrating the procedures of the invalidation process on the print data.

FIGS. 37 through 39 are schematic diagrams showing screen examples to be displayed on the display section 54 of the multifunction apparatus 2. When the port terminal button 531 is input while information relating to a copy process and information relating to a print process are displayed, as shown in FIG. 31, on the display section 54, only first information relating to a print process is displayed on the display section 54 and a screen to request entry of identification information is displayed first, as shown in FIG. 37(a). The user inputs identification information printed on the sub receipt SR2, output from the print section 18 of the port terminal 1B, through the numerical keypad 533. Through the operation of the numerical keypad 533 by the user, the identification information is displayed as shown in FIG. 37(b). When having finished inputting the identification information, the user inputs the "OK" button displayed on the display section 54 through the touch panel 536 as shown in FIG. 38(a). Although entry of identification information is received from the numerical keypad 533 as identification information reception means in the embodiment, such is not restrictive, and the multifunction apparatus 2 may be provided with a bar code reader as the identification information reception means to read a bar code as identification information printed on the receipt R2. Or, identification information may be transmitted and received to and from a cellular phone (not shown) by using an infrared reception section (not shown) having an infrared communication function or a communication module (not shown) having a Bluetooth function, which is provided at the multifunction apparatus 2.

The CPU 51 searches the print data file 551 based on the input identification information, and reads corresponding print data and starts printing it out. When there is no corresponding print data, on the other hand, guidance information indicative of absence of identification information is displayed on the display section 54 as shown in FIG. 38(*b*). Those information relating to a print process, like information relating to a copy process, are stored in the guidance information file 552, and are read out from a corresponding file at the adequate timing and output to the display section 54 by the CPU 51.

After the print process is started, guidance information indicating that printing is underway is displayed as shown in FIG. 39(*a*). After printing is finished, guidance information indicating that printing has been completed is displayed as shown in FIG. 39(*b*). to prompt adjustment, a guidance to bring the sub receipt SR2 to the POS terminal PT is displayed. When the bar code is read at the POS terminal PT and adjustment of the read amount of money is finished, identification information as adjustment-end-information is transmitted to the multifunction apparatus 2. Thereafter, print data corresponding to the identification information is extracted from the print data file 551, and the invalidation process is executed. During the invalidation process, an image diagram showing the progress displayed as shown in FIG. 32(*b*).

FIGS. 40 through 43 are flowcharts illustrating the procedures of the invalidation process on print data. First, the port terminal 1B accesses the Web server 5 in response to an instruction from the user, and downloads print data (step S101). The CPU 11 stores the downloaded print data in the RAM 12. Further, the CPU 11 generates identification information for specifying print data (step S102), and stores it in the RAM 12. The CPU 11 computes the amount of money according to the number of printouts of the print data (step S103). With 30 yen per sheet, for example, the amount of money needed for printing is computed. The CPU 11 transmits information on the computed amount of money, the print data stored in the RAM 12 and the identification information to the multifunction apparatus 2 (step S104).

Further, the CPU 11 converts the identification information and the information on the amount of money to a bar code (step S105). The CPU 11 outputs the identification information, the information on the amount of money, and the bar code after conversion to the print section 18, and prints them on the sub receipt SR2 (step S106). The sub receipt SR2 after printing is discharged to be provided to the user. The CPU 11 of the port terminal 1B finally performs a process of invalidating print data temporarily stored in the RAM 12 (step S107). When receiving the print data, the identification information and the information on the amount of money, transmitted at step S104, the CPU 51 of the multifunction apparatus 2 stores the print data and the information on the amount of money in the print data file 551 in association with the identification information (step S108).

The CPU 51 of the multifunction apparatus 2 accepts the entry of the port terminal button 531 shown in FIG. 5 (step S109). When receiving the input signal of the port terminal button 531, the CPU 51 reads guidance information from the guidance information file 552 and displays a screen to prompt the entry of the identification information as shown in FIG. 37(*a*). When the identification information is input through the input section 53, the CPU 51 accepts the identification information (step S110). Based on the accepted identification information, the CPU 51 searches the print data file 551 (step S111). Then, the CPU 51 determines whether there is print data corresponding to the identification information or not (step S112).

When there is no print data corresponding to the identification information (S112: NO), guidance information indicating the absence of the corresponding print data is displayed as shown in FIG. 38(*b*) (step S113). When print data has already undergone the invalidation process as will be discussed later, i.e., when the CPU 51 determines, from the result of searching the print data file 551 based on the identification information, that the "done" flag is set in the adjustment status field or the "invalidation done" flag is set in the print data field, information indicating that there is no corresponding print data is displayed on the display section 54 as done at step S113.

When having decided that there is print data corresponding to the identification information (S112: YES), the CPU 51 extracts the corresponding print data from the print data file 551 (step S114). The CPU 51 outputs the extracted print data to the image forming section 6 (step S115), and executes image formation (step S116). Accordingly, the print data is printed on the recording sheet which is then discharged. Further, the CPU 51 sets the history flag in the print data file 551 corresponding to the identification information to "done" (step S117).

After printing is done, the user brings the sub receipt SR2 to the cash register to the POS terminal PT. The CPU 1P of the POS terminal PT recognizes a bar code with the reader RP (step S118), and stores it in the RAM 2P. The CPU 1P converts the stored bar code to identification information and the amount of money, and stores them in the RAM 2P. Then, the CPU 1P reads out the stored identification information and sends it to the multifunction apparatus 2 (step S119). Based on the sent identification information, the CPU 51 of the multifunction apparatus 2 searches the print data file 551 to determine whether the flag in the history field corresponding to the identification information has been set to "done" or not (step S120).

When it is determined that the flag is not set to "done" (S120: NO), it is then determined that printing of the print data has not finished yet, and information indicating that printing has not finished is transmitted to the POS terminal PT (step S121). The CPU IP of the POS terminal PT displays the information indicating that printing has not finished on the display section 4P (step S122). For example, information, such as "Printing has not finished yet. Please come to the cash register again when completing printing at the multifunction apparatus 2", has only to be displayed on the display section 4P.

When having determined at step S120 that the history flag is set to "done" (S120: YES), the CPU 51 of the multifunction apparatus 2 sends information indicating that printing is finished to the POS terminal PT (step S123). When receiving the information indicating that printing is finished, the CPU 1P of the POS terminal PT displays information on the amount of money identified at step S118 on the display section 4P (step S124). The CPU 1P determines whether the user has paid a predetermined amount of money and finished the adjustment process or not (step S125). When the adjustment process has not finished yet (S125: NO), the process at step S125 is repeatedly executed until the adjustment process is finished.

When it is determined that the adjustment process has finished (S125: YES), the CPU 1P sends identification information as adjustment-end-information to the multifunction apparatus 2 (step S126). Subsequently, the CPU 51 of the multifunction apparatus 2 searches the print data file 551 for print data corresponding to the sent identification information (step S127), and performs a process of invalidating the retrieved print data (step S128). The CPU 51 displays information indicating the progress of the invalidation process, together with the invalidation process, as shown in FIG. 32(*b*) (step S129). The CPU 51 respectively sets the adjustment-done flag and the print-data invalidated flag in the adjustment status field and the print data field in the print data file 551 (step S130). Note that when the invalidation process at the multifunction apparatus 2 is completed, information indicative of the completion may be transmitted to the POS terminal PT, and the information may be displayed on the display section 4P of the POS terminal PT.

INDUSTRIAL APPLICABILITY

According to the invention, the image forming apparatus stores scanned or input image data into the image data memory means. Then, when valuable information which is managed by the valuable information processing apparatus fulfills a predetermined condition, image data stored in the image data memory means is invalidated, thus eliminating a risk of a third party's illegitimate use of image data of a user while stored image data can be used effectively using functions, such as the electronic filing function.

As the image forming apparatus displays information about invalidation of image data on the display means according to the invention, a user can confirm that image data is invalidated and can securely use the image forming apparatus.

Further, according to the invention, the image processing system comprises the image forming apparatus and the information processing apparatus, such as a POS terminal, which transmits and receives information to and from the image forming apparatus. The image forming apparatus stores read or externally output image data into the image data memory means. When information to be invalidate stored image data is received from the information processing apparatus, image data stored in the image data memory means is invalidated. This structure eliminates a risk of a third party's illegitimate use of image data of a user while stored image data can be used effectively using functions, such as the electronic filing function.

Further, according to the invention, the information processing apparatus executes an adjustment process about image data to be invalidated. In the adjustment process, for example, when image formation of image data stored in the image data memory means is finished, the image forming apparatus outputs a medium added with identification information associated with the image data. A user brings the output medium into the information processing apparatus for adjustment. The information processing apparatus identifies the identification information, and displays the amount of money needed for image formation of image data corresponding to the identified identification information on the display section.

The information processing apparatus determines whether the amount of money needed for image formation of image data corresponding to the identified identification information has been adjusted or not. When adjustment is completed this way, adjustment-end-information indicating the end of the adjustment process is sent to the image forming apparatus. When receiving the adjustment-end-information, the image forming apparatus invalidates image data stored in the image data memory means. Triggered by the adjustment process indicating the end of the use of the image forming apparatus by a user, this structure can surely erase image data of the user.

Further, according to the invention, the image forming apparatus outputs information about the invalidation process to the information processing apparatus. Then, as the information processing apparatus displays the output information about the invalidation process, the user or the staff of a store can recognize that data is surely erased, and can securely use the image forming apparatus.

Furthermore, the invention further comprises a terminal device which outputs image data to the image forming apparatus. The terminal device outputs image data and identification information for specifying the image data to the image forming apparatus. In addition, a medium affixed with the identification information output to the image forming apparatus is output. The image forming apparatus receives the identification information, and when the received identification information matches with identification information output from the output means, the image forming apparatus extracts corresponding image data. Then, the image of the extracted image data is formed.

When image formation of the extracted image data is finished, the identification information affixed to the medium is identified, and the adjustment process on the image data corresponding to the identification information is finished, the information processing apparatus sends the adjustment-end-information to the image forming apparatus. Then, the image forming apparatus invalidates the extracted image data. That is, processes of image formation, adjustment and invalidation for the image data output from the terminal device are achieved based on the identification information issued by the terminal device, so that even when wider services are provided, data of a user can be protected.

The invention claimed is:

1. An image processing method to be adapted to an image processing system comprising an image forming apparatus, which has control means for storing image data into image data memory means, and an information processing apparatus, which has operation means and is connected to said image forming apparatus, comprising an invalidation step of causing said control means to invalidate image data stored in said image data memory means when receiving information to be invalidated from said operation means, wherein said information processing apparatus manages valuable information and, when said valuable information managed by said information processing apparatus represents adjustment-end of utilization charge for said image forming apparatus, said information to be invalidated is transmitted from said operation means.

2. An image processing system comprising an image forming apparatus and an information processing apparatus to be connected to said image forming apparatus, wherein said image forming apparatus comprises image data memory means which stores image data, and invalidation means which invalidates image data stored in said image data memory means when receiving information to invalidate image data from said information processing apparatus, wherein said information processing apparatus comprises adjustment processing means which executes an adjustment process on image data to be invalidated, and adjustment-end-information transmitting means which transmits adjustment end information indicating completion of the adjustment process to said image forming apparatus, and said invalidation means is so constructed as to invalidate image data stored in said image data memory means when receiving the adjustment end information from said adjustment-end-information transmitting means.

3. The image processing system according to claim 2, wherein said image forming apparatus further comprises medium output means, which, upon completion of image formation of image data stared in the image data memory means, outputs a medium added with identification information associated with said image data, said information processing apparatus further comprises recognition means which recognizes the identification information to be added to said medium, and amount-of-money display means which displays an amount of money needed for the image formation of image data corresponding to the recognized identification information on a display section, and said adjustment processing means is so constructed as to determine whether the amount of money needed for the image formation of the image data corresponding to said identification information has been adjusted or not.

4. The image processing system according to claim 3, further comprising a terminal device that outputs image data to said image fanning apparatus and said terminal device comprises output means which outputs image data and identification information for specifying said image data, and sub-medium output means which outputs a medium added the identification information output by said output means, and wherein said image forming apparatus further comprises identification information accepting means which accepts identification information, and extraction means which extracts corresponding image data when said accepted identification information matches the identification information output by said output means, said recognition means is so constructed as to recognize identification information of the medium output by said sub-medium output means, and said adjustment-end-information transmitting means is so constructed as to transmit the adjustment end information to said image fanning apparatus when image formation of said extracted image data is completed and when an adjustment process of image data corresponding to said recognized identification information is completed.

5. The image processing system according to claim 4, wherein said image forming apparatus, said information processing apparatus and said terminal device are connected to one another by a LAN in a store.

6. The image processing system according to claim 3, wherein said information processing apparatus is a POS terminal.

7. The image processing system according to claim 3, wherein said information processing apparatus further comprises invalidation information display means which displays information about invalidation of image data by said invalidation means on the display section.

8. The image processing system according to claim 2, wherein said information processing apparatus is a POS terminal.

9. The image processing system according to claim 2, wherein said information processing apparatus further comprises invalidation information display means which displays information about invalidation of image data by said invalidation means on the display section.

10. An image forming apparatus comprising image data memory means which stores image data, and invalidation means which invalidates image data stored in said image data memory means when receiving, from the outside, adjustment end information indicating completion of an adjustment process on image data to be invalidated, further comprising medium output means, which, upon completion of image formation of image data stored in the image data memory means, outputs a medium added with identification information associated with said image data, wherein said invalidation means is so constructed as to invalidate the image data stored in said image data memory means when receiving, from the outside, the adjustment end information indicating completion of an adjustment process on image data corresponding to identification information issued by issuing means.

11. The image forming apparatus according to claim 10, further comprising invalidation information display means which displays information about invalidation of image data by said invalidation means on display means.

12. The image forming apparatus according to claim 10, further comprising invalidation information output means which outputs information about invalidation of image data by said invalidation means to the outside.

* * * * *